US008894965B2

(12) United States Patent
Vera-Castaneda

(10) Patent No.: US 8,894,965 B2
(45) Date of Patent: Nov. 25, 2014

(54) ENERGY RECOVERY IN MANUFACTURE OF SULFURIC ACID

(71) Applicant: MECS Inc., Chesterfield, MO (US)

(72) Inventor: Ernesto Vera-Castaneda, Chesterfield, MO (US)

(73) Assignee: MECS IncMO (US)

( * ) Notice: Subject to any disclaimer, the term of this patent is extended or adjusted under 35 U.S.C. 154(b) by 0 days.

(21) Appl. No.: 14/081,621

(22) Filed: Nov. 15, 2013

(65) Prior Publication Data

US 2014/0079624 A1    Mar. 20, 2014

Related U.S. Application Data

(63) Continuation of application No. 13/574,023, filed as application No. PCT/US2011/021928 on Jan. 20, 2011, now Pat. No. 8,586,001.

(60) Provisional application No. 61/296,741, filed on Jan. 20, 2010, provisional application No. 61/382,882, filed on Sep. 14, 2010.

(51) Int. Cl.
  *C01B 17/74*  (2006.01)
  *C01B 17/775* (2006.01)
  *C01B 17/765* (2006.01)

(52) U.S. Cl.
  CPC ........... *C01B 17/775* (2013.01); *C01B 17/7655* (2013.01)
  USPC .......................................... 423/522; 423/529

(58) Field of Classification Search
  USPC ................................................ 423/522, 529
  See application file for complete search history.

(56) References Cited

U.S. PATENT DOCUMENTS

| | | | |
|---|---|---|---|
| 3,475,120 A * | 10/1969 | Benefield et al. | 423/522 |
| 3,536,446 A * | 10/1970 | Maurer | 423/522 |
| 4,478,809 A | 10/1984 | McAlister et al. | |
| 4,576,813 A | 3/1986 | McAlister et al. | |
| 4,670,242 A | 6/1987 | McAlister et al. | |
| 4,929,088 A | 5/1990 | Smith | |
| 4,996,038 A | 2/1991 | McAlister et al. | |
| 5,118,490 A | 6/1992 | McAlister | |
| 5,130,112 A * | 7/1992 | McAlister et al. | 423/522 |
| 5,538,707 A * | 7/1996 | McAlister | 423/522 |
| 5,593,652 A | 1/1997 | Peng | |
| 7,837,970 B2 | 11/2010 | Daum | |
| 8,586,001 B2 * | 11/2013 | Vera-Castaneda | 423/522 |

FOREIGN PATENT DOCUMENTS

WO    2008/064698 A1    6/2008
WO    2011139390 A2    11/2011

OTHER PUBLICATIONS

International Search Report and Written Opinion, PCT/US2011/021928, dated Nov. 29, 2011.

* cited by examiner

*Primary Examiner* — Timothy Vanoy

(57) ABSTRACT

This invention relates to the recovery of energy in the manufacture of sulfuric acid, and more particularly to enhanced recovery of energy from the absorption of wet $SO_3$ in sulfuric acid. The invention is further directed to control of mist formation during $SO_3$ absorption, and of the sulfuric acid mist content of the gas stream leaving the $SO_3$ absorption step in a process wherein $SO_3$ absorption energy is recovered from absorption acid in useful form.

51 Claims, 24 Drawing Sheets

ENERGY RECOVERY IN MANUFACTURE OF SULFURIC ACID

CROSS REFERENCE(S) TO RELATED APPLICATION(S)

This application represents a continuation of U.S. application Ser. No. 13/574,023 filed Aug. 14, 2012, now U.S. Pat. No. 8,586,001 B2, issued Nov. 19, 2013, which is a national filing under 35 U.S.C. 371 of International Application No. PCT/US11/021,928 filed Jan. 20, 2011, and claims priority of U.S. Provisional Application No. 61/296,741 filed Jan. 20, 2010 and U.S. Provisional Application No. 61/382,882 filed Sep. 14, 2010, the entire disclosures of which are incorporated herein by reference.

This invention relates to the recovery of energy in the manufacture of sulfuric acid, and more particularly to enhanced recovery of energy from the absorption of wet $SO_3$ in sulfuric acid. The invention is further directed to control of mist formation during $SO_3$ absorption, and of the sulfuric acid mist content of the gas stream leaving the $SO_3$ absorption step in a process wherein $SO_3$ absorption energy is recovered from absorption acid in useful form.

Twenty five years ago technology was developed for recovering in useful form the heat of absorption of $SO_3$ in sulfuric acid. Prior to that time, the heat of absorption could not be recovered in any useful form other than for district heating, because materials of construction issues limited the temperature at which an $SO_3$ absorber could be operated. Absorption acid coolers constructed of stainless steel were typically operated at a maximum inlet temperature in the neighborhood of 110° C.

U.S. Pat. Nos. 4,576,813 and 4,670,242 describe processes in which an $SO_3$ absorber and absorption acid cooler could be operated at temperatures of 120° C. and higher by maintaining the strength of the sulfuric acid stream exiting the absorber at a concentration of 98.5% or higher, preferably 99% or higher, and recovering the heat of absorption in a heat exchanger in which the heat transfer surfaces wetted by the acid were constructed of properly selected Fe/Cr alloys.

In the processes described in U.S. Pat. Nos. 4,576,813 and 4,670,242, sulfur is burned in dry air to produce a dry $SO_2$-bearing gas stream containing excess oxygen, and the $SO_2$ stream is passed through a converter to produce a dry $SO_3$-bearing gas stream that is directed to an absorption tower where it is contacted with sulfuric acid for high temperature absorption of the $SO_3$. Absorption acid from the high temperature tower, commonly referred to as a "heat recovery tower," is circulated through an external shell and tube heat exchanger comprising tubes constructed of an appropriate Fe/Cr alloy. In the heat exchanger, heat is transferred to a heat transfer fluid and recovered in useful form. In commercial implementation of the processes described in U.S. Pat. Nos. 4,576,813 and 4,670,242, heat transferred from the absorption acid generates medium pressure steam that is useful in power generation and/or in co-ordinate process operations.

Typically, the high temperature absorber functions as an interpass tower from which the $SO_3$-depleted $SO_2$ stream is returned to a further converter stage to produce an $SO_3$ gas stream that is then directed to a final absorption tower. To maximize $SO_3$ recovery and minimize sulfuric acid mist, the final absorption tower is ordinarily operated at relatively modest temperature, for example, about 80° C.

U.S. Pat. No. 5,118,490 describes the recovery of $SO_3$ absorption heat from "wet gas." In the process described in U.S. Pat. No. 5,118,490, $SO_3$ is generated by conversion of an $SO_2$ stream that has in turn been produced by combustion of sulfur with ambient air that has not been passed through a drying tower for removal of water vapor. Thus, the partial pressure of water vapor in the $SO_3$ stream reflects the humidity of the ambient air as diluted by the sulfur oxide gases generated in the combustion.

U.S. Pat. No. 5,130,112 describes a process in which the energy recovered from the $SO_3$ absorption operation is enhanced by injection of steam into the $SO_3$ conversion gas stream prior to absorption. After steam injection, the conversion gas is preferably passed through an economizer, more preferably a condensing economizer, prior to entry into the absorber. According to the generic disclosure, the proportion of steam injected into the gas stream can range up to 1.05 moles per mole $SO_3$. In the principal working example, steam injection increases the temperature of the $SO_3$ gas stream by about 30° C., but the temperature of this stream is reduced by nearly 100° C. in the condensing economizer upstream of the heat recovery absorption zone. Example 2 describes a corrosion test conducted in a pilot plant wherein 100% of dilution water for a heat recovery tower was supplied by steam injection.

U.S. Pat. No. 5,538,707 describes an $SO_3$ absorption heat recovery process wherein the concentration of acid exiting the absorber is controlled by regulating the rate of introduction of steam into the $SO_3$ conversion gas stream entering the absorption zone. The disclosure is directed to process control, primarily for purposes of minimizing corrosion of the absorption acid heat exchanger. In describing the advantages of the process claimed therein, U.S. Pat. No. 5,538,707 contrasts this process with a hypothetical alternative in which 100% of the dilution water is provided in a wet process gas. The latter option is criticized as making it impossible to control the acid concentration much above the azeotrope, i.e., between 98.8% and 99.2% with consequent adverse corrosion effects.

U.S. Pat. No. 4,996,038 describes a process in which dilution water can be added as a vapor to the circulating acid, optionally within the tower. Both U.S. Pat. No. 4,996,038 and U.S. Pat. No. 5,538,707 describe heat recovery in an absorption tower comprising a primary absorption zone into which the $SO_3$ gas stream is initially introduced and a secondary absorption zone, above the primary zone, in which the gas stream is cooled and residual $SO_3$ recovered.

Injection of steam into an $SO_3$ conversion gas stream entering a heat recovery tower has been practiced commercially within the United States. Because of various concerns, including corrosion of the absorption acid heat exchanger and generation of acid mist, the highest proportion of dilution water provided by steam injection into the conversion gas has been limited to about 33% in industrial operations within the United States.

Regardless of whether energy recovery is enhanced by injection of steam into the conversion gas entering the absorber, the potential for sulfuric acid mist formation in the gas stream is generally aggravated by operation of an $SO_3$ absorber at high temperature for recovery of absorption heat in useful form. High temperature operation increases the equilibrium concentrations of $SO_3$, sulfuric acid and water vapor in the gas stream. As the gas cools during flow countercurrently to the absorption acid in the absorber, and in the gas flow conduit downstream of the gas exit of the absorber, sulfuric acid condenses in fine droplets in the gas stream. Residual $SO_3$ combines with water in the gas stream to generate further quantities of sulfuric acid vapor which condenses to form additional mist. In both dry gas and wet gas operations, including but not limited to steam injection, mist has been a complex and often baffling problem. Where the heat recovery absorber functions as an interpass absorber, mist in the exit gas stream may deposit on downstream surfaces causing significant corrosion. Where the heat recovery absorber functions as a final absorber, the gas stream exiting the absorber is vented to the atmosphere where sulfuric acid mist becomes a pollutant.

SUMMARY OF THE INVENTION

In the contact sulfuric acid processes of the present invention, enhanced recovery of energy is obtained from the absorption zone wherein $SO_3$ is absorbed into sulfuric acid. Energy is recovered in useful form, for example, as intermediate pressure steam. Enhanced energy recovery is achieved while preserving control of corrosion at the heat exchange surfaces that are wetted with absorption acid, and without excessive or intolerable generation of acid mist. The quantity of intermediate pressure steam than can be generated from the absorption loop can be increased significantly, e.g., by up to 25% or more, compared to commercial processes in which no more than about 33% of dilution water has been supplied in the form of water vapor contained in the gas stream entering the absorber.

Briefly, the present invention is directed to a process for the preparation of sulfuric acid in which an oxygen-containing gas is contacted with a desiccant to provide a desiccated oxygen-containing gas. Sulfur and the desiccated oxygen-containing gas are introduced into a combustion zone. The oxygen content of the oxygen-containing gas introduced into the combustion zone is in stoichiometric excess relative the sulfur introduced into the zone. Sulfur is burned with oxygen of the desiccated gas to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby transforming the sulfur oxide-bearing gas stream into a conversion gas containing $SO_3$. The conversion gas is contacted in an absorption zone with an absorption liquid comprising sulfuric acid, thereby transferring sulfuric acid from the conversion gas to the absorption liquid. Water vapor is introduced into the sulfur oxide-bearing gas upstream of the absorption zone with respect to the direction of gas flow in a proportion sufficient to increase the equivalent water vapor content of the gas to at least about 0.55 moles per mole total equivalent sulfur oxide gas content prior to entry of the gas stream into the absorption zone. The absorption liquid is circulated between the absorption zone and an indirect heat exchanger in which heat generated by reaction of sulfur trioxide and water, condensation of sulfuric acid, and/or absorption of sulfur trioxide into the absorption liquid is transferred to a heat transfer fluid, thereby heating the heat transfer fluid to at least 150° C.

The invention is further directed to a process for the preparation of sulfuric acid in which sulfur is burned in a dry gas comprising excess oxygen to produce a sulfur oxide-bearing gas stream comprising a combustion gas comprising sulfur dioxide, oxygen and not more than 0.005 moles water vapor per mole $SO_2$. The sulfur oxide-bearing gas stream comprising the combustion gas is contacted with a catalyst for conversion of sulfur dioxide to sulfur trioxide, thereby converting the sulfur oxide-bearing gas stream to a conversion gas containing not more than 0.005 moles water vapor per mole $SO_3$. The conversion gas is contacted in an absorption zone with an absorption liquid comprising sulfuric acid, thereby transferring sulfuric acid from the conversion gas to the absorption liquid. Water vapor is introduced into the sulfur oxide-bearing gas upstream of the absorption zone with respect to the direction of gas flow in a proportion sufficient to increase the equivalent water vapor content of the gas to at least about 0.55 moles per mole total equivalent sulfur oxide gas content prior to entry of the gas stream into the absorption zone. The absorption liquid is circulated between the absorption zone and an indirect heat exchanger in which heat generated by reaction of sulfur trioxide and water, condensation of sulfuric acid, and/or absorption of sulfur trioxide into the absorption liquid is transferred to a heat transfer fluid, thereby heating the heat transfer fluid to at least 150° C.

The invention is further directed to a process for the preparation of sulfuric acid in which sulfur is burned in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream into a conversion gas containing sulfur trioxide. Water vapor is introduced into the sulfur oxide-bearing gas stream in a water vapor injection zone to increase the equivalent water vapor content of the gas to at least about 0.55 moles per mole total equivalent sulfur oxide gas content. In an absorption zone downstream of the water vapor injection zone with respect to the gas flow direction, the conversion gas is contacted with an absorption liquid comprising sulfuric acid, thereby transferring sulfuric acid from the conversion gas to the absorption liquid, the conversion gas being introduced into the absorption zone without intermediate condensation of any component of the sulfur oxide-bearing gas stream between the water vapor injection zone and the absorption zone. The absorption liquid is circulated between the absorption zone and an indirect heat exchanger in which heat generated by reaction of sulfur trioxide and water, condensation of sulfuric acid, and/or absorption of sulfur trioxide into the absorption liquid is transferred to a heat transfer fluid, thereby heating the heat transfer fluid to at least 150° C.

In a further aspect, the invention is directed to a process for the preparation of sulfuric acid comprising burning sulfur in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing sulfur trioxide. The conversion gas is contacted in an absorption zone with an absorption liquid comprising sulfuric acid, thereby transferring sulfuric acid from the conversion gas to the absorption liquid, the mass flow ratio of the absorption liquid entering the absorption zone to sulfur trioxide entering the absorption zone being at least about 30. Water vapor is introduced into the sulfur oxide-bearing gas upstream of the absorption zone with respect to the direction of gas flow in a proportion sufficient to increase the equivalent water vapor content of the gas to at least about 0.55 moles per mole total equivalent sulfur oxide gas content prior to entry of the gas stream into the absorption zone. The absorption liquid is circulated between the absorption zone and an indirect heat exchanger in which heat generated by reaction of sulfur trioxide and water, condensation of sulfuric acid, and/or absorption of sulfur trioxide into the absorption liquid is transferred to a heat transfer fluid, thereby heating the heat transfer fluid to at least 150° C.

In a further aspect, the invention is directed to a process for the preparation of sulfuric acid comprising burning sulfur in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing sulfur trioxide. The conversion gas is contacted in an absorption zone with an absorption liquid comprising sulfuric acid, thereby transferring sulfuric acid from the conversion gas to the absorption liquid. Water vapor is introduced into the sulfur oxide-bearing gas upstream of the absorption zone with respect to the direction of gas flow in a proportion sufficient to increase the equivalent water vapor content of the gas to at least about 0.55 moles per mole total equivalent sulfur oxide gas content prior to entry of the gas stream into the absorption zone. The absorption liquid is circulated between the absorption zone and a indirect heat exchanger in which heat generated by reaction of sulfur trioxide and water, condensation of sulfuric acid, and/or absorption of sulfur trioxide into the absorption liquid is transferred to a heat transfer fluid in a quantity of at least about 1160 KJ per Kilogram (500 Btu per pound) of equivalent $SO_3$ entering the absorption zone, thereby heating the heat transfer fluid to at least 150° C.

The invention is also directed to a process for the preparation of sulfuric acid comprising burning sulfur in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted in a primary absorption heat recovery zone with a primary absorption liquid comprising sulfuric acid, thereby transferring sulfuric acid from the conversion gas to the primary absorption liquid. The absorption liquid is circulated between the primary absorption zone and an indirect heat exchanger in which heat generated by reaction of sulfur trioxide and water, condensation of sulfuric acid, and/or absorption of sulfur trioxide into the primary absorption liquid is transferred to a heat transfer fluid, thereby heating the heat transfer fluid to at least 150° C. The gas stream exiting the primary absorption zone is contacted with a secondary absorption liquid comprising sulfuric acid in a secondary absorption zone, thereby recovering residual $SO_3$ as sulfuric acid in the secondary absorption liquid. The concentration and temperature of the acid stream exiting the primary absorption zone and the temperature and dew point of the conversion gas stream entering the primary absorption zone are such as to enable controlling the gas stream leaving the secondary absorption zone to contain not more than 20 g/Nm$^3$ preferably not more than 15, 10, 5 or 1.0 g/Nm$^3$ sulfuric acid mist. In preferred embodiments, water vapor is introduced into the sulfur oxide-bearing gas upstream of the primary absorption zone with respect to the direction of gas flow in a proportion sufficient to increase the equivalent water vapor content of the gas to at least about 0.55 moles per mole total equivalent sulfur oxide gas content prior to entry of the gas stream into the primary absorption zone. However, control of mist is applicable to embodiments in which the conversion gas is either desiccated or contains only atmospheric moisture, in addition to embodiments in which water vapor is injected into the gas entering the absorber. In further preferred embodiments, with or without addition of water vapor to the conversion gas, the gas stream exiting the secondary absorption zone is passed through a mist eliminator system at a rate of at least 340 Nm$^3$ per hour per square meter of mist eliminator element surface area transverse to the direction of gas flow, the gas exiting the mist eliminator system containing less than 0.05 g/Nm$^3$ acid mist.

In a still further aspect, the invention is directed to a process for the preparation of sulfuric acid comprising burning sulfur in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted in a primary absorption heat recovery zone with a primary absorption liquid comprising sulfuric acid, thereby transferring sulfuric acid from the conversion gas to the primary absorption liquid. The primary absorption liquid is circulated between the absorption zone and an indirect heat exchanger in which heat generated by reaction of sulfur trioxide and water, condensation of sulfuric acid, and/or absorption of sulfur trioxide into the primary absorption liquid is transferred to a heat transfer fluid, thereby heating the heat transfer fluid to at least 150° C. The gas stream exiting the primary absorption zone is contacted with a secondary absorption liquid comprising sulfuric acid in a secondary absorption zone, thereby recovering residual $SO_3$ as sulfuric acid in the secondary absorption liquid, the concentration and temperature of the primary absorption liquid exiting the primary absorption zone and the temperature and dew point of the conversion gas stream entering the primary absorption zone being such as to enable controlling the gas stream leaving the secondary absorption zone to contain not more than 20 g/Nm$^3$ preferably not more than 15, 10, 5 or 1.0 g/Nm$^3$ sulfuric acid mist. The gas stream exiting the absorption zone is passed through a mist eliminator system at a rate of not greater than 500 Nm$^3$/hr per square meter of mist eliminator element surface area transverse to the direction of gas flow, the gas exiting the mist eliminator system containing less than 0.05 g/Nm$^3$ acid mist. In preferred embodiments, water vapor is introduced into the sulfur oxide-bearing gas upstream of the primary absorption zone with respect to the direction of gas flow in a proportion sufficient to increase the equivalent water vapor content of the gas to at least about 0.55 moles per mole total sulfur oxide gas content prior to entry of the gas stream into the primary absorption zone. However, mist control features of the invention are equally applicable to processes in which the conversion gas is dry or contains only atmospheric moisture.

The invention is still further directed to a process for the preparation of sulfuric acid comprising burning sulfur in a gas comprising excess oxygen to produce a sulfur oxide-bearing gas stream comprising a combustion gas comprising sulfur dioxide. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. Water vapor is introduced into the conversion gas in a proportion sufficient to increase the temperature of the conversion gas to between about 300° C. and about 330° C. The conversion gas is introduced into an absorption zone at a temperature between about 300° C. and 330° C. The conversion gas is contacted in the absorption zone with an absorption liquid comprising sulfuric acid, thereby transferring sulfuric acid from the conversion gas to the absorption liquid. The absorption liquid is circulated between the absorption zone and an indirect heat exchanger in which heat generated by reaction of sulfur trioxide and water, condensation of sulfuric acid, and/or absorption of sulfur trioxide into the absorption liquid is transferred to a heat transfer fluid, thereby heating the heat transfer fluid to at least 150° C.

The invention is further directed to a process for the preparation of sulfuric acid comprising burning sulfur in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted in an absorption zone with an absorption liquid comprising sulfuric acid, thereby transferring sulfuric acid from the conversion gas to the absorption liquid. Water vapor is introduced into the sulfur oxide-bearing gas upstream of the absorption zone with respect to the direction of gas flow in a proportion sufficient to increase the equivalent water vapor content of the gas to at least about 0.55 moles per mole total equivalent sulfur oxide gas content prior to entry of the gas stream into the absorption zone. The absorption liquid is circulated between the absorption zone and both a principal indirect heat exchanger and an auxiliary indirect heat exchanger, in each of which heat exchangers heat generated by reaction of sulfur trioxide and water, condensation of sulfuric acid, and/or absorption of sulfur trioxide into the absorption liquid is transferred from the circulating absorption liquid. Heat is transferred to a principal heat transfer fluid in the principal heat exchanger, thereby heating the principal heat transfer fluid to at least 150° C. Heat is transferred to a water stream in the auxiliary heat exchanger, thereby generating the water vapor for injection into the sulfur oxide-bearing gas stream upstream of the absorption zone.

The invention is still further directed to a process for the preparation of sulfuric acid comprising burning sulfur in a dry gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted in an absorption zone with an absorption liquid comprising sulfuric acid, thereby transferring sulfuric acid from the conversion gas to the absorption liquid. Water vapor is introduced into the sulfur oxide-bearing gas upstream of the absorption zone with respect to the direction of gas flow in a proportion sufficient to provide a sulfuric acid vapor content of at least 0.4 moles per mole sulfur trioxide in the conversion gas entering the absorption zone. The absorption liquid is circulated between the absorption zone and an indirect heat exchanger in which heat generated by reaction of sulfur trioxide and water, condensation of sulfuric acid, and/or absorption of sulfur trioxide into the absorption liquid is transferred to a heat transfer fluid, thereby heating the heat transfer fluid to at least 150° C.

In a still further aspect, the invention is directed to a process for the preparation of sulfuric acid comprising burning sulfur in a dry gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted in an absorption zone with an absorption liquid comprising sulfuric acid, thereby transferring sulfuric acid from the conversion gas to the absorption liquid. Water vapor is introduced into the sulfur oxide-bearing gas upstream of the absorption zone with respect to the direction of gas flow, the proportion of water vapor introduced into the sulfur oxide-bearing gas stream, the sulfuric acid strength and temperature of the absorption liquid introduced into the absorption zone, and the L/G ratio in the absorption zone being such that the molar ratio of sulfuric acid vapor to $SO_3$ reaches a maximum of at least about 1.2 at a location within the absorption zone intermediate the gas inlet and gas exit thereof. The absorption liquid is circulated between the absorption zone and an indirect heat exchanger in which heat generated by reaction of sulfur trioxide and water, condensation of sulfuric acid, and/or absorption of sulfur trioxide into the absorption liquid is transferred to a heat transfer fluid, thereby heating the heat transfer fluid to at least 150° C.

In further embodiments, the invention is directed to a process for the preparation of sulfuric acid comprising burning a source of sulfur in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted in a primary absorption heat recovery zone with a primary absorption liquid comprising sulfuric acid, thereby transferring sulfuric acid from the conversion gas to the primary absorption liquid. The absorption liquid is circulated between the primary absorption zone and an indirect heat exchanger in which heat generated by reaction of sulfur trioxide and water, condensation of sulfuric acid, and/or absorption of sulfur trioxide into the primary absorption liquid is transferred to a heat transfer fluid, thereby heating the heat transfer fluid to at least 150° C. The gas stream exiting the primary absorption zone is contacted with a secondary absorption liquid comprising sulfuric acid in a secondary absorption zone, thereby recovering residual $SO_3$ as sulfuric acid in the secondary absorption liquid, the mass flow ratio of the secondary absorption liquid entering the absorption zone to total gas flow entering the secondary absorption zone being between about 0.4 and about 5. In preferred embodiments, water vapor is introduced into the sulfur oxide-bearing gas upstream of the primary absorption zone with respect to the direction of gas flow in a proportion sufficient to increase the equivalent water vapor content of the gas to at least about 0.55 moles per mole total equivalent sulfur oxide gas content prior to entry of the gas stream into the primary absorption zone. However, control of mist is applicable to embodiments in which the gas is either desiccated or contains only atmospheric moisture, in addition to embodiments in which water vapor is injected into the gas entering the absorber.

The invention is further directed to a process for the preparation of sulfuric acid comprising burning a source of sulfur in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted in a primary absorption heat recovery zone with a primary absorption liquid comprising sulfuric acid, thereby transferring sulfuric acid from the conversion gas to the primary absorption liquid. Optionally, water vapor is introduced into the sulfur oxide-bearing gas upstream of the primary absorption zone with respect to the direction of gas flow in a proportion sufficient to increase the equivalent water vapor content of the gas to at least about 0.40 moles per mole total equivalent sulfur oxide gas content prior to entry of the gas stream into the primary absorption zone. The absorption liquid is circulated between the primary absorption zone and an indirect heat exchanger in which heat generated by reaction of sulfur trioxide and water, condensation of sulfuric acid, and/or absorption of sulfur trioxide into the primary absorption liquid is transferred to a heat transfer fluid, thereby heating the heat transfer fluid to at least 150° C. The gas stream exiting the primary absorption zone is contacted with a secondary absorption liquid comprising sulfuric acid in a secondary absorption zone, thereby recovering residual $SO_3$ as sulfuric acid in the secondary absorption liquid. The relative flow rates of the gas stream entering the secondary absorption zone and the secondary absorption liquid stream entering the secondary absorption zone are such that the maximum local integrated average difference between the temperature of the gas phase and the temperature of the secondary absorption liquid phase with which the gas is in contact is not greater than 35° C., such local integrated average contact temperature difference being determined by integration across any locus of gas/liquid contact within the zone that is defined by a constant distance from the liquid inlet to the zone. In both those embodiments which comprise injection of water vapor into the gas stream entering the primary absorption zone and those which do not, control of the Δt between the gas stream and the acid stream in the secondary absorption zone is effective for control of acid mist exiting the secondary absorption zone.

In a further aspect, the invention is directed to a process for the preparation of sulfuric acid comprising burning a source of sulfur in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted in a primary absorption heat recovery zone with a primary absorption liquid comprising sulfuric acid, thereby transferring sulfuric acid from the conversion gas to the primary absorption liquid. Optionally, water vapor is introduced into the sulfur oxide-bearing gas upstream of the primary absorption zone with respect to the direction of gas flow in a proportion sufficient to increase the equivalent water vapor content of the gas to at least about 0.40 moles per mole total equivalent sulfur oxide gas content prior to entry of the gas stream into the primary absorption zone. The absorption liquid is circulated between the primary absorption zone and an indirect heat exchanger in which heat generated by reaction of sulfur trioxide and water, condensation of sulfuric acid, and/or absorption of sulfur trioxide into the primary absorption liquid is transferred to a heat transfer fluid, thereby heating the heat transfer fluid to at least 150° C. The gas stream exiting the primary absorption zone is contacted with a secondary absorption liquid comprising sulfuric acid in a secondary absorption zone, thereby recovering residual $SO_3$ as sulfuric acid in the secondary absorption liquid. The relative flow rates of the gas stream entering the secondary absorption zone and the secondary absorption liquid stream entering the secondary absorption zone is such that the maximum difference between the local bulk temperature of the gas phase and the local bulk temperature of the secondary absorption liquid phase with which the gas is in contact is not greater than 35° C. within any locus of gas/liquid contact within the zone that is defined by a constant distance from the liquid inlet to the zone. Enhanced mist control is achieved in both those embodiments which comprise water vapor injection and those which do not.

The invention is still further directed to a process for the preparation of sulfuric acid comprising burning a source of sulfur in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted in a primary absorption heat recovery zone with a primary absorption liquid comprising sulfuric acid, thereby transferring sulfuric acid from the conversion gas to the primary absorption liquid. Optionally, water vapor is introduced into the sulfur oxide-bearing gas upstream of the primary absorption zone with respect to the direction of gas flow in a proportion sufficient to increase the equivalent water vapor content of the gas to at least about 0.40 moles per mole total equivalent sulfur oxide gas content prior to entry of the gas stream into the primary absorption zone. The absorption liquid is circulated between the primary absorption zone and an indirect heat exchanger in which heat generated by reaction of sulfur trioxide and water, condensation of sulfuric acid, and/or absorption of sulfur trioxide into the primary absorption liquid is transferred to a heat transfer fluid, thereby heating the heat transfer fluid to at least 150° C. The gas stream exiting the primary absorption zone is contacted with a secondary absorption liquid comprising sulfuric acid in a secondary absorption zone, thereby recovering residual $SO_3$ as sulfuric acid in the secondary absorption liquid. The relative flow rates of the gas stream entering the secondary absorption zone and the secondary absorption liquid stream entering the secondary absorption zone are such that the difference between the local bulk temperature of the gas phase and the local bulk temperature of the secondary absorption liquid phase with which the gas is in contact is not greater than 35° C. at either the liquid inlet or liquid exit of the secondary absorption zone. Enhanced mist control is achieved in both those embodiments which comprise water vapor injection and those which do not.

The invention is further directed to process for the manufacture of sulfuric acid comprising burning a source of sulfur in air or oxygen-enriched air to produce a combustion gas comprising sulfur dioxide and excess unreacted oxygen. The combustion gas is passed over a catalyst for the conversion of sulfur dioxide to sulfur trioxide, thereby producing a conversion gas containing sulfur trioxide. The conversion gas is contacted in a heat recovery absorption zone with an absorption liquid comprising concentrated sulfuric acid, the gas phase stream in the absorption zone being passed through the zone countercurrently to absorption liquid stream, the temperature of gas and liquid streams decreasing from the gas inlet to the gas outlet of the zone. The sulfuric acid concentration of the absorption liquid is controlled so that that the difference between the absorption liquid concentration and the azeotrope is not more than about +1.0 wt. % throughout the heat recovery absorption zone.

The invention is still further directed to a process for the manufacture of sulfuric acid comprising burning a source of sulfur in air or oxygen-enriched air to produce a combustion gas comprising sulfur dioxide and excess unreacted oxygen, and passing the combustion gas over a catalyst for the conversion of sulfur dioxide to sulfur trioxide, thereby producing a conversion gas containing sulfur trioxide. The conversion gas is contacted in a heat recovery absorption zone with an absorption liquid comprising concentrated sulfuric acid, the gas phase stream in the absorption zone being passed through the zone countercurrently to absorption liquid stream, the temperature of gas and liquid streams decreasing from the gas inlet to the gas outlet of the zone. The sulfuric acid concentration of the absorption liquid is controlled so that the difference between the absorption liquid concentration and the azeotrope at the gas exit is not less than about −0.1 wt. %.

The invention is still further directed to a process for the preparation of sulfuric acid comprising burning elemental sulfur in a dry gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted with a primary absorption liquid comprising sulfuric acid in a primary absorption (heat recovery) zone, thereby transferring sulfuric acid from the conversion gas to the primary absorption liquid. Water vapor is introduced into the conversion gas upstream of the primary absorption zone with respect to the gas flow direction. Preferably, water is introduced downstream of any heat exchangers for recovering useful energy from the conversion gas at a rate of more than 30 Btu per pound of equivalent $SO_3$ in the conversion gas. The introduction of water vapor is in a proportion sufficient to increase the equivalent water vapor content of the gas to between about 0.55 and about 0.98 moles per mole total equivalent sulfur oxide gas content in the gas entering the primary absorption zone, whereby the temperature of the conversion gas entering the primary absorption zone is between about 290° and about 340° C. and at least about 40° C. in excess of its dew point, and the proportion of water vapor introduced into the sulfur oxide-bearing gas stream, the sulfuric acid strength and temperature of the absorption liquid introduced into the absorption zone, and the L/G ratio in the absorption zone are such that the molar ratio of sulfuric acid vapor to $SO_3$ reaches a maximum of at least about 1.2 at a location within the absorption zone intermediate the gas inlet and gas exit thereof. The absorption liquid is circulated between the primary absorption zone and an indirect heat exchanger in which heat generated by reaction of sulfur trioxide and water, condensation of sulfuric acid, and/or absorption of sulfur trioxide into the primary absorption liquid is transferred to boiler feed water in the indirect heat exchanger, thereby generating at least 0.55 tons of steam at a pressure of at least 0.4 MPascal (4 bar) per ton of sulfuric acid produced by absorption of $SO_3$ in the primary absorption liquid in the primary absorption zone. The sulfuric acid concentration of the absorption liquid is controlled so that that the difference between the absorption liquid concentration and the azeotrope is not less than about −0.2 wt. % or greater than about +1.0 wt. % throughout the primary absorption zone. The relative flow of primary absorption acid and conversion gas in the primary absorption zone are controlled so that the L/G on an equivalent $SO_3$ basis within the zone is between about 20 and about 70. The gas stream exiting the primary absorption zone is contacted with a secondary absorption liquid comprising sulfuric acid in a secondary absorption zone, residual $SO_3$ contained in the gas stream entering the secondary absorption zone being recovered as sulfuric acid in the secondary absorption liquid. The concentration and temperature of the acid stream exiting the primary absorption zone and the temperature and dew point of the conversion gas stream entering the primary absorption zone are such as to enable controlling the gas stream leaving the secondary absorption zone to contain not more than 20 g/Nm³ sulfuric acid mist, wherein the relative flow rates of the gas stream entering the secondary absorption zone and the secondary absorption liquid stream entering the secondary absorption zone is such that the difference between the local bulk temperature of the gas phase and the local bulk temperature of the secondary absorption liquid phase with which the gas is in contact is between about 15° and about 35° C. at both the liquid inlet or liquid exit of the secondary absorption zone. The gas stream exiting the secondary absorption zone is passed through a mist eliminator system at a rate of at least 300 Nm³ per hour per square meter of mist eliminator element surface area transverse to the direction of gas flow, the gas exiting the mist eliminator system containing less than 0.1 g/Nm³ acid mist.

The invention is still further directed to a process for the preparation of sulfuric acid comprising burning a sulfur source in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted in a heat recovery absorption zone with an absorption liquid comprising sulfuric acid, thereby transferring sulfur trioxide from the conversion gas to the absorption liquid. The absorption liquid is circulated between the absorption zone and a principal indirect heat exchanger in which heat is transferred to a principal heat transfer fluid, thereby heating the principal heat transfer fluid to at least 150° C. The absorption liquid stream exiting the principal heat exchanger is divided to provide a principal absorption liquid stream that is recirculated to the heat recovery absorption zone and an auxiliary absorption liquid stream. The auxiliary liquid stream is passed through an indirect heat exchanger auxiliary to a boiler feed water deaerator, heat being transferred in the deaerator auxiliary heat exchanger from the auxiliary liquid to a water stream for generation of deaerating steam. The deaerating steam is directed to the deaerator wherein boiler feed water is contacted with the deaerating steam for stripping non-condensables from the boiler feed water. A deaerator exhaust stream is removed from the deaerator, the deaerator exhaust stream comprising water vapor and non-condensable gases.

The invention is still further directed to a process for the preparation of sulfuric acid in a contact sulfuric acid manufacturing facility comprising an interpass absorber wherein the facility is retrofitted to be operated in accordance with a process that recovers the heat of absorption of $SO_3$ in useful form at a temperature of at least about 150° C. The process comprises burning a source of sulfur in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted in a primary absorption zone with a primary absorption liquid comprising sulfuric acid, thereby absorbing sulfur trioxide and/or transferring sulfuric acid from the conversion gas to the primary absorption liquid. The absorption liquid is circulated between the primary absorption zone and an indirect heat exchanger in which heat generated by reaction of sulfur trioxide and water, condensation of sulfuric acid, and/or absorption of sulfur trioxide into the primary absorption liquid is transferred to a heat transfer fluid, thereby heating the heat transfer fluid to at least 150° C. The gas stream exiting the primary absorption zone is contacted with a secondary absorption liquid comprising sulfuric acid in a secondary absorption zone, residual $SO_3$ contained in the gas stream entering the secondary absorption zone being recovered as sulfuric acid in the secondary absorption liquid. The secondary absorption zone is comprised by an interpass absorber existing in the facility prior to the retrofit, and the mass flow ratio of the secondary absorption liquid to gas in the secondary absorption zone is between about 1.0 and about 7.0 or between about 14 and about 18.

The invention is still further directed to a method for retrofitting an existing contact sulfuric acid plant comprising an interpass absorber for recovery at high temperature of the heat of absorption of $SO_3$ in sulfuric acid. The method comprises installing (1) a new absorber for receiving converter gas comprising sulfur trioxide, the new absorber comprising a primary absorption zone designed for high temperature absorption of $SO_3$ in a primary absorption liquid comprising sulfuric acid to produce additional sulfuric acid therein; (2) a high temperature heat exchanger designed for transfer of the heat of $SO_3$ absorption from the primary absorption liquid to another fluid and thereby heat the other fluid to a temperature of at least about 150° C.; (3) means for circulating the primary absorption liquid between the primary absorption zone and the high temperature heat exchanger; (4) conduit for directing the gas stream exiting the high temperature absorber to an inlet of the existing interpass absorber; and (5) means for circulating a secondary absorption liquid through the existing interpass absorber wherein residual $SO_3$ can be removed from the gas stream exiting the primary absorption zone by transfer to the secondary absorption liquid, the means for circulating the secondary absorption liquid being sized and/or subject to flow control instrumentalities such that the mass flow ratio of the secondary absorption liquid to gas in the secondary absorption zone is between about 1.0 and about 7.0 or between about 14 and about 18.

The invention is further directed to a process for the preparation of sulfuric acid comprising burning a source of sulfur in a gas comprising excess oxygen to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby converting the sulfur oxide-bearing gas stream to a conversion gas containing $SO_3$. The conversion gas is contacted in a primary absorption (heat recovery) zone with a primary absorption liquid comprising sulfuric acid, thereby transferring sulfuric acid from the conversion gas to the primary absorption liquid. Water vapor is introduced into the sulfur oxide-bearing gas upstream of the primary absorption zone with respect to the gas flow direction in a proportion sufficient to increase the equivalent water vapor content to at least about 0.40 moles per mole total equivalent sulfur oxide gas content in the gas entering the primary absorption zone. The primary absorption liquid is circulated between the primary absorption zone and an indirect heat exchanger in which heat generated by reaction of sulfur trioxide and water, condensation of sulfuric acid, and/or absorption of sulfur trioxide into the primary absorption liquid is transferred to a heat transfer fluid, thereby heating the heat transfer fluid to at least 150° C. The gas stream exiting the primary absorption zone is contacted with a secondary absorption liquid comprising sulfuric acid in a secondary absorption zone, residual $SO_3$ contained in the gas stream entering the secondary absorption zone being recovered as sulfuric acid in the secondary absorption liquid. The rate of delivery of secondary absorption acid to the secondary absorption zone is controlled to maintain the difference between the local bulk temperature of the gas phase and the local bulk temperature of the secondary absorption liquid phase with which the gas is in contact not greater than about 35° C. at both the liquid inlet and liquid exit of the secondary absorption zone. The concentration of the secondary absorption acid entering the secondary absorption zone is controlled to provide a net available water supply to the secondary zone sufficient to assure that the composition of the gas exiting the secondary absorption zone is equal to or above the azeotrope composition with respect to water content and equal to or below the azeotrope composition with respect to $SO_3$ content.

The invention is further directed to a process for the preparation of sulfuric acid comprising contacting an oxygen-containing gas with a desiccant to provide a desiccated oxygen-containing gas. Sulfur and the desiccated oxygen-containing gas are introduced into a combustion zone. The oxygen content of the oxygen-containing gas introduced into the combustion zone is in stoichiometric excess relative the sulfur introduced into the zone. Sulfur is burned with oxygen of the desiccated gas to produce a sulfur oxide-bearing gas stream comprising a combustion gas comprising sulfur dioxide and oxygen. The sulfur oxide-bearing gas stream comprising the combustion gas is contacted with a catalyst for conversion of sulfur dioxide to sulfur trioxide, thereby transforming the sulfur oxide-bearing gas stream into a conversion gas containing $SO_3$. The conversion gas is contacted in a heat recovery absorption zone with an absorption liquid comprising sulfuric acid, thereby transferring sulfuric acid from the conversion gas to the absorption liquid. Water vapor is introduced into the sulfur oxide-bearing gas upstream of the absorption zone with respect to the direction of sulfur oxide-bearing gas flow in a proportion sufficient to increase the equivalent water vapor content of the gas to at least about 0.55 moles per mole total equivalent sulfur oxide gas content prior to entry of the gas stream into the absorption zone. The absorption liquid is circulated between the absorption zone and an indirect heat exchanger in which heat generated by reaction of sulfur trioxide and water, condensation of sulfuric acid, and/or absorption of sulfur trioxide into the absorption liquid is transferred to a heat transfer fluid, thereby heating the heat transfer fluid to at least 150° C.

BRIEF DESCRIPTION OF THE DRAWINGS

Corresponding reference characters indicate corresponding components in the several views of the drawings.

DESCRIPTION OF THE PREFERRED EMBODIMENTS

Figure 1:
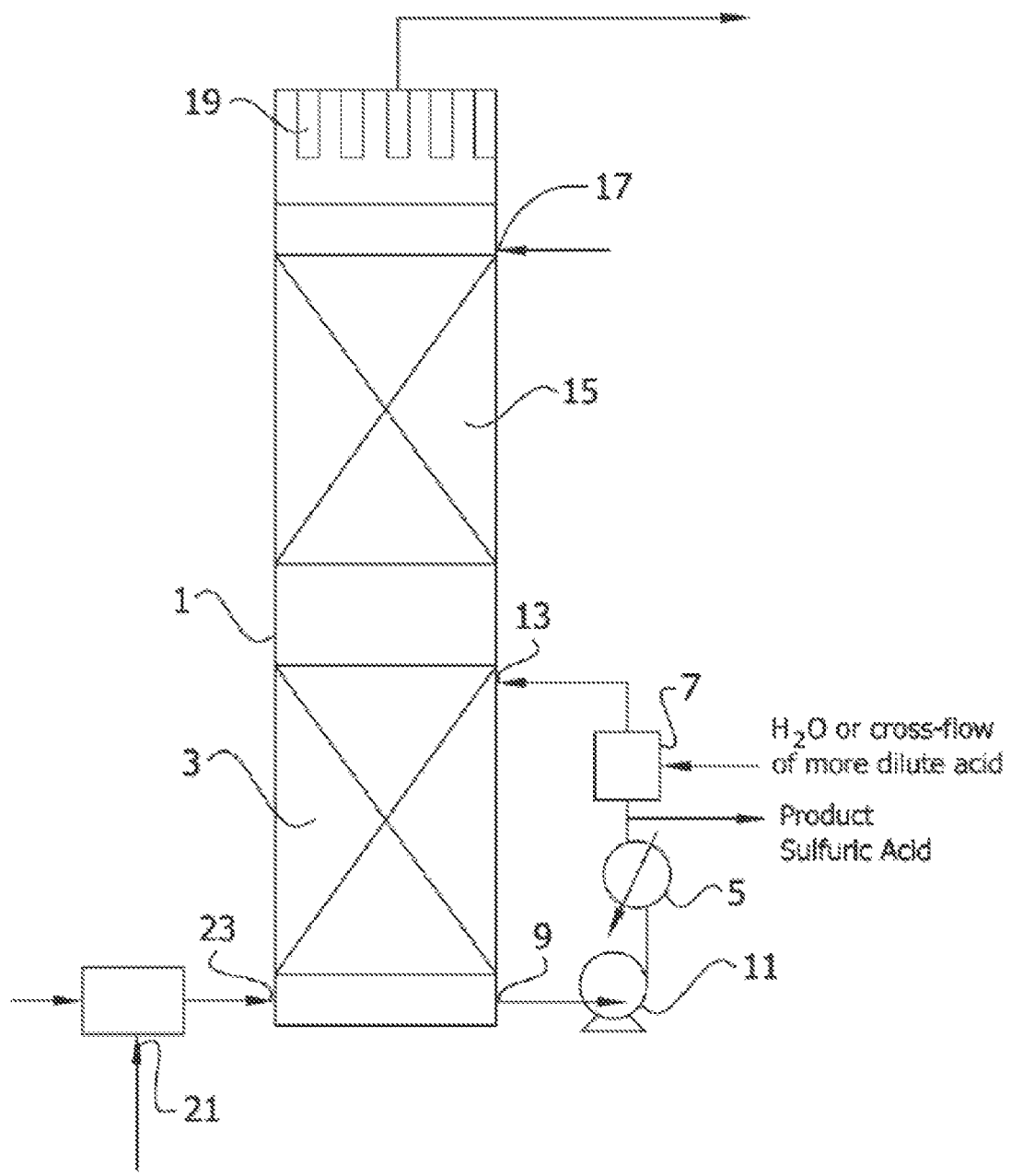
FIG. 1 is a process flow sheet for a prior art $SO_3$ absorption and absorption energy recovery system comprising primary and secondary countercurrent absorption zones, in which up to about one third of reaction water is supplied by injection of steam into the $SO_3$-bearing stream entering the primary zone.

In a contact sulfuric acid plant, a gas stream containing $SO_2$ and oxygen is contacted with a catalyst that promotes oxidation of $SO_2$ to $SO_3$. Typically, the $SO_2$-bearing gas stream is produced by combustion of elemental sulfur. However, the $SO_2$-bearing stream can also be produced in the roasting of metal ores, e.g., pyrite, or by combustion of other sulfur-bearing compounds, or in the regeneration of spent acid wherein $SO_2$ is generated by decomposition of the acid. $SO_3$ in the conversion gas is then recovered by absorption in strong sulfuric acid. Where the resultant heat of absorption is recovered from the absorption acid by transfer to another fluid, the quantity of heat recovered can be enhanced by injection of water vapor into the $SO_3$-bearing gas stream entering the absorber.

Injection of water vapor into a sulfur oxide-bearing gas stream in a contact sulfuric acid manufacturing plant results in vapor phase reaction of $SO_3$ and water to form $H_2SO_4$ in the vapor phase. Water vapor can be injected either directly into an $SO_3$-bearing conversion gas or into the $SO_2$-bearing combustion gas upstream of the converter. In either case, the water vapor reacts with $SO_3$ that is already present in the gas, or after it is formed. In various preferred embodiments of the process of the present invention, water vapor is injected into the $SO_3$-bearing conversion gas rather than the $SO_2$-bearing gas upstream of the converter, and more preferably water vapor is injected downstream of heat exchangers in which the heat of reaction of $SO_2$ and oxygen is recovered.

The vapor phase reaction of $SO_3$ and water is a highly exothermic reaction which increases the temperature of the gas. The vapor phase reaction is also an equilibrium reaction in which the conversion to $H_2SO_4$ varies inversely with temperature. When a gas stream comprising vapor phase $H_2SO_4$, $SO_3$ and water vapor is brought into contact with sulfuric acid, several phenomena occur, each of which generates substantial energy and thereby increases the temperature of the liquid phase. These include condensation of $H_2SO_4$, absorption of $SO_3$, condensation of water vapor, liquid phase reaction of $SO_3$ and water, and, typically, transfer of sensible heat from the gas phase to the liquid phase. Where heat is transferred from the liquid phase, i.e., the absorption acid, to a heat transfer fluid, the vapor phase heat of reaction of $SO_3$ and water, the heat of condensation of $H_2SO_4$, the heat of condensation of $SO_3$, and the heat of absorption, i.e., the liquid phase heat of reaction of $SO_3$ and water, may all be recovered in useful form.

Thus, the injection of water vapor into the $SO_3$-bearing conversion gas or $SO_2$-bearing combustion gas upstream of the absorber provides substantial enhancement of the quantity of energy that may be recovered at high temperature where the absorber and its associated acid cooler are operated at high temperature.

Prior to the present invention, however, the extent of steam injection has been limited by concerns that excessive corrosion of the acid cooler and/or excessive sulfuric acid mist generation would be incurred if steam were injected in a proportion greater than about 33% of stoichiometric reaction water requirement, i.e., if steam were injected in a proportion sufficient to raise the molar ratio of equivalent moisture vapor content to equivalent $SO_3$ content to a value more than about 0.33 in the gas entering the absorber.

The water added for reaction with $SO_3$ is sometimes referred to herein as the dilution water since in conventional practice the circulating absorption acid stream is diluted with water at a rate stoichiometrically equivalent to the rate of introduction of $SO_3$ into the absorption zone. The acid strength then progressively rises as the absorption acid passes through the absorption zone and absorbs $SO_3$ from the gas stream to produce sulfuric acid in the liquid by reaction with the dilution water. Thus, the acid exiting the absorber is at the target concentration of the absorption step, yielding an absorption acid stream that is divided into a product acid stream that is removed from the system and a recirculating acid stream that is diluted with water prior to introduction into the absorption zone.

Introduction of the reaction water into the $SO_3$-bearing gas stream ahead of the absorption zone reduces the acid concentration gradient across the absorption zone. When 100% of reaction water is introduced into the $SO_3$ stream in the form of water vapor, the concentration gradient across the absorption zone is entirely eliminated, i.e., there is no dilution as such, but rather a constant acid strength in the liquid phase throughout the zone. If this concentration is maintained at a value that is too low, excessive corrosion can be experienced in an alloy absorption vessel. If the concentration is too high, unabsorbed $SO_3$ can pass through the absorber, thereby reducing yield, creating substantial sulfuric acid mist when the gas is cooled downstream of the absorber, and/or inhibiting conversion in a downstream catalytic contact zone.

However, in accordance with the present invention, it has been discovered that enhanced quantities of energy can be recovered from an absorption system by introducing increased proportions of reaction water via injection of water vapor into the $SO_2$ or $SO_3$-bearing gas stream upstream of the absorption system. Moreover, the process can be operated to achieve substantially enhanced energy recovery from the absorption system without excessive corrosion, and without excessive generation of acid mist. These favorable results accrue from identification, co-ordination and control of combinations of process variables affecting the response of the absorption system to the introduction of water vapor into the $SO_2$ or $SO_3$-bearing gas stream. The appropriate conditions are selected in view of data on the composition and temperature of the $SO_3$-bearing gas stream as a function of the proportion of the dilution water introduced into this stream ahead of the absorption system, and in view of data on the azeotropic composition as a function of temperature.

Increasing the proportion of the dilution water supplied by injection of water vapor into the gas upstream of the heat recovery absorption zone enables a substantial increase in the energy ultimately recovered from the absorption system. This mode of operation provides a high gas temperature and a high gas enthalpy resulting from the formation of product sulfuric acid in the vapor phase. Sensible heat and latent heat of evaporation of sulfuric acid are recovered in useful form from the gas phase in the heat recovery absorber heat exchanger, typically by generation of intermediate pressure steam. In accordance with the process of the invention, the rate of heat recovery can be increased by as much as 25% from the highest rate of useful heat recovery from $SO_3$ absorption systems as obtained on an industrial scale in operations in the United States. For example, whereas intermediate pressure steam at 0.3 MPascals (3 bar) gauge or greater, typically 0.7 MPascals (7 bar) gauge or greater, is generated at a rate of 0.48 tons per ton of net sulfuric acid production in an absorption system wherein ⅓ of the requisite dilution water is provided by steam injection into the gas stream ahead of the absorber, the rate of energy recovery can be increased to as high as 0.6 to 0.9 tons intermediate pressure steam per ton sulfuric acid produced where the proportion of reaction water provided by steam injection is increased to 95-100% and the concentration gradient in the heat recovery absorption zone is decreased to 0.2 wt. % or less. Where 100% or more of the reaction water is provided in the form of steam injected upstream of the heat recovery absorption zone, there is a further significant capital and maintenance expense saving in eliminating the diluter vessel.

Illustrated in FIG. 1 is a prior art $SO_3$ absorption and absorption energy recovery system in which up to about 33% of the dilution water is provided by injection of steam into the $SO_3$-bearing gas stream entering the system. Upstream of the $SO_3$ absorption and absorption energy recovery system with respect to the flow of sulfur oxide-bearing gas to the system, an $SO_2$-bearing gas stream is produced by burning sulfur in an excess of air. Alternatively, an $SO_2$-bearing stream can be produced in a metallurgical plant, typically by roasting of a sulfidic ore. The SO$_2$-bearing stream, which contains unconsumed oxygen in a proportion at least stoichiometrically equivalent to the SO$_2$, is passed through a catalytic converter where a high proportion of the SO$_2$ is converted to SO$_3$ by catalytic reaction with oxygen in the gas, thus producing a conversion gas comprising SO$_3$. Oxidation of SO$_2$ to SO$_3$ generates substantial heat of reaction which is at least partially recovered by passing the SO$_3$-bearing conversion gas through one or more heat exchangers, e.g., a waste heat boiler, steam superheater and/or economizer.

The conversion gas is then delivered to an SO$_3$ absorption and absorption energy recovery system as illustrated in FIG. 1. The system comprises an absorber, e.g., a countercurrent absorption tower 1 in which the SO$_3$ conversion gas stream is contacted with concentrated sulfuric acid for transfer of SO$_3$ from the gas stream to the liquid phase in the form of incremental addition of sulfuric acid to the absorption liquid. In the absorber, the liquid and gas streams are contacted within a heat recovery absorption zone 3 which comprises means for promoting gas/liquid contact and mass transfer between the acid phase and the liquid phase. As illustrated, the gas and liquid flow countercurrently through heat recovery absorption zone 3. It will be understood by those skilled in the art that gas and liquid can alternatively be contacted in a co-current flow absorber such as, e.g., a venturi tower.

The absorption system further comprises an external heat exchanger 5 for recovery of absorption energy from the absorption acid, and a diluter 7 in which water is introduced into the recirculating acid stream for reaction with further quantities of SO$_3$. An enriched sulfuric acid stream is removed from the tower via acid exit 9, circulated through heat exchanger 5 and diluter 7 by means of an acid circulation pump 11 and returned to the tower at an acid return inlet 13.

By operating the absorption zone at elevated temperature, a high temperature acid stream is generated which can be used to heat a heat transfer fluid to an elevated temperature. The heat transfer fluid is typically heated to a temperature greater than about 144° C., for example, in the range of 160° C. to 235° C. Thus, where heat exchanger 5 is a heat recovery system (HRS) boiler, steam may be generated therein at a pressure in excess of 0.4 MPascals (4 bar) gauge, more typically in excess of 0.5 MPascals (5 bar) gauge, preferably between about 0.5 MPascals (5 bar) and about 1 MPascal (10 bar). Steam can be generated at pressures ranging up to 1.8 to 2 MPascals (18 to 20 bar) gauge where justified by local service demands and overall process economics.

As illustrated in FIG. 1, the absorber optionally and advantageously contains two absorption zones. A primary heat recovery absorption zone 3 is operated at high temperature to produce a high temperature absorption acid stream that is circulated via acid circulation pump 11 through heat exchanger 5 for recovery of the absorption energy in useful form. A secondary absorption zone 15 is positioned above the primary absorption zone in tower 1. Acid introduced at secondary acid inlet 17 passes through the secondary absorption zone countercurrently to gas exiting the primary absorption zone. The secondary absorption zone functions to cool the gas stream, condense residual sulfuric acid from the vapor phase, and remove residual SO$_3$ from the gas stream by absorption into the secondary absorption acid. As shown in FIG. 1, the secondary absorption acid flows downwardly into the primary absorption zone and becomes part of the primary absorption acid stream flowing through the primary zone.

The depleted gas stream exiting secondary absorption zone 15 passes through mist eliminators 19 for removal of residual sulfuric acid mist. Where the heat recovery absorption system comprises the interpass absorber of an interpass plant, the gas exiting the mist eliminators is returned to a further stage of the converter. In a single pass plant, the gas exiting the mist eliminators is released to the atmosphere.

In the prior art process, a portion of the dilution water is introduced as water vapor into the SO$_3$ conversion gas stream via an injection port 21 upstream of absorption tower gas inlet 23. However, because of corrosion and mist generation concerns, the proportion of water vapor introduced into the gas upstream of the absorber has been limited to no more than about 33%, i.e., water vapor has been introduced in such proportion that the ratio of the total equivalent water vapor content of the gas is no more than 0.33 moles per mole total equivalent SO$_3$ content of the gas stream prior to entry into the primary absorption zone 3. At least about 67% of the dilution water is introduced via diluter 7, typically in liquid form. Alternatively, some or all of the balance of dilution water may be supplied by cross-flow of lower concentration sulfuric acid via secondary acid inlet 17.

By comparison, in the process of the invention, water vapor is introduced upstream of the absorption system in a proportion sufficient to increase the equivalent water vapor content of the gas to at least about 0.40 moles per mole total equivalent sulfur oxide gas content prior to entry of the gas stream into the absorption zone. Preferably, water vapor is introduced in a proportion sufficient to increase the equivalent water vapor content of the gas to at least about 0.50 moles, more preferably at least about 0.55 moles, more preferably at least about 0.60 moles, still more preferably at least about 0.70 moles, and most preferably at least about 0.80, 0.90 or 0.95 moles per total equivalent SO$_3$ content of the gas prior to entry of the gas stream into the absorption zone. Where water vapor is introduced upstream of the converter with respect to the direction of sulfur oxide gas flow, these ratios may be measured with respect to total SO$_2$ content. More generically, they may be expressed in terms of total equivalent sulfur oxide gas content, i.e., SO$_2$ plus equivalent SO$_3$. For purposes of these ratios, the equivalent water vapor content includes water vapor that has been converted in the gas phase to sulfuric acid, and the equivalent SO$_3$ content includes SO$_3$ that has been converted in the gas phase to sulfuric acid.

The process of the invention may be implemented in either a "dry gas" plant, in which sulfur combustion air is dried by contact with sulfuric acid in a drying tower upstream of the sulfur burner with respect to the direction of combustion air flow, or in a "wet gas" plant where the sulfur source is burned in ambient air that has not been dried and/or where the sulfur source itself is a source of moisture. The SO$_2$ stream generated in a metallurgical plant is typically "wet," as is the SO$_2$ stream generated by spent sulfuric acid decomposition. Some sulfur sources comprise sulfur compounds that contain hydrogen, e.g., hydrogen sulfide or mercaptans, and these necessarily produce a "wet" SO$_2$ gas that is converted to a wet SO$_3$ gas source for the conversion. In a dry gas plant, water vapor is introduced into the SO$_3$-bearing gas at a rate sufficient to provide the entire equivalent water vapor content. In a wet gas plant, water vapor is introduced at a rate equivalent to the difference between the target equivalent water vapor content and the water vapor concentration already present in the gas. In those embodiments of the invention in which the sulfur source may be H$_2$S, 100% of the dilution water requirements are provided in the combustion gas without supplemental injection of water vapor. In general, the improvements and modifications of the invention relating to mass flow ratios in the primary heat recovery absorption zone, acid concentration profiles in the primary and secondary absorption zone, selection of conversion gas temperature entering the primary absorption zone, gas phase composition profiles in the primary reaction zone, and various provisions for control of acid mist have been developed for a sulfur-burning plant. Preferably, they are also applied wherever feasible to processes in which the sulfur source is other than elemental sulfur, e.g., a source such as metallurgical sources and $H_2S$. In more preferred embodiments, the sulfur source is elemental sulfur or sulfidic ore.

In some arid geographic regions, the relative humidity of ambient air may be such that operation of a sulfur-burning contact sulfuric acid plant may approximate a "dry gas" plant even in the absence of a drying tower for the sulfur combustion air. However, for purposes of the present invention, a plant may be deemed a "wet gas" plant if the combustion gas produced by burning sulfur in air contains more than 0.005 moles water vapor per mole $SO_2$. The process of the invention is applicable, but not limited, to dry gas operations in which absorption of $SO_3$ obtained by conversion of an $SO_2$ stream contains not more than 0.005, more typically not more than about 0.002, moles water vapor per mole $SO_2$.

Figure 2:
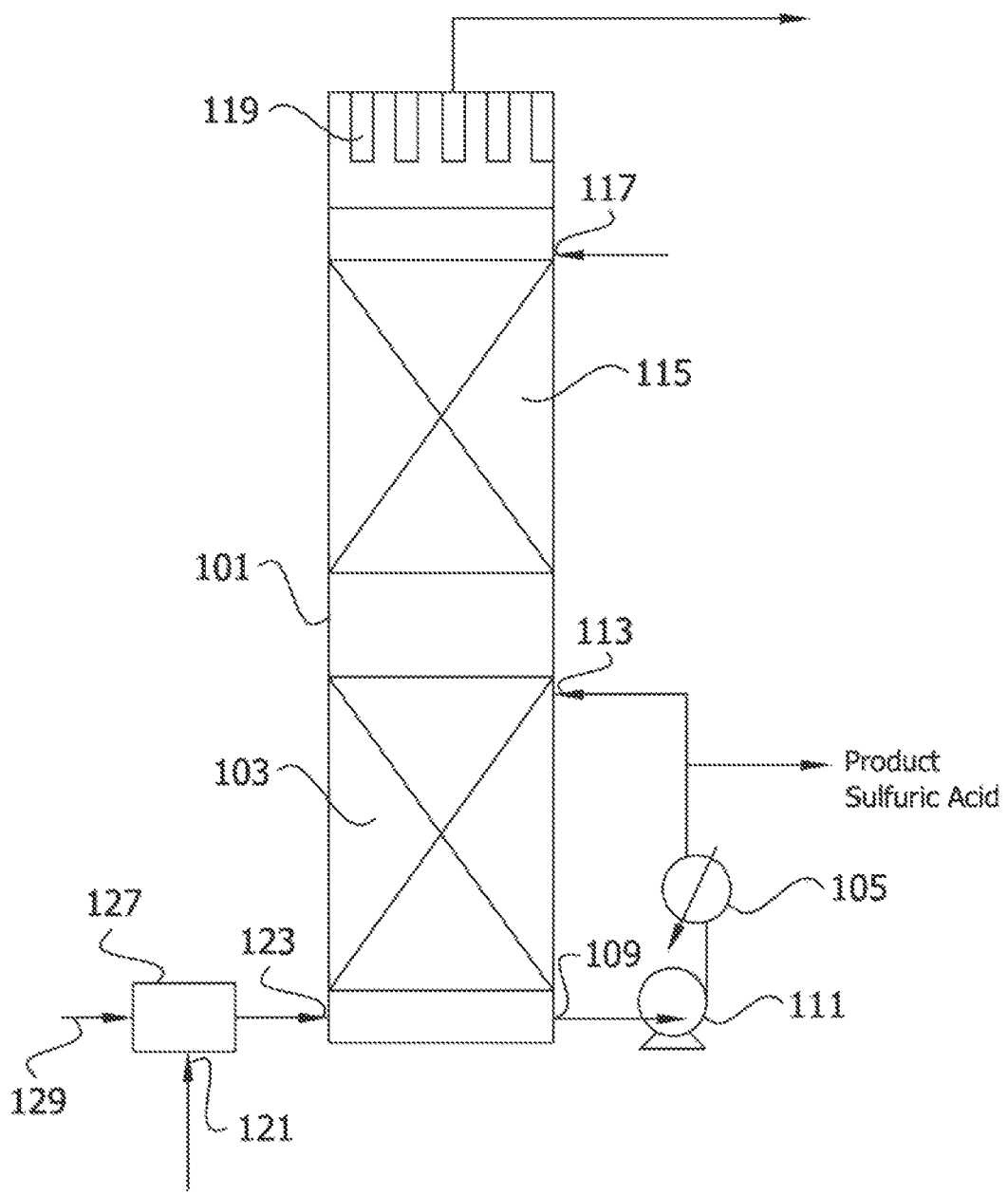
FIG. 2 is a process flow sheet for an $SO_3$ absorption and absorption energy recovery system according to a preferred embodiment of the invention, comprising a primary heat recovery countercurrent absorption zone and a secondary countercurrent absorption zone, in which 95-100% of reaction and dilution water is supplied by injection of steam into the $SO_3$-bearing stream entering the primary zone.

An exemplary flow sheet for the $SO_3$ absorption and absorption energy recovery system according to a preferred embodiment of the invention is illustrated in FIG. 2. An absorption system comprises an absorption tower 101 containing a heat recovery (primary) absorption zone 103 and a secondary absorption zone 115. Both absorption zones comprise packing or other means for promoting gas/liquid contact and mass transfer between the gas and liquid phases. $SO_3$-bearing conversion gas is introduced into the bottom of the tower via gas inlet 123. The gas flows upwardly through primary absorption zone 103 countercurrently to the downward flow of absorption acid. Absorption acid, augmented by absorption of $SO_3$ and condensation of $H_2SO_4$ from the gas phase, exits the bottom of the primary absorption zone, is removed from the tower at acid exit 109, and is circulated via acid circulation pump 111 through a heat exchanger 105 for recovery of the heat of absorption in useful form by transfer of heat from the absorption acid to a heat transfer fluid. Acid exiting the heat exchanger is divided to remove a fraction equivalent to the net production of sulfuric acid in the absorption system, primarily in the heat recovery absorption zone, plus any acid provided from an extraneous source (e.g., for use in the secondary absorption zone or in cross-flow as a dilution medium). The remaining fraction is recirculated to the top of the primary absorption zone 103 via tower acid return inlet 113.

The depleted gas stream exiting the top of primary absorption zone 103 passes upwardly through secondary absorption zone 115 countercurrently to secondary absorption acid which is supplied to the tower via secondary acid inlet 117 at or above the top of the secondary absorption zone. As illustrated, the secondary absorption acid flows from the acid exit (bottom) of the secondary absorption zone into the primary absorption zone where it becomes part of the primary absorption acid stream. Depleted gas exiting the top of secondary absorption zone 115 passes through mist eliminators 119 for removal of sulfuric acid mist. Thence the gas is either returned to a further stage of the converter or exhausted from the system.

For purposes of the invention, the $SO_3$ absorption and absorption energy recovery system comprises the heat recovery absorption zone 103, the secondary absorption zone 115 (if present), the heat exchanger 105 for recovery of energy in useful form from the absorption acid exiting the heat recovery absorption zone, the acid circulation pump 111, and the heat recovery tower 101 within which the heat recovery absorption zone is contained. In the description of the invention, it is understood that the designation of the heat recovery absorption zone 103 as the primary heat recovery absorption zone does not necessitate the presence of a secondary absorption zone 115. In preferred embodiments of the process, steam is generated in heat exchanger 105, preferably at a pressure of at least about 0.4 MPascals (4 bar) gauge. Any other heat exchangers through which useful energy is recovered from absorption acid after removal thereof from the (primary) heat recovery or secondary absorption zones (if present) are also part of the $SO_3$ absorption and absorption energy recovery system. Certain of these are described herein. The absorption and absorption energy recovery system would also include any heat exchanger for recovering residual heat from the depleted gas stream after it exits either the (primary) heat recovery zone or secondary absorption zone (if present), but before it is introduced into a further stage of the $SO_3$ converter.

The heat recovery absorption system as such does not include any means for removal of heat from any sulfur oxide gas stream, either $SO_2$ combustion gas or $SO_3$ conversion gas, upstream of the heat recovery absorption zone with respect to the flow of the sulfur oxide gas stream, or any means for recovery of energy from gas in which further conversion of $SO_2$ to $SO_3$ has been effected downstream of the heat recovery tower. However, except where otherwise specified herein, the presence of such means is not excluded from sulfuric acid processes that embody the process of the invention. The heat recovery absorption system does include any diluter that may be located in any acid stream that is introduced and/or recirculated into either the (primary) heat recovery zone or secondary absorption zone.

As illustrated in FIG. 2, the heat recovery absorption system does not include a diluter. Thus, in this preferred embodiment, 100% of dilution water is supplied by injection of water vapor into the conversion gas via a water vapor injection port 121 and mixes with the gas in a water vapor injection zone 127 within a conversion gas feed duct 129 upstream of tower gas inlet 123. However, it will be understood that, if desired, the proportion of dilution water supplied by injection upstream of the primary absorption zone may be controlled at a value in a range sufficient to increase the equivalent water vapor content of the gas to between about 0.40 moles and about 1.05 moles per mole total equivalent sulfur oxide gas content prior to entry of the gas stream into the primary absorption zone. Where this molar ratio is less than about 1.00, additional dilution water may be added either via a diluter comparable to diluter 7 of FIG. 1 or by injection into the gas stream or acid stream within the primary absorption zone. Generally, water vapor is added via injection port 121 in a proportion sufficient so that the molar ratio of the equivalent water vapor content to the equivalent $SO_3$ content in the gas entering primary absorption zone 103 is between about 0.40 and 1.05, preferably between about 0.50 and about 0.98 or 1.00, preferably between about 0.55 and about 0.98 or 1.00, more preferably between about 0.60 and about 0.98 or 1.00, still more preferably between about 0.70 and about 0.98 or 1.00, most preferably between about 0.80 or 0.90 and about 0.98 or 1.00.

The temperature of the $SO_3$-bearing gas stream as introduced into the primary absorption zone is at least about 260° C., more preferably at least about 270° C., still more preferably at least about 285° C. and most preferably at least about 300° C. The temperature of this stream is preferably not greater than about 345° C. Thus, for example, the temperature of the $SO_3$-bearing stream may be between about 260° and about 345° C., between about 270° and about 345° C., between about 290° and about 340° C., between about 300° and about 340° C., or between about 310° and about 330° C., optimally in the neighborhood of about 300° to 330° C. or between about 300° and about 320° C. and at least about 40° C. in excess of its dew point.

In preferred embodiments, as illustrated in FIG. 2, the gas stream passes countercurrently to the absorption liquid stream in the primary heat recovery absorption zone. It will be understood by those skilled in the art, that the invention may also be practiced by contacting absorption acid and $SO_3$ conversion gas in a co-current absorber such as, e.g., a venturi tower. The preferred conditions of operation as discussed herein refer to operation in a countercurrent system of the type illustrated in the drawings.

A preferred control strategy for the process of FIG. 2 comprises controlling the temperature of the acid exiting the heat recovery heat exchanger by regulating the flow of acid returning to the heat recovery absorption zone, and controlling the concentration of the acid exiting the heat recovery absorption zone by regulating primarily the flow to the steam injector and by regulating the concentration and flow rate of the acid flowing to the secondary absorption zone.

For maximum heat recovery in the heat recovery absorption system, the $SO_3$-bearing gas stream is introduced into the primary absorption zone without any intermediate condensation of any component of the sulfur oxide-bearing gas stream between the water vapor injection zone and the primary absorption zone. Preferably, no significant amount of heat is removed from the $SO_3$ conversion gas stream in any form, whether by condensation, significant transfer of sensible heat, or otherwise, during flow of the gas stream between the water vapor injection zone and the primary absorption heat recovery zone. Preferably, water is introduced downstream of any heat exchangers for recovering useful energy from the conversion gas at a rate of more than 30 Btu per pound of equivalent $SO_3$ in the conversion gas.

Absorption acid is introduced into the primary absorption zone at a temperature of preferably at least about 180° C., typically in the range of 170° to 220° C. Acid preferably exits the primary absorption zone at a temperature in the range of about 200° to about 240° C. Hot absorption acid is removed from tower 101 via acid exit 109, and circulated by pump 111 through indirect heat exchanger 105 in which the heat of $SO_3$ absorption, the vapor phase heat of reaction of $SO_3$ with $H_2O$, and the heat of condensation of $H_2SO_4$ are transferred to a heat transfer fluid and recovered in useful form. The heat transfer fluid is heated to a temperature greater than about 150° C., preferably in the range of about 160° C. to about 235° C., more preferably between about 180° and about 220° C. Thus, where heat exchanger 105 is a boiler, steam may be generated therein at a pressure in excess of 0.3 MPascals (3 bar) gauge, preferably in excess of 0.5 MPascals (5 bar) gauge, more typically between about 0.5 and about 1 MPascals (5 and about 10 bar gauge), still more preferably in excess of 0.7 MPascals (7 bar) gauge, and in some instances as high as 1.8-2 MPascals (18-20 bar) gauge.

In passage through the primary absorption zone, the gas stream is cooled by direct heat exchange with the absorption acid with which it is in contact, thereby cooling the exit gas stream substantially to the temperature of the inlet acid stream.

The strength of the absorption acid exiting the primary absorption zone is preferably in the range of about 99.1% to about 99.8%, more preferably between about 99.3% and about 99.7% by weight, $H_2SO_4$. At any given exit acid concentration, the inlet acid concentration necessarily varies depending on the proportion of dilution water that is provided in the form of water vapor introduced into the $SO_3$ conversion gas stream prior to its introduction into the primary absorption zone. Where 100% of the dilution water is provided in the gas stream prior to its entry into the heat recovery absorption zone, there is no concentration gradient in the heat recovery absorption zone. Where a portion of the dilution water is provided in the circulating acid loop, e.g., in a diluter comparable to that shown at 7 in FIG. 1, a concentration gradient develops across the primary absorption zone. Under minimum conditions, i.e., where the equivalent water vapor content of the gas entering the primary zone is about 0.40 moles per mole equivalent $SO_3$ content, the concentration of the absorption acid entering the primary absorption zone may typically be between about 99 and about 99.5%.

It is desirable to maintain the strength of the acid exiting the primary absorption zone as high as feasible in order to minimize corrosion in the heat recovery boiler, and in the lower portion of the heat recovery tower shell where the latter structure is of alloy construction. Although absorption acid concentrations of 99.3 to 99.7% are desirable for this purpose, it has further been observed in some operations that absorption efficiency may become erratic when the acid concentration approaches the upper limit of this range at the base of the primary absorption zone, potentially compromising control of acid mist formation due, e.g., to breakthrough of an excessive fraction of $SO_3$ into the secondary zone, or leading even to yield loss and $SO_3$ emissions. Taking into consideration the idiosyncrasies of individual units, and vagaries of calibration of conductivity instrument used to measure acid strength, it is generally preferred in high volume industrial practice to maintain a target acid concentration not greater than about 99.5% at the acid inlet/gas exit of a countercurrent heat recovery absorption zone. A marginal increase above 99.5% may be acceptable where the composition of the gas stream exiting the primary zone is monitored for $SO_3$ content, and the dilution water provided to the secondary zone by adjustment of the concentration or flow of acid to the inlet of the secondary zone.

Absorption acid is circulated at a relatively high rate through the primary absorption zone. Preferably, the mass flow ratio of liquid to gas (L/G) in the primary absorption zone is at least about 3, typically between about 4 and about 15. Expressed with reference to the $SO_3$ content of the gas stream entering the primary absorption zone, the mass L/G is preferably at least about 4 or at least about 15 and as high as about 120, typically between about 20 and about 120 or between about 20 and about 70, more typically between about 25 and about 110, most preferably between about 30 and about 100.

The acid stream exiting the secondary absorption zone is preferably no greater than about 35° C., more preferably not more than about 30° C., more preferably no greater than about 25° C., still more preferably not greater than about 20° C. and optimally not greater than about 15° C. or even not greater than about 10° C., cooler than the temperature of the gas exiting the primary absorption zone (i.e., entering the secondary absorption zone). Flow of acid through the secondary absorption zone is low compared to the flow rate through the primary absorption zone. Acid may be introduced into the secondary absorption zone at a temperature between about 40° and about 110° C. and is removed from the secondary zone at a temperature in the range of about 175° to about 215° C. As further discussed below, optimal control of mist is favored by controlling the temperature differential or Δt between the gas phase and the liquid phase in the secondary zone. Controlling the Δt at both inlet and outlet of the acid stream may require that the inlet temperature of the acid be maintained toward the upper portion of the preferred range, e.g., between about 65° and about 95° C., or between about 75° and about 90° C., and that the flow rate be controlled so that the exit temperature of acid from the secondary zone is not significantly lower than the temperature of the gas exiting the primary zone. The acid strength of the secondary acid exiting the secondary absorption zone is generally maintained close to the concentration of the primary absorption acid recirculated from the heat recovery system heat exchanger to the inlet of the primary absorption zone, which is preferably at or above the azeotrope. The acid concentration and flow rate of acid entering the secondary absorption zone is controlled to assure absorption of residual $SO_3$ in the gas exiting the primary zone and produce an acid stream at the exit of the secondary zone that is in the desired range. Thus, where the strength of the primary acid entering the primary zone is relatively high, as is typically the case where a high fraction of $SO_3$ reaction water is introduced into the conversion gas entering the primary absorption zone, water is supplied at a relatively high rate in the acid entering the secondary zone in order to match the relatively high residual concentration of $SO_3$ expected in the gas stream entering the secondary zone. But where the strength of the primary acid entering the primary absorption zone is relatively low, as is typically the case in a dry gas plant with no steam injection (which therefore requires significant dilution of the primary absorption acid returning from the heat recovery system heat exchanger), the rate at which water must be supplied in the secondary acid entering the secondary zone can be relatively low, because the residual $SO_3$ in the gas entering the secondary zone is also expected to be relatively low.

It is generally preferred that the acid exiting the primary zone has a strength between about 99.0 and about 99.7%, more typically, between about 99.3 and about 99.6%. Thus, in the case where a substantial fraction of the reaction water is supplied by injection of steam into the conversion gas, the strength of the primary absorption acid entering the primary absorption zone is generally in the range of 99.0 to 99.7%, more typically 99.2 to 99.6%, and the secondary acid exiting the secondary absorption zone is between about 99.0 and about 99.7%, more typically between about 99.1 and about 99.6%. But in the dry gas case with no steam injection, the strength of the primary acid entering the primary absorption zone is diluted to a range of about 98.5 to about 99.2%, more typically between about 98.8 and about 99.2% by introduction of water or relatively dilute acid between the heat exchanger and the primary zone acid inlet. Because the equilibrium $SO_3$ concentration of the gas in contact with the inlet primary acid in the 100% steam injection case is necessarily slightly higher than the equilibrium $SO_3$ concentration of the gas in contact with the inlet primary acid in the dry gas with no steam injection case, slightly more reaction water is preferably provided in the secondary absorption zone in the former case. Thus, in the ~100% steam injection case, the strength of the acid entering the secondary absorption zone is typically between about 98.0 and about 99.2%, preferably, between about 98.2% and about 99.1%, whereas in the dry gas case, the strength of the acid entering the secondary absorption zone is between about 98.3 and about 99.2%, more typically between about 98.4% and about 99.0%.

The ranges for acid concentration entering and exiting both the primary and secondary absorption zones, and the typical optimal target concentrations are shown in Table 1 below. Under intermediate operating conditions, i.e., where a fraction of reaction water is supplied by steam injection, e.g., 40% to 70%, the preferred values for the acid concentrations at the inlet of the primary absorption zone, the exit of the secondary absorption zone and the inlet of the secondary absorption zone will generally fall between the values set for the in the table for the limiting cases of ~100% steam injection and dry gas with zero steam injection.

TABLE 1

|  | DRY GAS | | | ~100% STEAM INJECTION | | |
| --- | --- | --- | --- | --- | --- | --- |
|  | Broad | Preferred | Target Optimal | Broad | Preferred | Target Optimal |
|  | Primary | | | | | |
| Exit | 99.0-99.7 | 99.3-99.6 | 99.5 | 99.0-99.7 | 99.3-99.6 | 99.5 |
| Inlet | 98.5-99.2 | 98.8-99.2 | 99 | 99.0-99.7 | 99.2-99.6 | 99.5 |
|  | Secondary | | | | | |
| Exit | 98.5-99.3 | 98.8-99.3 | 99.2 | 99.0-99.7 | 99.1-99.6 | 99.2 |
| Inlet | 98.3-99.2 | 98.4-99.0 | 98.7 | 98.0-99.2 | 98.2-99.1 | 98.5 |

Although the flow of secondary acid is very low relative to primary acid, the secondary acid may nonetheless cause some degree of dilution if it is mixed with the primary acid entering the primary absorption zone. This in turn creates a concentration gradient in the primary zone that may tend to increase corrosion or contribute to mist formation in the primary zone. In accordance with the invention, it has been discovered that the secondary absorption zone can be operated with a relatively high exit acid concentration of acid, e.g., in a range as high as 99.1 to 99.2%, thereby minimizing any dilution effect when the secondary acid flows into the primary zone. Alternatively, dilution of the primary absorption acid may be precluded by diverting the secondary absorption acid exiting the secondary zone to an acid collection tank rather than mixing it with the primary acid entering the primary zone. However, this alternative sacrifices recovery of the heat of absorption of residual $SO_3$ and transfer of sensible heat from the gas stream to the secondary absorption liquid in the secondary zone. The latter sources of energy, while relatively minor, are recovered in the process of FIG. 2.

As discussed in further detail below, the L/G in the secondary zone is preferably adjusted to minimize the gas/liquid Δt throughout the secondary zone.

In those embodiments of the process of the invention comprising injection of steam into the conversion gas, energy is not only recoverable in relatively high grade form, e.g., at the steam pressures discussed above, but also in substantially enhanced quantity. Useful high value energy recovery is in excess of 1160 KJ per Kilogram of $SO_3$ (500 Btu per lb. $SO_3$) in the conversion gas stream. In preferred embodiments of the invention where substantially greater than half the requisite dilution water is provided in the form of water vapor in the $SO_3$ conversion gas stream entering the primary absorption zone, useful high value energy recovery is in excess of 1220 KJ per Kilogram of $SO_3$ (525 Btu per lb. $SO_3$) in the conversion gas stream. In embodiments wherein the molar ratio of equivalent water vapor to equivalent $SO_3$ is greater than 0.80 in the conversion gas stream entering the primary absorption zone, useful high value energy recovery exceeds 1280 KJ per Kilogram of $SO_3$ (550 Btu per lb. $SO_3$), and where substantially 100% of the dilution water is provided by equivalent water vapor in the gas stream, high value energy recovery may exceed 1330 KJ per Kilogram of $SO_3$ (575 Btu/lb. $SO_3$).

Expressed in terms of steam production from the heat recovery system boiler, energy recovery in the form of steam having a pressure of at least about 0.4 MPascals (4 bar) gauge, preferably at least about 0.5 MPascals (5 bar) gauge, may exceed 0.5 tons steam per ton of product sulfuric acid. Preferably, steam is generated at such pressure at a rate of at least about 0.55 tons per ton of product sulfuric acid. Where 95-100% of dilution acid is provided in the form of steam injection into the conversion gas ahead of the absorber, energy recovery is approximately 0.64 tons/per ton product acid. Operation under these conditions may require a modest increase in the size of the heat recovery system heat exchanger, i.e., up to about 25% in heat exchange surface area compared to 33% steam injection.

The process of the invention may also be operated and controlled to increase the temperature at which energy recovery is achieved, e.g., by generating steam at more elevated pressure. For operation at higher acid temperature, the acid strength is preferably maintained at the maximum feasible level to avoid a significant increase in the rate of corrosion in the base of the tower and in the heat exchanger. Proper adjustment of the number of equilibrium stages in the secondary absorption zone and/or marginally increasing the flow of secondary absorption acid may compensate for marginally increased $SO_3$ slippage through the primary absorption zone where the primary absorption acid temperature and concentration are both at the high end of the acceptable range. An excessive increase in the L/G in the secondary absorption zone can result in shock cooling of the gas entering the zone with consequently adverse effect on mist generation; but a marginal increase is acceptable, especially where the primary zone is operated at the high end of preferred acid concentration, in part because the higher $SO_3$ content of the gas causes increased heat generation in the lower regions of the secondary absorption zone, thus preventing the exit acid from becoming too cold even at the higher L/G. However, it is preferable to prevent any significant breakthrough of $SO_3$ to the secondary zone so as to require increasing the secondary zone L/G, even marginally. Since the concentration of acid to the secondary zone is not readily controlled to respond to $SO_3$ breakthrough, it is preferable to maintain conditions in the primary zone to prevent any significant excursions in the $SO_3$ content of the gas exiting the primary zone. Another alternative is to introduce the secondary absorption acid at a lower concentration than the acid strength prevailing in the base of the primary absorption zone.

According to a further alternative, the acid concentration can be marginally lowered in the primary absorption zone to minimize $SO_3$ slippage, allowing a relatively high concentration to be maintained in the secondary absorption zone, and the temperature of the acid exiting the secondary absorption zone is maintained at or near the temperature of the acid entering the primary zone. As discussed below, this concentration profile is consistent with FIG. 3 of U.S. Pat. No. 5,538,707 which indicates that mist formation is minimized where the acid with which any $SO_3$ slippage comes in contact in the secondary absorption zone is at or above the azeotrope. Under this alternative, a higher corrosion rate in the base of the tower may be offset by a lower corrosion rate in the upper portion of the tower. In such embodiments, a higher corrosion tolerance is built into the design and construction of the base of the tower and a lower corrosion tolerance is used in the rest of the tower, potentially preserving overall equipment cost as comparable to prior art configurations.

By proper selection and combination of process variables within the ranges described above, significant improvements in energy recovery from the absorption system are achieved without offsetting penalties in absorption tower corrosion or sulfuric acid mist generation that would materially compromise the economic benefits that the enhanced energy recovery provides. A further benefit may be gained by reducing the overall height of the heat recovery tower and/or of the primary absorption zone of a tower that also comprises a secondary absorption zone above the primary zone. Operation at the preferred relatively high L/G improves mass transfer and reduces the number of equilibrium stages and/or the height of a theoretical transfer unit in the heat recovery zone of the tower. This reduces the height of the tower relative to the flow rate of $SO_3$ conversion gas entering the tower. Moreover, since tower diameter is dictated primarily by gas flow rather than acid flow, no increase in diameter is required by the increased L/G. These factors reduce the capital investment requirements for a new tower and facilitate retrofit of existing plants that do not have a heat recovery system, or which have a system that is operated without steam injection, or that have been operated at steam injection rates sufficient to increase the equivalent water vapor content of the gas stream entering the heat recovery absorption zone to only 33% or less of the equivalent $SO_3$ content.

Operation under the preferred temperature conditions in the heat recovery absorption zone provides not only for recovery of enhanced quantities of heat, but also for recovery of enhanced quantities at high temperature. The heat recovery absorption zone comprises the primary absorption zone of the process of FIG. 2, or the sole absorption zone of an absorption system which does not have a secondary absorption zone. Although operation at high temperature tends to increase the rate of corrosion in the heat exchanger and in the base of an alloy heat recovery tower, operation at relatively high acid strength as discussed above limits the corrosivity of the absorption acid and allows high temperature operation without excessive rates of corrosion.

To achieve a temperature of the $SO_3$-bearing gas stream at the inlet of the heat recovery absorption zone in the preferred 260° to 345° C. range, the gas exiting the converter is cooled in a waste heat boiler, steam superheater, economizer, etc. to a temperature in the range of about 160° to about 250° C. upstream of the water vapor injection zone 127. Preferably, there is no condensation from the gas stream in the water vapor injection zone or along the path downstream of the water vapor injection zone prior to entry of the gas stream into the heat recovery absorption zone. More preferably, there is no substantial heat removal from the gas stream in the water vapor injection zone or along the path downstream from the water vapor injection zone prior entry of the conversion gas into the heat recovery absorption zone. Those skilled in the art will understand that some loss of heat to the environment is inevitable, but removal of heat at rates significantly above the rate of environmental heat loss is preferably avoided.

Operation under the preferred temperature conditions assures that the heat of reaction of $SO_2$ to $SO_3$ is substantially abstracted upstream of the heat recovery absorption system, but a high proportion, if not all, the vapor phase heat of reaction of $SO_3$ with water vapor, the heat of condensation of sulfuric acid, and the liquid phase heat of reaction of $SO_3$ and water are recovered in the heat recovery absorption system. Recovery of energy in the absorption system is maximized where steam is introduced into the $SO_3$-bearing conversion gas rather than the $SO_2$ combustion gas, though the component of ambient combustion air in a wet gas plant does not materially detract from the recovery of energy in the absorption system. According to the alternative described in U.S. Pat. No. 5,130,112, water vapor may be introduced into the $SO_3$-bearing conversion gas upstream of an economizer, thereby recovering a portion of the heat of reaction of $SO_3$ and water in the form of relatively high pressure steam. Where the economizer is a condensing economizer, a portion of the heat of condensation of sulfuric acid is recovered in the same manner. According to a still further alternative, steam may be injected into the $SO_2$-bearing gas stream between the sulfur burner and the waste heat boiler, or into either the $SO_2$-bearing gas stream entering or the $SO_3$-bearing gas stream exiting a converter stage. It will be understood that certain embodiments of the process of the invention encompass these alternatives for enhanced absorption heat recovery, provided that water vapor is injected at some point upstream of the heat recovery absorber in a proportion sufficient to increase the water vapor content of the gas to at least about 0.40 moles per mole total equivalent sulfur oxide prior to entry of the gas stream into the heat recovery absorption zone, and preferably the equivalent water vapor content remains at least 0.40 per mole total equivalent sulfur oxide gas at the entry of the heat recovery absorption zone. More preferably, water vapor is injected in a proportion sufficient to increase the water vapor content of the gas to at least about 0.50, at least about 0.55, at least about 0.60, at least about 0.70 moles, most preferably at least about 0.80 moles, at least about 0.90 moles, or at least about 0.95 moles per mole total equivalent sulfur oxide prior to entry of the gas stream into the heat recovery absorption zone, and preferably the equivalent water vapor content remains at least about 0.50 moles, at least about 0.55, at least about 0.60 moles, at least about 0.70 moles, at least about 0.80 moles, or at least about 0.90 moles per mole total equivalent sulfur oxide gas at the entry of the heat recovery absorption zone.

Figure 4:
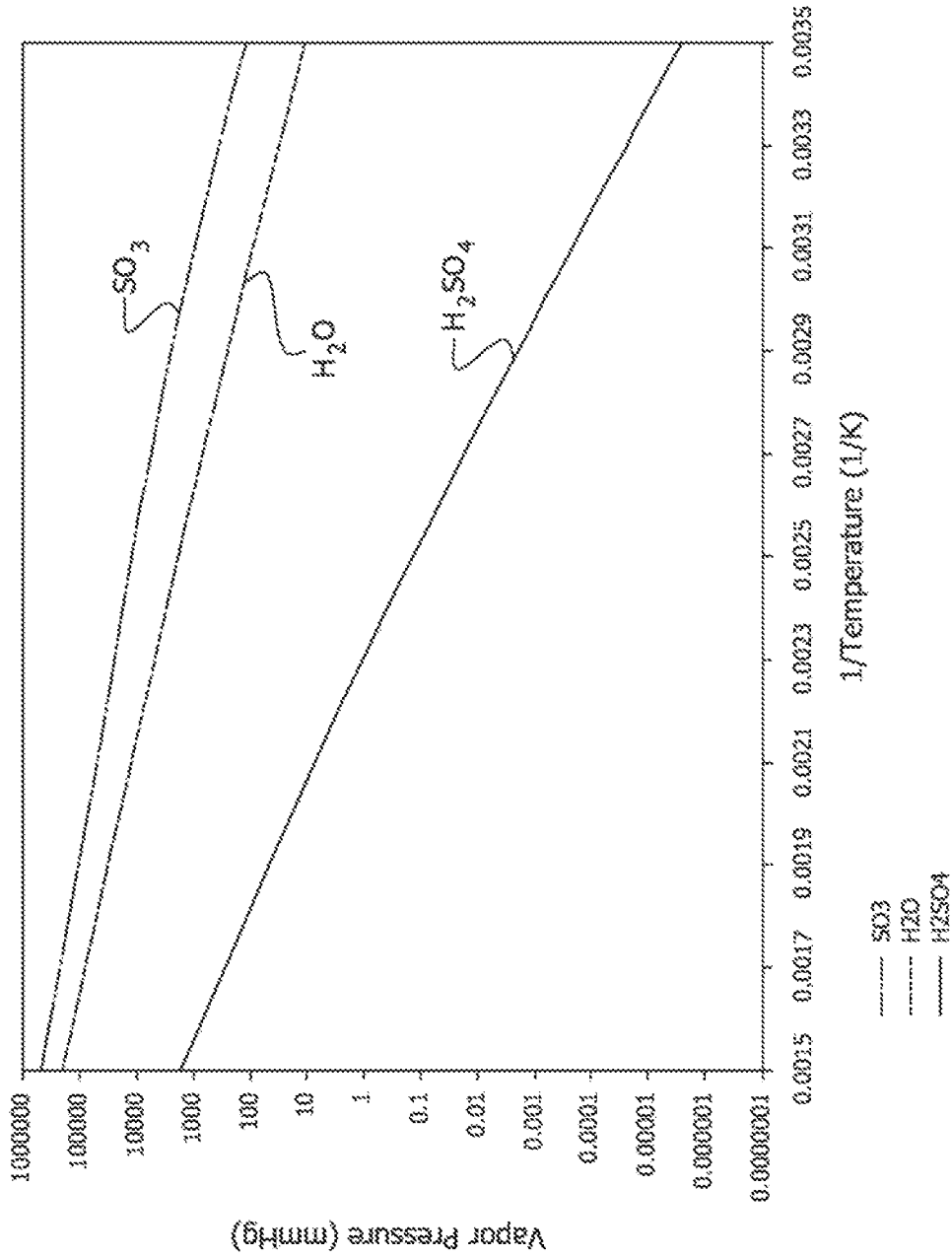
FIG. 4 is a logarithmic plot of vapor pressure vs. reciprocal absolute temperature for $SO_3$, water, and $H_2SO_4$.

More complex considerations affect the issue of acid mist. Plotted in FIG. 4 are the vapor pressures of water, $SO_3$ and sulfuric acid as a function of temperature. A linear configuration is provided by plotting vapor pressure on a logarithmic scale against reciprocal absolute temperature on a linear scale. These curves are for pure components and do not indicate the vapor pressures of either $SO_3$ or water in equilibrium with sulfuric acid, especially at the concentrations prevailing in the absorption acid. But in demonstrating the high volatility of $SO_3$, the curves do indicate the desirability of operating an absorption system in relatively close proximity to the azeotropic concentration for high strength sulfuric acid.

Maximum recovery of $SO_3$ in the heat recovery absorption zone is obtained if the acid strength is at the azeotrope at the gas exit. It has now been found that operation under the preferred heat recovery zone absorption zone acid concentration conditions departs slightly on the high side from the azeotrope. Data developed in accordance with the invention reveal that the azeotrope composition is about 99% by weight at the temperatures prevailing in the primary absorption zone, and about 99.2% by weight at the temperatures that preferably prevail in the secondary absorption zone of a process as illustrated, e.g., in FIG. 2. Operation slightly on the high side of the azeotrope could tend to increase the extent to which unabsorbed $SO_3$ may pass through the absorption system, and potentially create serious acid mist problems downstream, with resultant corrosion of downstream equipment in which materials of construction are selected on the basis that they will be in contact only with dry gases containing minor proportions of $SO_2$. However, it has further been discovered that acid mist is maintained at a modest level by operation in accordance with the combinations of conditions as described above, and further discussed below. Further control of acid mist may be provided by passing the gas stream exiting the heat recovery zone through a secondary absorption or condensing zone as is further described herein. By these measures, mist exiting the absorption tower is reduced to the extent that residual mist can be economically removed by use of conventional mist eliminator elements.

Unacceptable generation of acid mist might have been expected to arise from supply of substantially greater than 33% of dilution water via injection of water vapor into the conversion gas stream upstream of the primary absorption zone. Injection of water vapor and formation of sulfuric acid in the vapor phase necessarily raises the dew point of the gas stream, which might have been expected to aggravate acid mist formation. For example, as illustrated in FIG. 2 of U.S. Pat. No. 5,118,490, mist formation increases with the extent to which the dew point of the gas entering the absorber exceeds the temperature of the acid with which it comes to contact, and also increases as the difference between the temperature of the gas and its dew point decreases. Thus, according to FIG. 2 of U.S. Pat. No. 5,118,490, an increase in the extent to which dilution water is supplied by steam injection upstream of the heat recovery absorption zone, and the consequent increase in the gas dew point, has an apparent potential for aggravating mist formation. In industrial practice, such considerations have stood as deterrents to increasing the proportion of dilution water supplied as vapor in the gas stream to above about 33%.

Figure 5:
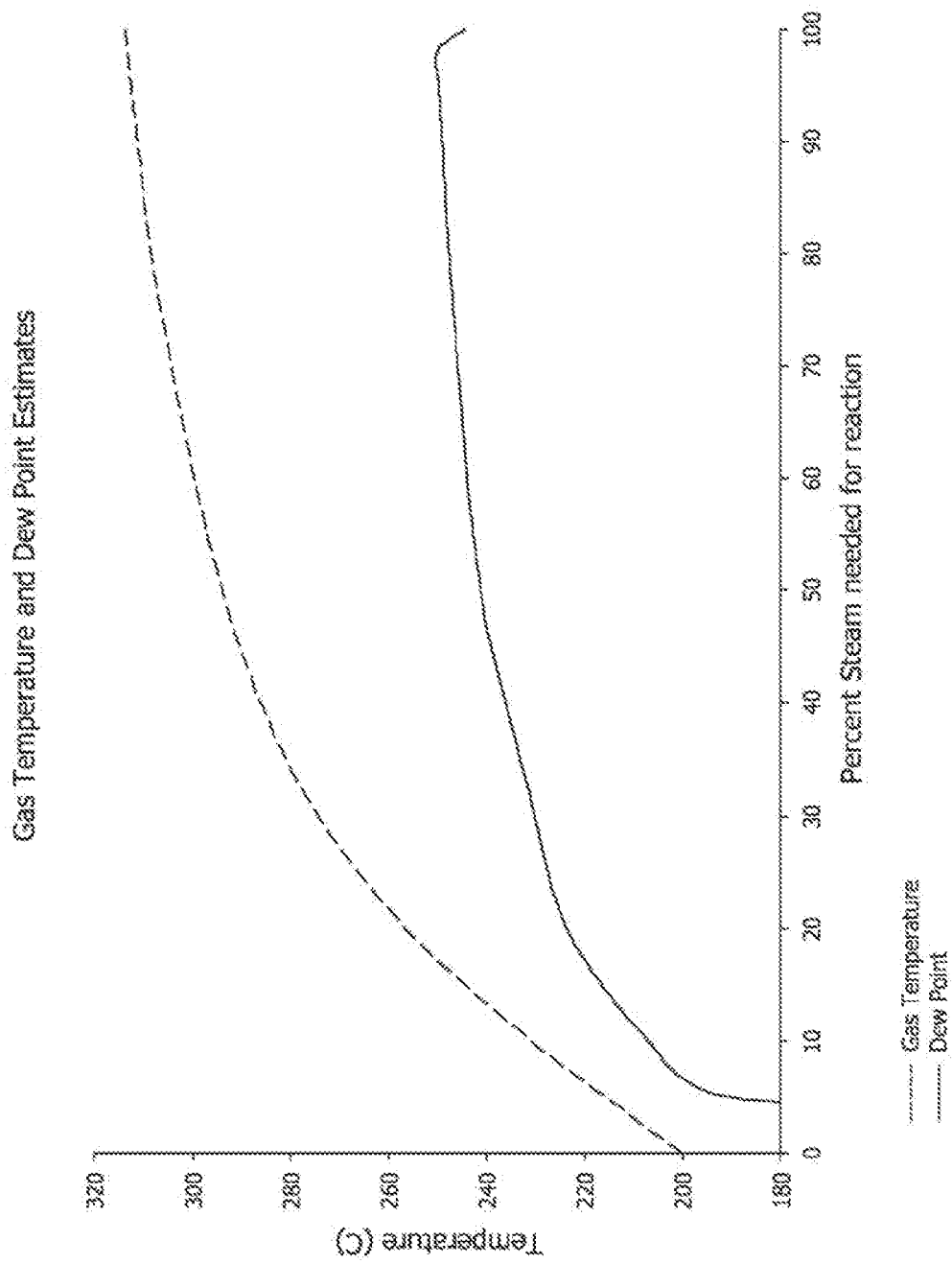
FIG. 5 presents curves for gas temperature and gas dew point for a typical $SO_3$-bearing gas stream entering an absorber in a dry gas contact sulfuric acid plant, plotted as a function of the proportion of stoichiometric reaction water requirements provided by injection of saturated atmospheric steam into the gas stream ahead of the absorber.

However, as illustrated in FIG. 5, injection of water vapor does not drive the conversion gas stream toward its saturation point. Instead, the vapor phase heat of reaction of $SO_3$ and water drives up the gas phase temperature, which tends to arrest the conversion of $SO_3$ to sulfuric acid, thereby modulating the increase in the dew point as function of the proportion of water vapor that is added by injection into the conversion gas. Thus, where atmospheric steam is mixed with dry $SO_3$ under adiabatic conditions, the difference between the gas temperature and gas dew point rises to about 44° C. when the gas contains equivalent water vapor in a molar ratio to equivalent $SO_3$ of about 0.33, increases to about 53° C. when the gas contains equivalent water vapor in a molar ratio to $SO_3$ of about 0.50, and ultimately reaches about 58° C. at a molar ratio of about 1.0. Instead of achieving a quantitative conversion of $SO_3$ to sulfuric acid in the vapor phase within the gas entering the system, the effect of increased heat generation in the gas phase is to shift the equilibrium ratio of $H_2SO_4/SO_3$ in the gas phase to a lower value and distribute conversion of $SO_3$ to $H_2SO_4$ in the vapor phase across the heat recovery absorption zone. This tends to decrease the $\Delta t$ between the gas phase and the liquid phase and increase the driving force for $SO_3$ absorption, thus increasing the extent to which $SO_3$ is converted to sulfuric acid in the liquid rather than the vapor phase. These factors may serve to limit the generation of acid mist.

While FIG. 5 shows that 100% steam injection advantageously increases the denominator of the x-axis factor in the mist generation correlation of U.S. Pat. No. 5,118,490 FIG. 2, the numerator must also increase if there is no significant increase in the temperature of the absorption acid exiting the heat recovery absorption zone. To minimize this effect, the heat recovery absorption zone is preferably operated at high acid temperature to minimize shock cooling when the moisture-laden incoming $SO_3$-bearing stream comes into contact with the absorption acid at the acid exit of the heat recovery absorption zone. However, a major increase in acid temperature might significantly aggravate corrosion in the heat recovery system boiler and in the base of an alloy heat recovery tower. Consequently, the temperature of the acid exiting the heat recovery tower is preferably maintained generally in the range established for prior art operation at steam injection rates of only 33%.

Fortuitously, it has additionally been found that the semi-empirical relationship of U.S. Pat. No. 5,118,490 FIG. 2 may not be fully applicable to the high proportionate steam injection operations contemplated by the present invention; or, if applicable, may not have provided adequate guidance for steam injection applications in the absence of knowledge and understanding of the data presented in FIG. 5. A plant test was performed in which the proportionate rate of steam injection into a dry conversion gas was increased from 33% to 44%, i.e., the molar ratio of equivalent water content to equivalent $SO_3$ content was increased from 0.33 to 0.44. The results of this test are set forth in Table 2. The favorable effect of increasing the difference between the gas temperature and the gas dew point has been found to offset the adverse effect of raising the gas dew point in those operations wherein a high fraction of dilution water is provided as vapor in the gas stream entering the absorber.

TABLE 2

| Particle Size of Mist in Gas Exiting Mist Elimination Elements | Mist Loading in Gas Exiting Mist Eliminators | |
|---|---|---|
| | 0.33 moles eq. $H_2O$/mole eq. $SO_3$ in Gas entering Heat Recovery Absorption Zone | 0.44 moles eq. $H_2O$/mole eq. $SO_3$ in Gas entering Heat Recovery Absorption Zone |
| >3μ | 0.9 g/Nm³ | 1.4 g/Nm³ |
| <3μ | 5.9 g/Nm³ | 3.0 g/Nm³ |
| <1μ | 2.3 g/Nm³ | 1.3 g/Nm³ |
| Total | 6.8 g/Nm³ | 4.4 g/Nm³ |

These values are for mist only, and do not reflect vapor load.

Maximum energy recovery from the absorption system is achieved in the embodiments wherein all dilution water is supplied by injection of water vapor into the $SO_3$ conversion gas stream prior to entry of that stream into the heat recovery absorption zone. As noted, this essentially eliminates any acid concentration gradient in the heat recovery zone. Especially in embodiments wherein there is only one absorption zone, this requires careful balancing of acid concentration because operation below the azeotrope can cause mist due to the volatility of sulfuric acid at high temperature and cause corrosion of a metal alloy heat recovery tower, while operation of the heat recovery absorption zone above the azeotrope can cause $SO_3$ slippage, i.e., passage of unabsorbed $SO_3$ through the tower. $SO_3$ slippage may cause mist generation downstream when the depleted gas stream is cooled.

It has further been discovered that the azeotrope composition varies inversely with temperature. Thus, one way to minimize mist generation in the heat recovery zone, and/or downstream as a function of heat recovery zone conditions, is to operate at a constant acid concentration which is above the azeotrope at the gas inlet of a countercurrent heat recovery absorption zone, but at or near the azeotrope at the modestly lower acid temperature prevailing at the gas exit. Although this limits the driving force for $SO_3$ absorption, it does not compromise the rate of condensation of sulfuric acid. $SO_3$ absorption efficiency also remains acceptable where acid strength co-ordinates at locations along the acid phase operating line within the primary absorption zone modestly exceed the azeotrope concentrations at the corresponding temperature co-ordinates; provided that the acid concentration of the absorption liquid is controlled so that the difference between the absorption liquid concentration and the azeotrope is not more than about 1.0 wt. % throughout the heat recovery zone, and the exit acid concentration is maintained at or below the inflection point above which absorption efficiency has been observed to become erratic or precipitously deteriorate in some industrial operations, e.g., 99.5%-99.6%. With $SO_3$ monitoring, an industrial acid plant can be reliably operated in the range of 99.6% to 99.7%. Preferably, the difference between the acid concentration and the azeotrope concentration is not less than −0.2 wt. % and not more than +1.0 wt. %, more preferably not less than 0.0% and not more than +1.0 wt. % throughout the heat recovery zone. This difference may be defined as:

$$\Delta az_i = [H_2SO_4]_i - [H_2SO_4 az]_i$$

where:
$\Delta az_i$ = the difference at locus i in the zone;
$[H_2SO_4]_i$ = the actual integrated avg. $H_2SO_4$ concentration co-ordinate at locus i;
$[H_2SO_4 az]_i$ = the azeotrope concentration at the integrated avg. temperature co-ordinate of locus i; and
locus i = any locus of points within the zone that are equidistant from a horizontal plane passing through the acid exit at the bottom of the primary absorption zone Thus, a negative difference means that the actual concentration is lower than the azeotrope at the temperature of locus i and a positive difference means that the actual absorption acid concentration is higher than the azeotrope at the temperature of locus i.

Figure 22:
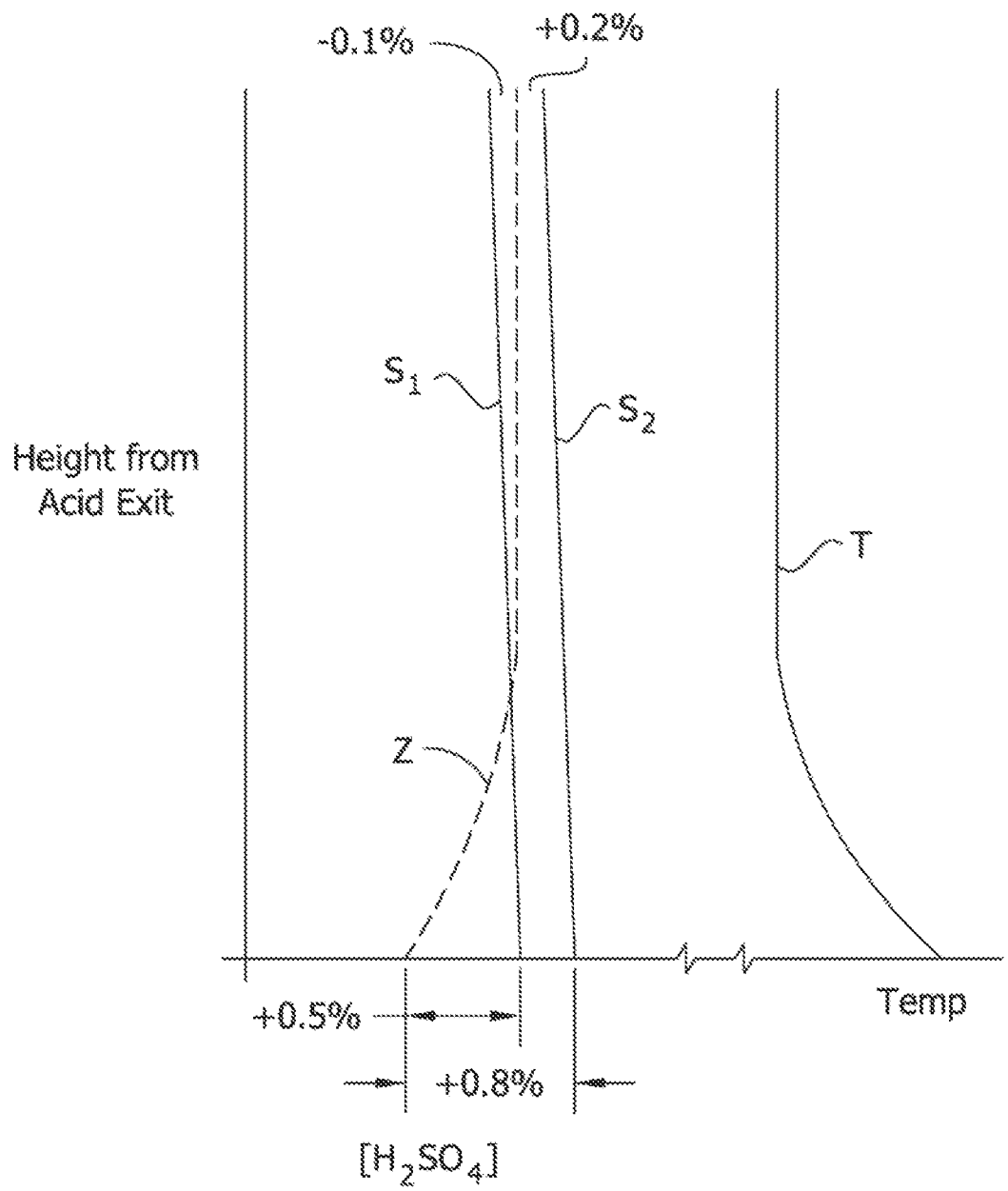
FIG. 22 is a diagram which plots the concentration operating line, temperature operating line and azeotrope composition as a function of temperature in a counter current heat recovery absorption zone.

Preferred conditions for operation of the primary absorption zone are schematically illustrated in FIG. 22. Curves $S_1$ and $S_2$ of FIG. 22 are alternative acid concentration operating lines for the absorption acid phase within a countercurrent primary absorption zone, i.e., plots of concentration vs. location in the primary zone as a function of distance from the gas inlet/acid exit of the zone. Curve $S_2$ is based on a slightly higher inlet acid concentration than Curve $S_1$. Curve T is the temperature profile of the acid phase within the primary zone while Curve Z is a plot of the azeotrope concentration as a function of the temperature within the zone. Thus, a horizontal line drawn at any given distance from the bottom of the zone intersects the concentration co-ordinate of that position on Curve $S_1$ or $S_2$ and the temperature co-ordinate of that position on Curve T, as well as the azeotrope composition at the Curve T temperature. It will be seen that, at the top of the zone, the difference between the inlet acid concentration on Curve $S_1$ and the azeotrope concentration at the inlet acid temperature is −0.1 wt. % and the difference between the exit acid concentration and concentration and the azeotrope concentration on Curve $S_1$ at the acid exit temperature is +0.5 wt. %. By comparison the corresponding differences on Curve $S_2$ are +0.2 wt. % and +0.8 wt. %, respectively. Curve $S_1$ reflects a preferred lower limit on inlet acid concentration, while Curve $S_2$ approaches preferred maxima on inlet acid concentration at the L/G prevailing in the hypothetical case depicted.

Figure 3:
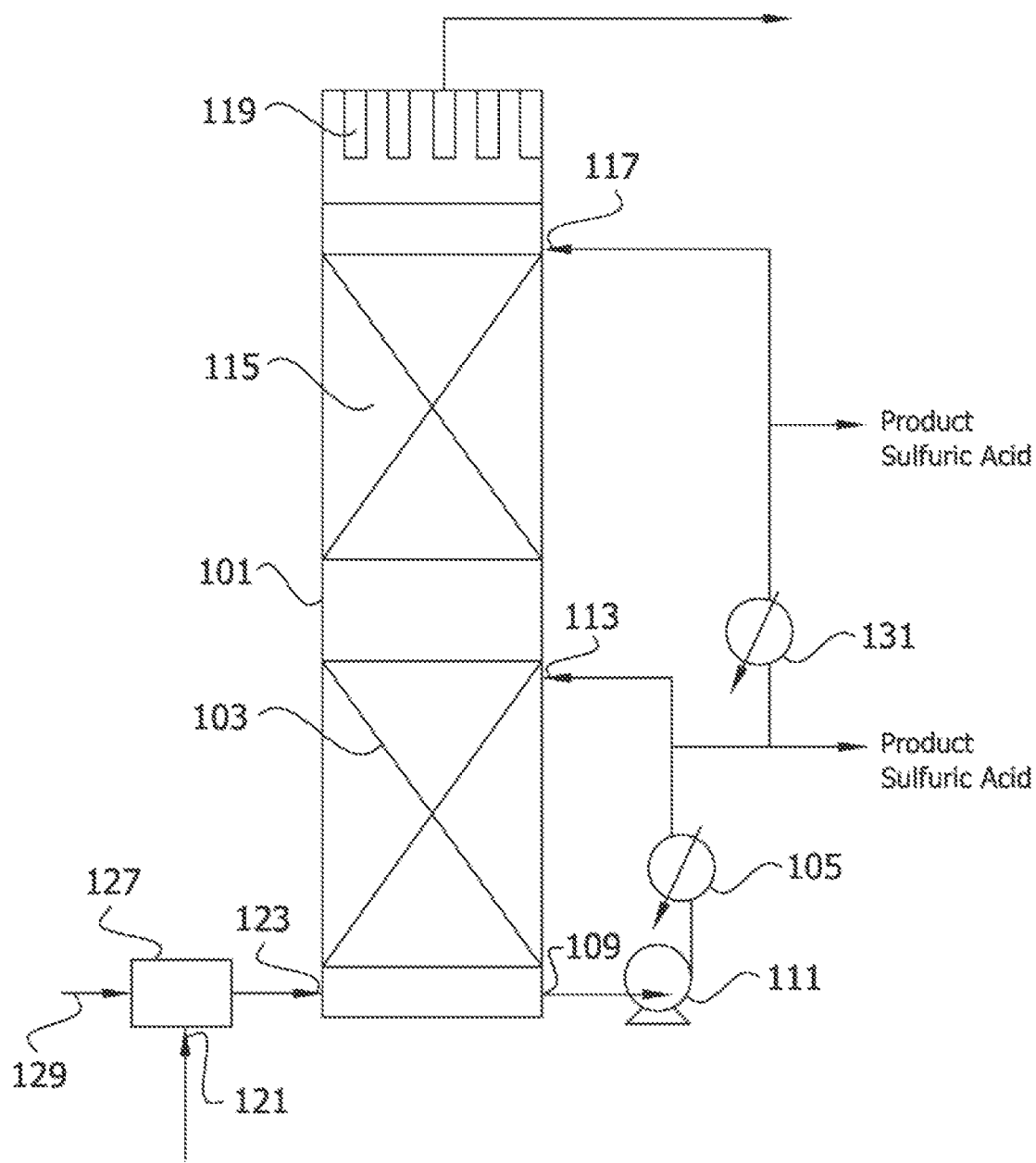
FIG. 3 is a process flow sheet similar to that of FIG. 2 in which the circulating absorption acid is divided between a stream that is returned to the primary absorption zone and a fraction that is circulated to the secondary absorption zone.

Conversion of $SO_3$ to sulfuric acid in the vapor phase is driven forward as acid vapor condenses and cooling of the gas creates a more favorable equilibrium for the forward reaction. Condensation of water vapor may tend to retard the vapor phase reaction, but the much lower vapor pressure of $H_2SO_4$ favors the condensation of sulfuric acid and vapor phase conversion of $SO_3$ in preference to condensation of water vapor. Moreover, maintaining the acid concentration in the heat recovery zone at or above the azeotrope provides the further advantage of minimizing the extent to which mist formation results from whatever fraction of $SO_3$ remains unabsorbed at the gas exit of the absorption zone. As illustrated in FIG. 3 of U.S. Pat. No. 5,538,707, where the acid concentration is below the azeotrope, and the exit gas stream has a composition that combines the equilibrium $SO_3$ and water vapor partial pressures with an increment of $SO_3$ pressure attributable to $SO_3$ slippage, the dew point of the exit gas is increased as compared to the equilibrium composition alone. This results in supersaturation in the vapor phase which typically leads to mist formation. However, where there is a comparable $SO_3$ increment attributable to slippage, but the acid concentration is at or above the azeotrope, the dew point of the exit gas is actually decreased by $SO_3$ slippage, and a supersaturated condition is avoided at this point. It will be understood that, if the exit $SO_3$ and/or $H_2SO_4$ vapor concentration is significant, other measures are preferably taken downstream of the heat recovery zone to recover the $SO_3$ in a manner that avoids mist generation in downstream regions. For example, as described in further detail below, the gas stream exiting the primary zone may be passed through a secondary absorption zone for absorption of the residual $SO_3$. As further discussed below, the conditions of operation of such a secondary zone can be controlled to minimize mist formation in either the latter absorption zone or further downstream.

Alternatively, an increased net driving force for $SO_3$ absorption can be created at constant heat recovery zone exit acid concentration by supplying less than all stoichiometric water requirements via injection of water vapor into the $SO_3$-bearing gas stream ahead of the heat recovery absorption zone. For example, steam can be injected into the $SO_3$ conversion gas in a proportion sufficient to raise the molar ratio of the equivalent moisture content to equivalent $SO_3$ content to a value greater than 0.40 but less than 1.0. However, if an acid concentration profile is established which provides an enhanced driving force for $SO_3$ absorption, the acid concentration at the gas exit of a countercurrent absorption zone may be well below the azeotrope, resulting in a relatively high vapor pressure and a risk of mist formation, especially at lower temperatures prevailing downstream of the heat recovery absorption zone, if any $SO_3$ slippage is incurred. On the other hand, if the concentration of the acid entering a countercurrent absorption zone is maintained at the azeotrope in order to minimize the vapor pressure of the acid in contact with the exit gas stream, then operating with significantly less than 100% water vapor injection into the $SO_3$ conversion gas has the effect, not of increasing, but significantly reducing the driving force for $SO_3$ absorption throughout the regions of the absorption zone remote from the gas exit. Moreover, to the extent that dilution water is provided via the acid circulation loop rather than as vapor introduced into the $SO_3$ conversion gas, a penalty in energy recovery is incurred.

Where the heat recovery absorption zone is operated in the preferred L/G ranges as set forth above, mass transfer coefficients are improved, thus contributing to control of $SO_3$ slippage and thereby further contributing to control of acid mist. Moreover, high L/G results in lower acid side temperature drop through the external heat exchanger and consequently enhanced driving force for heat transfer to the heat transfer fluid. By proper selection of packing, the preferred relatively high L/G ratios can be achieved without excessively increasing the diameter of a heat recovery tower or suffering increased gas pressure drop as compared to the performance of a heat recovery tower designed for operation at the same gas rate and a relatively low conventional L/G. Thus in operation at the preferred high L/G ratios described above, the mass flow rate of absorption acid liquid is preferably at least about 3,770 lbs/ft$^2$-hr (18,440 kg/m$^2$-hr), more preferably at least about 4500 lbs/ft$^2$-hr (22,100 kg/m$^2$-hr), typically between about 6000 and about 15000 lbs/ft$^2$-hr (between about 29,500 and about 73,800 kg/m$^2$-hr). Mass flow rate of gas through the heat recovery absorption zone is typically in the range between about 320 and about 1,100 lbs/ft$^2$-hr (1,500-5,200 kg/m$^2$-hr) at a pressure drop of about 18 cm $H_2O$ (7.1 in. $H_2O$) through the heat recovery absorption zone.

Rapid and efficient mass transfer is facilitated by use of structured packing. For example, the means for promoting gas/liquid contact and mass transfer between the gas and liquid phases may comprise structured packing sold under the trade designation FLEXERAMIC® 88 KG or FLEXERAMIC® 28 KG by Koch Knight LLC. Alternative tower packings include 7.6 cm (3 in) Intalox saddles, as available from Koch-Glitsch, and Flexisaddle LPD 7.6 cm (3 in) KG, also available from Koch Knight LLC.

Figure 7:
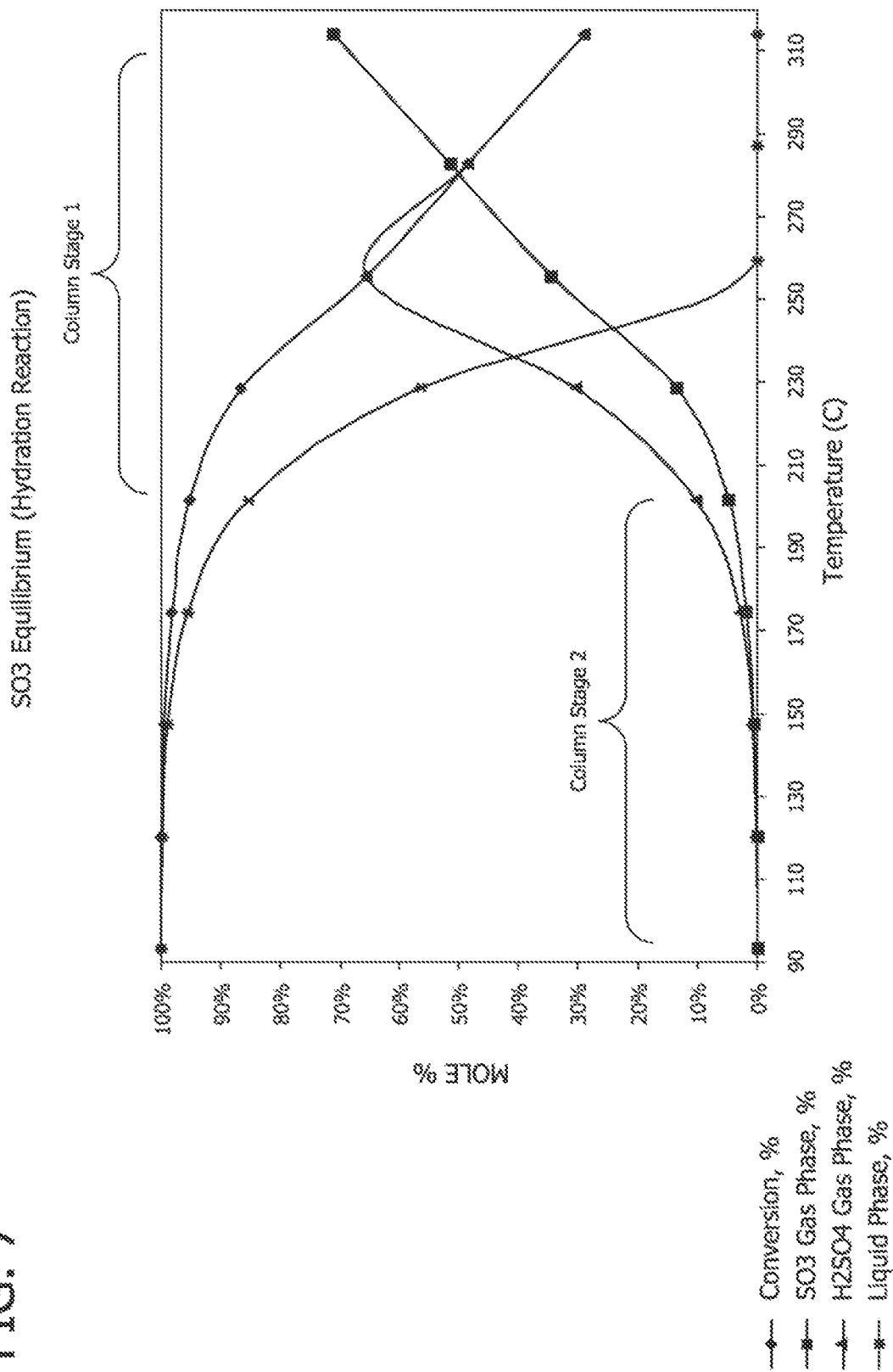
FIG. 7 presents curves plotting conversion of $SO_3$ to sulfuric acid, gas phase composition, and extent of condensation as a function of gas phase temperature in the operation of a countercurrent $SO_3$ absorption system into which a gas stream is introduced which contains the equivalent of approximately one mole water vapor per the equivalent of one mole $SO_3$.

In summary, mist generation in the heat recovery absorption zone is minimized by a combination of the high gas temperature achieved by high proportionate steam injection into the $SO_3$ conversion gas upstream of the absorption system, a generally high absorption acid temperature at the acid exit of the heat recovery zone, and high strength absorption acid. FIG. 7 illustrates the temperature profiles in a countercurrent heat recovery absorption zone under preferred conditions of operation, including injection of water vapor into water vapor injection zone 123 in a proportion sufficient to increase the molar ratio of the equivalent water vapor content to the equivalent $SO_3$ content of the gas stream to approximately 0.95 to 1.0 at the gas inlet of the absorption zone. At the base of the zone, the acid is quite hot, but there is still a substantial $\Delta t$ between the gas phase and the liquid phase. The gas cools fairly rapidly above its dew point, but as it approaches and passes below the dew point, the diminished $\Delta t$ and the effect of latent heat release cause the gas to cool more gradually, thereby minimizing supersaturation in the gas phase and formation of mist. Where supersaturation is avoided, sulfuric acid undergoes orderly transfer to the liquid phase rather than crash condensation and mist formation in the gas stream. In fact, as further shown in FIG. 12, there is essentially no mist formation at the base of the heat recovery zone. A modest level of mist is generated as the gas reaches its dew point, and another increment of mist is generated near the gas exit/acid inlet of the absorption zone where the bulk of $H_2SO_4$ condensation occurs.

Figure 12:
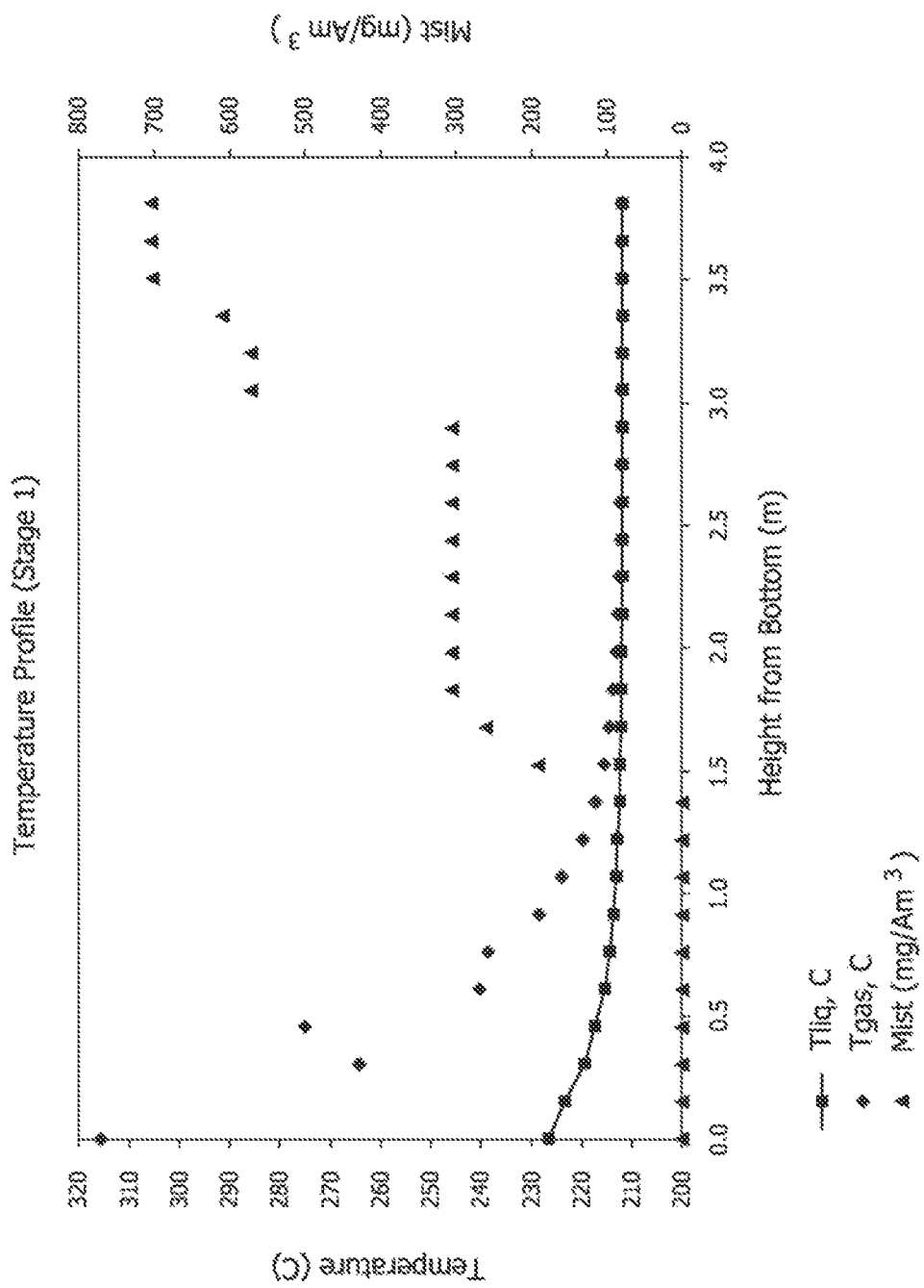
FIG. 12 presents typical gas temperature, liquid temperature, and mist concentration profiles for the primary absorption zone of an $SO_3$ absorption and heat recovery system of the type illustrated in FIG. 2, 3 or 10.

As further shown in FIG. 12, the liquid phase temperature reaches a maximum at the acid outlet, but above the acid exit at the bottom of the absorption zone, the gas temperature rapidly approaches the liquid temperature, and the two line out at the same level about one third of the way from the acid exit to the acid inlet.

The gas phase operating line for a countercurrent heat recovery column of the invention may be understood by reference to FIG. 7. The profiles in this graph actually plot gas composition on an equivalent $SO_3$ basis as a function of temperature rather than position in the fluid flow path within the heat recovery zone. However, by correlation of gas temperature and position within the absorption zone, they provide an illustration of the heat recovery absorption zone operating line on equivalent $SO_3$ basis under "Column Stage 1" at the right side of FIG. 7. In the case illustrated, 100% of dilution water is provided by injection of water vapor into the $SO_3$ conversion gas stream upstream of the heat recovery absorption zone with respect to the direction of conversion gas flow. Condensation of sulfuric acid, and any substantial removal of sensible heat, is preferably avoided prior to entry of the gas stream into the absorption zone. Thus, the gas stream enters the heat recovery absorption zone at a temperature of 315° C. The composition of the gas as it enters is shown at the far right side of the graph, i.e., on an equivalent $SO_3$ basis, the gas comprises about 69 mole % $SO_3$ and about 31 mole % $H_2SO_4$, a mole ratio of $H_2SO_4$ to $SO_3$ of about 0.45. As this is for the case in which 95 to 100% of dilution water is added prior to entry of the conversion gas into the heat recovery absorption zone, the range of operation contemplated by the invention generally comprises the introduction of a gas stream in which the molar ratio of sulfuric acid vapor to $SO_3$ is at least about 0.25, preferably at least about 0.30, more preferably, at least about 0.35. As the gas stream moves through the absorption zone countercurrently to the absorption liquid, FIG. 7 shows that the $SO_3$ content of the gas progressively declines. In regions of the absorption zone near to the gas inlet and acid exit, the sulfuric acid vapor content progressively increases as the gas progresses through the absorption zone, while the gas temperature drops, until the point is reached at which the gas is at its dew point. Once the gas has been cooled to a temperature at or below its dew point, the continuing formation of sulfuric acid in the vapor phase is offset by condensation of sulfuric acid into the liquid phase. Thus, the sulfuric acid content begins to drop from a peak of about 63 mole % on an $SO_3$ basis when the gas temperature is about 260° C. Although the plot of FIG. 7 depicts a modestly sharp drop, comparison with FIG. 12 demonstrates that reduction of vapor phase sulfuric acid content from 63 mole % to about 15 mole % takes place as the gas moves upwardly over roughly the bottom third of the heat recovery absorption zone, which in the case of FIG. 7 is distance of about 1.5 meters (5 ft.), or at a space velocity of 0.75 $sec^{-1}$. Generally, it is preferred that at least 40%, preferably at least 50%, of the $SO_3$ generated in the converter is condensed as sulfuric acid from the gas phase, and that the space velocity be at least about 0.3 $sec^{-1}$, preferably between about 0.3 and about 1 $sec^{-1}$, in a region of the heat recovery zone in which condensation of sulfuric acid from the gas phase occurs.

At the peak sulfuric acid vapor content shown in FIG. 7, the remaining $SO_3$ content is about 33 mole % on an equivalent $SO_3$ basis, so that the molar ratio of sulfuric acid content to $SO_3$ content is about 1.9. Once again, this is for the case in which 95 to 100% of dilution water is added prior to entry of the conversion gas into the heat recovery absorption zone. In the range of operation contemplated by the invention, the proportion of water vapor introduced into the sulfur oxide-bearing gas stream, the sulfuric acid strength, the temperature of the absorption liquid introduced into the absorption zone, and the L/G ratio in the absorption zone are controlled such that the molar ratio of sulfuric acid vapor to $SO_3$ reaches a maximum of at least about 1.2, preferably at least about 1.5, at a location within the absorption zone intermediate the gas inlet and gas exit thereof.

In the operation illustrated in FIG. 7, the gas phase contains about 10 mole % $H_2SO_4$ and about 4 mole % $SO_3$ at the gas exit/acid inlet of the heat recovery absorption zone, both as expressed on the basis of equivalent $SO_3$ introduced into the absorption zone, i.e., a molar ratio of about 2.5. On the same basis, total $H_2SO_4$ vapor plus $SO_3$ content of the gas stream exiting the absorption zone is about 14 mole % of the equivalent $SO_3$ content of the gas stream entering the absorption zone. Preferably, the total $H_2SO_4$ vapor plus $SO_3$ content of the gas at the gas exit is no greater than about 25%, more preferably not greater than about 20%, of the equivalent $SO_3$ content of the gas stream entering the absorption zone, the $SO_3$ content of the gas stream at the gas exit is not greater than about 8% of the $SO_3$ content of the gas stream entering the absorption zone, and the molar ratio of $H_2SO_4$ to $SO_3$ in the exit vapor stream is not greater than 1.6.

In preferred embodiments of the invention, control of acid mist is facilitated by passing the gas exiting the heat recovery absorption zone through a secondary absorption zone for recovery of residual $SO_3$ in the gas stream. The secondary absorption acid passed through the secondary absorption zone also serves to cool the gas stream and condense additional sulfuric acid from the vapor phase into the secondary acid. It should be understood that the operation of a secondary absorption zone in the manner described herein is generally effective for control of the mist generation, not only in the operation of an absorption heat recovery system in which the extent of heat recovery is enhanced by injection of water vapor, but also in a conventional dry gas or wet gas sulfuric acid plant in which no supplemental water vapor is injected into the conversion gas, combustion gas or combustion air. The novel principles of operation of the secondary absorption zone as described herein are substantially the same regardless of whether heat recovery is enhanced by injection of water vapor.

Figure 17:
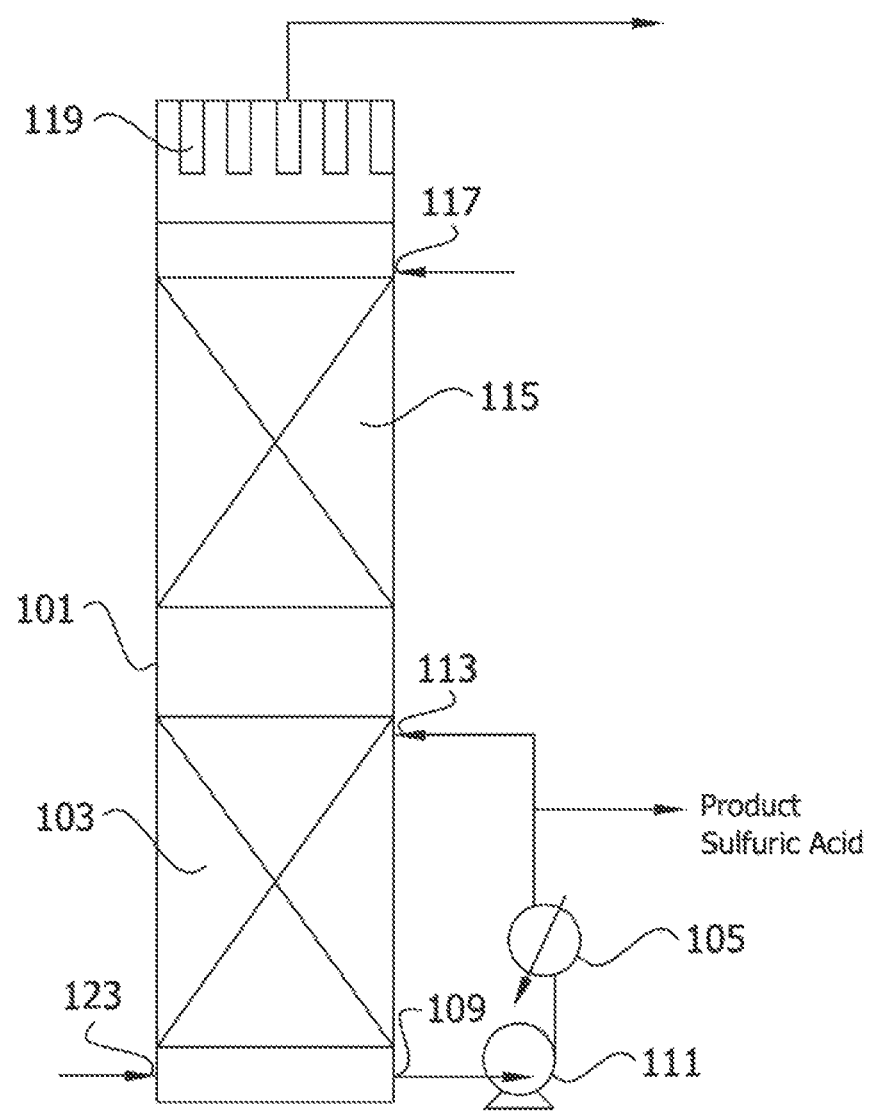
FIG. 17 is a process flow sheet for an $SO_3$ absorption and absorption energy recovery system comprising primary and secondary countercurrent absorption zones, that may be operated without injection of water vapor but in accordance with certain preferred embodiments of the process of the invention for control of mist generation.

FIG. 17 illustrates a process that is similar to that of FIG. 1, except that no water vapor is injected into the conversion gas before it enters a two zone heat recovery tower 101 at gas inlet 123. The conversion gas which is either dry or contains atmospheric moisture derived from combustion air passes upwardly through primary absorption zone 103 that contains packing or other means for promoting gas/liquid contact and mass transfer. $SO_3$ is transferred from the gas phase to the liquid phase in the primary absorption zone, and the liquid, enriched in sulfuric acid exits the heat recovery tower at acid exit 109 and is circulated through a heat recovery boiler 105 by a circulating pump 111. After removal of net sulfuric acid production downstream of the boiler, the acid stream is diluted by addition of water for reaction with $SO_3$ from the converter gas (diluter not shown), then returned to the top of the primary absorption zone at acid inlet 113.

Gas exiting the top of primary absorption zone 103 enters the bottom of a secondary absorption zone 115 which also comprises packing or other means for gas/liquid contact and mass transfer. The gas flows upwardly through secondary zone 115 countercurrently to secondary absorption acid which enters the tower at acid inlet 117. The gas stream then exits the tower passing through mist eliminators 119 before return to the converter or exit from the process. The preferred concentrations of acid entering and exiting the secondary absorption zone are as discussed above, and are essentially the same for both steam injection and dry embodiments. The strength of the acid at the gas inlet/acid exit of the primary absorption zone is also preferably as described for a steam injection operation, but the inlet acid concentration to the primary absorption zone is relatively lower because of the need for introduction of dilution water prior to return of the acid stream from the HRS boiler to the primary absorption zone. This may drive the acid concentration at the top of the primary zone below the azeotrope, thereby increasing mist formation in the upper end of the primary absorption zone, but control of mist is still achieved by operation of the secondary absorption zone under the conditions described above.

Figure 18:
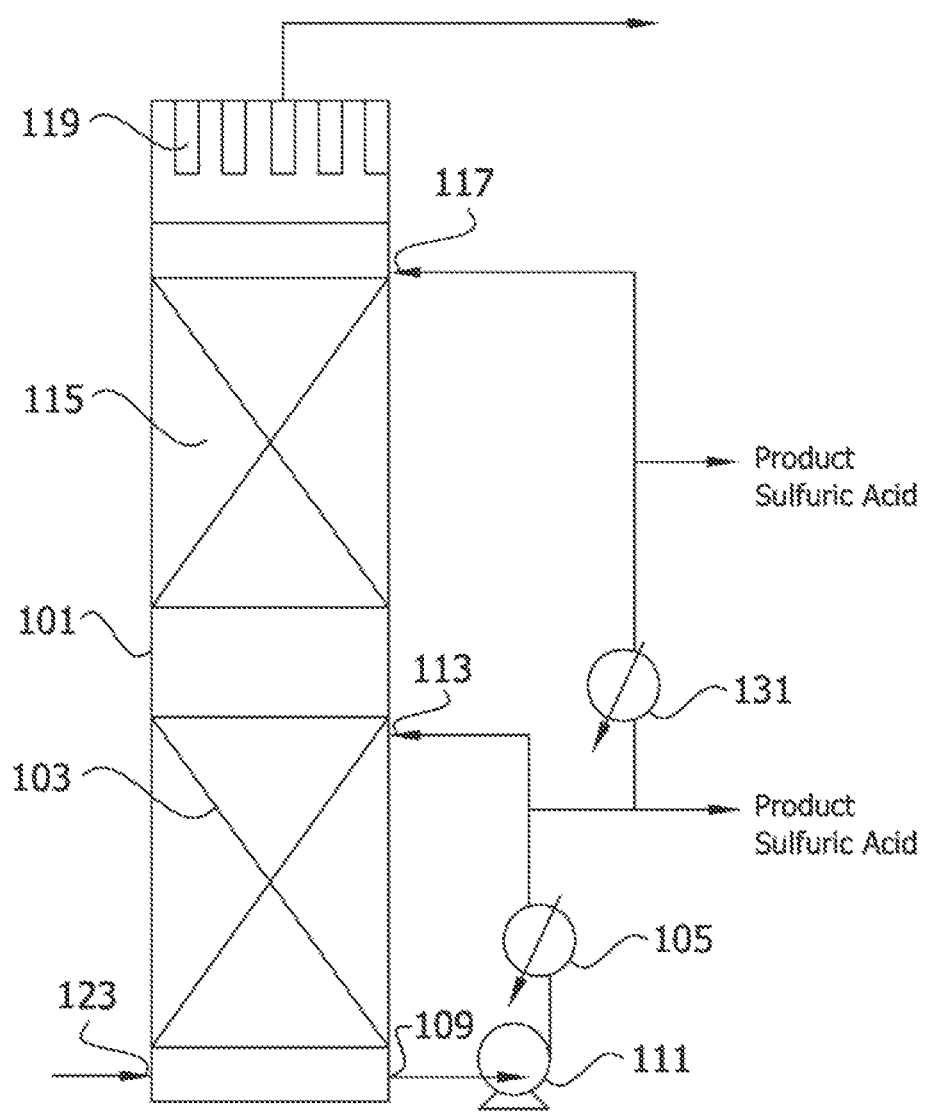
FIG. 18 is a process flow sheet for a process generally similar to that of FIG. 3 except that the process of FIG. 18 is operated without injection of water vapor into the conversion gas or combustion gas.

FIG. 18 is a flow sheet for another process in which the conversion gas stream is either dry or contains only atmospheric moisture. This process is identical to that of FIG. 17 except that the acid stream downstream of the product acid removal point is divided into a primary absorption acid stream that enters the primary absorption zone at acid inlet 113 and secondary absorption acid which is passed through an auxiliary heat exchanger 131 where additional absorption heat is removed, e.g., by heating boiler feed water to lower the temperature of the secondary absorption acid to the desired about 40° to 110°, preferably about 65° to 95° C., more preferably, about 75° to 90° C. range before return to the top of the secondary absorption zone via acid inlet 117. As indicated in the drawing, product acid can be removed from the secondary acid stream either upstream or downstream of heat exchanger 131. Except for the absence of steam injection, the process of FIG. 18 is comparable to that of FIG. 3 (discussed in detail below).

Prior art references vary in their teachings regarding the concentration of acid in the secondary absorption zone. U.S.

Pat. No. 4,996,038 describes an exemplary operation in which acid enters a secondary absorption zone at a concentration of 99.5% and exits at a concentration of 99.8%. By comparison, U.S. Pat. No. 5,118,490, which refers to the secondary stage as a condensing stage, states that the acid stream exiting the condensing stage has a concentration of 98.5 to 99.0%. U.S. Pat. No. 5,130,112 reports that the acid stream exits the condensing stage at about 98.5%, while U.S. Pat. No. 5,538,707 advises that the acid exits the secondary absorption zone at a concentration of 98.8%. In the process of the invention, any of these conditions can be selected.

However, in accordance with the present invention, it has been found preferable for purposes of mist control to operate at relatively high acid concentration at the gas inlet/acid exit of the secondary zone, e.g., at or even slightly above the azeotrope, but at modestly lower concentration at the gas exit/acid inlet of the secondary zone sufficient to assure substantially complete recovery of residual $SO_3$ from the gas stream entering from the primary absorption zone. Thus, the acid strength at the gas exit of the secondary zone is generally in the range between about 98.7% to about 99.2%, e.g., 98.8% to 99.0% where the primary acid entering the primary absorption zone has a strength in the range of 99.2% to 99.4%, or 98.5 to 99.0% preferably 98.5 to 98.7% where the primary acid entering the primary absorption zone is in the range of 99.4% to 99.6%. In the latter case, a relatively lower concentration of acid is necessary at the acid inlet/gas exit of the secondary absorption zone to assure sufficient driving force for absorption of the relatively greater fraction of residual $SO_3$ that remains unabsorbed in the primary zone and passes to the secondary zone in the gas stream. It is further preferred that the L/G be maintained in a range that minimizes the $\Delta t$ between the acid and the gas throughout the secondary absorption zone, and in particular that the temperature of the acid exiting the secondary absorption zone in contact with the entering gas not be significantly cooler than the acid at the gas exit of the primary absorption zone.

The relatively high acid strength at the gas inlet of the secondary zone assures that the secondary acid first encountered by gas exiting the primary zone is at or above the azeotrope, so that mixing of the equilibrium vapor in the secondary zone with any $SO_3$ slippage from the primary absorption zone does not cause supersaturation and mist formation, but rather decreases the dew point and facilitates controlled absorption of residual $SO_3$. The modestly lower acid concentration at the gas exit of the secondary zone assures efficient absorption of residual $SO_3$, thereby minimizing the potential for mist formation by reaction of $SO_3$ and $H_2O$ downstream of the absorber.

With reference to FIG. 3 of U.S. Pat. No. 5,538,707, operation with the acid stream at or above the azeotrope in the primary absorption zone and at the gas inlet/acid exit of the secondary absorption zone prevents the dew point of the gas from being increased as a result of whatever $SO_3$ remains unabsorbed in the gas stream exiting the primary zone. This can be important because by far the greatest proportion of acid mist is ordinarily generated in the secondary zone. If the gas exiting the primary absorption zone comes into contact in the lower section of the secondary absorption zone with secondary absorption acid having a temperature of 190° to 210° C. and a concentration below the azeotrope, the dew point sharply increases above the gas temperature as the $SO_3$ content of the gas reacts with water vapor from the acid phase, thus forming substantial volumes of sulfuric acid mist of relatively low acid strength and high corrosivity.

However, at the gas exit/acid inlet of the secondary zone, a slightly lower acid strength is both acceptable and desirable. In most cases, in fact, the acid strength entering the secondary zone is somewhat below the azeotrope in order to provide the driving force for absorption of residual $SO_3$. A concentration below the azeotrope in the acid entering the secondary absorption zone does not create the mischief reflected in FIG. 3 of U.S. Pat. No. 5,538,707 because the temperature of the inlet acid is relatively cold. While the gas exiting the secondary zone is in saturation equilibrium with the incoming acid, the associated mist load is small because the temperatures are low. As noted, the inlet acid to the secondary zone is preferably maintained in the range of about 65° to 95° C., more preferably in the range of about 75° to 90° C., at which the $H_2SO_4$ vapor pressure of the acid is relatively negligible. Whatever fraction of mist remains or forms in the exit gas can be readily removed by conventional mist eliminators.

Figure 19:
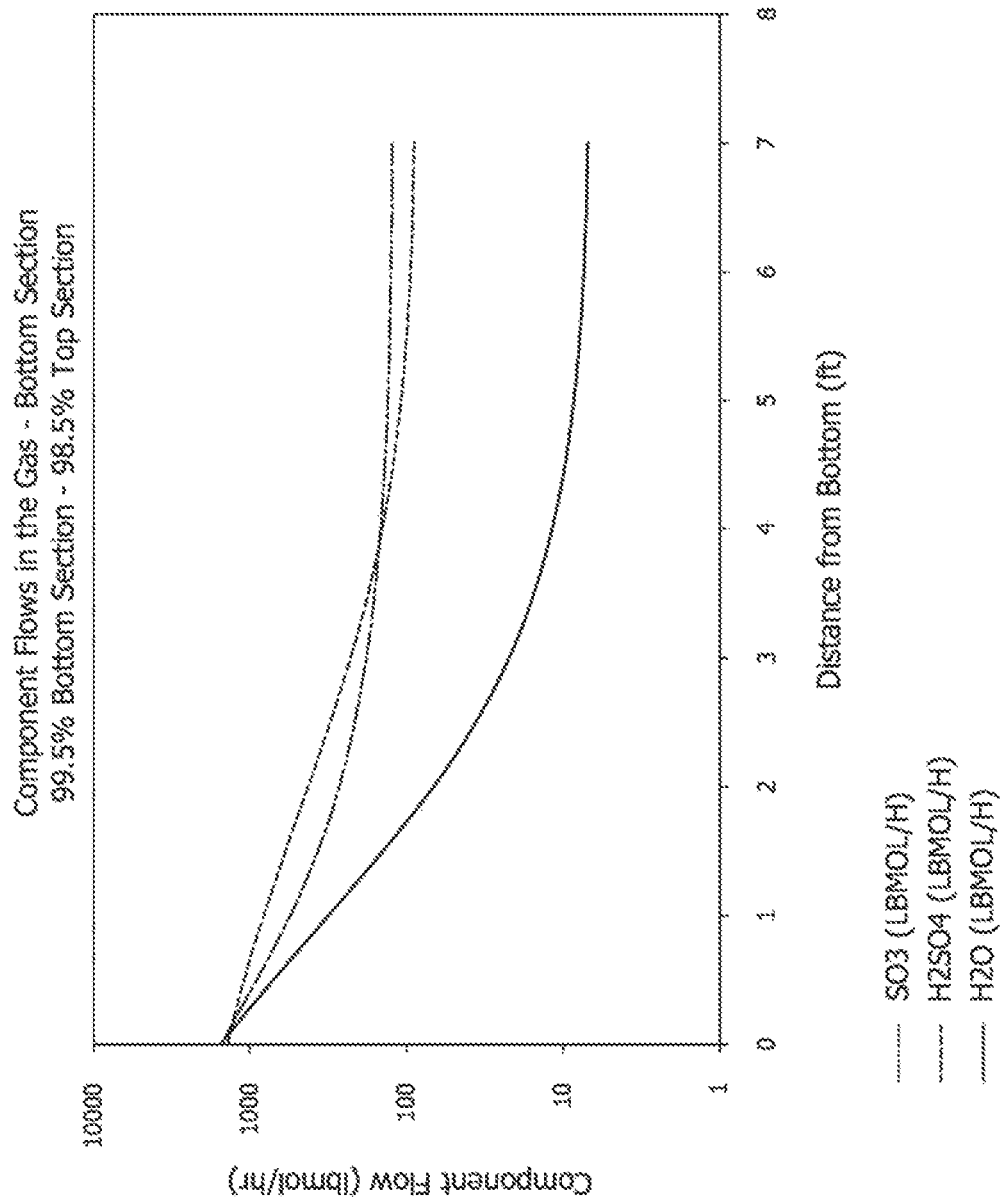
FIG. 19 plots the component flows of $SO_3$, $H_2SO_4$ vapor and water vapor in the gas stream vs. distance from the gas inlet in the primary absorption zone of a countercurrent heat recovery absorber comprising both a primary absorption zone and a secondary absorption zone located above the primary zone, wherein primary absorption acid enters the primary absorption zone at a concentration of 99.5 wt. %, secondary absorption acid enters the secondary absorption zone at a concentration of 98.5 wt. %, and the secondary acid exiting the secondary zone flows into the upper portion of the primary zone.
Figure 20:
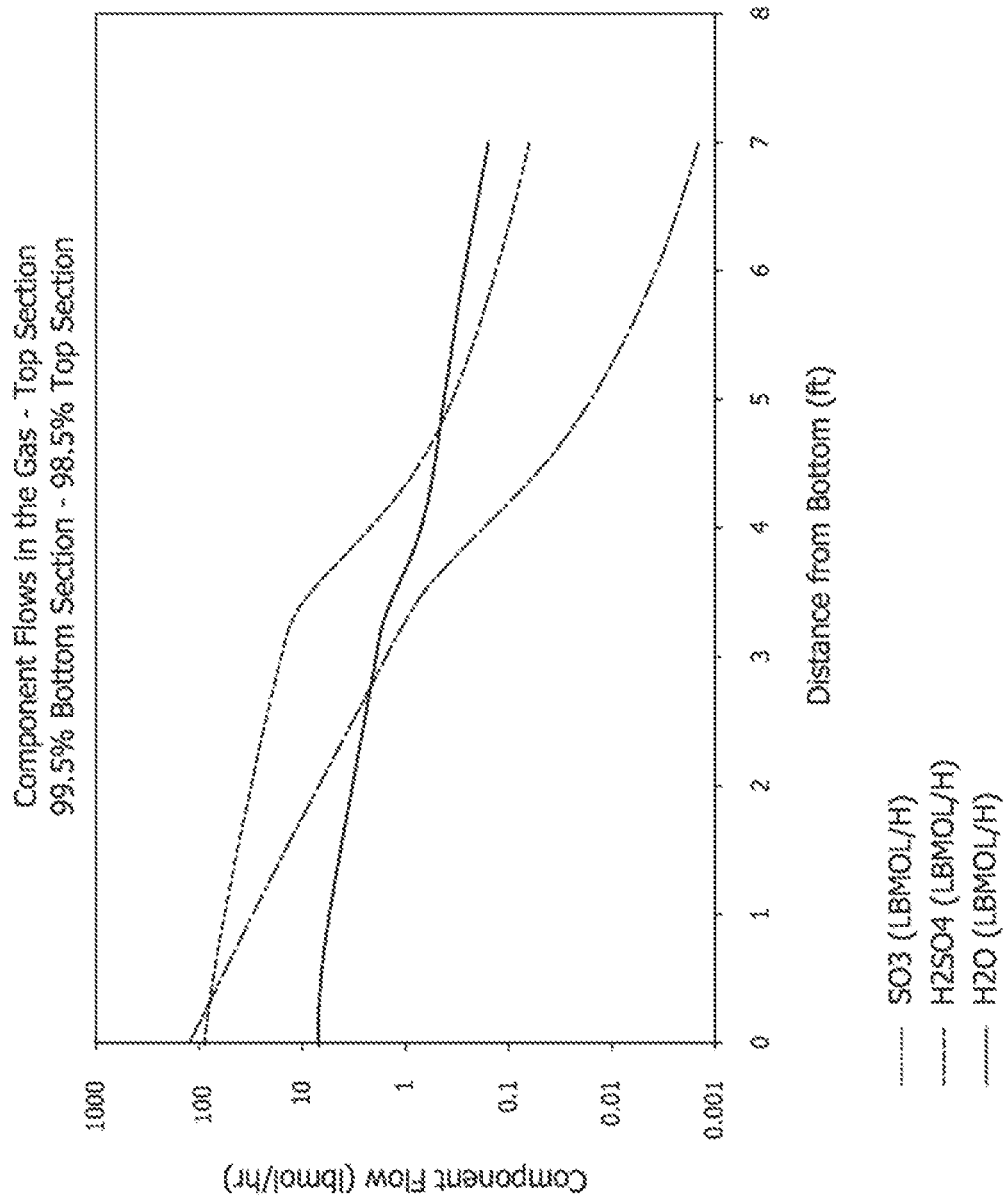
FIG. 20 plots the component flows of $SO_3$, $H_2SO_4$ vapor and water vapor in the gas stream vs. distance from the gas inlet in the secondary absorption zone of a countercurrent heat recovery absorber comprising both a primary absorption zone and a secondary absorption zone located above the primary zone, wherein primary absorption acid enters the primary absorption zone at a concentration of 99.5 wt. %, secondary absorption acid enters the secondary absorption zone at a concentration of 98.5 wt. %, and the secondary acid exiting the secondary zone flows into the upper portion of the primary zone.
Figure 21:
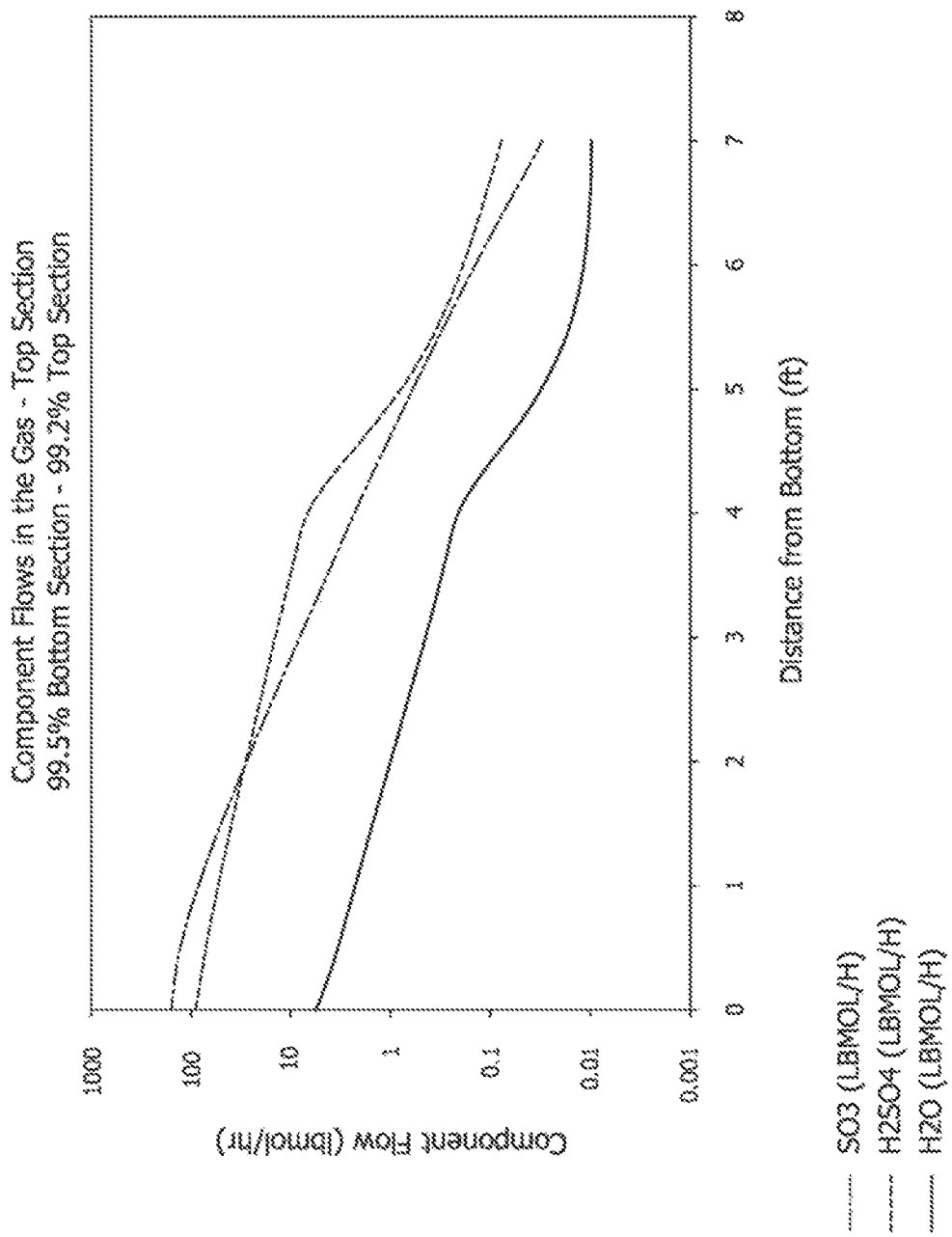
FIG. 21 plots the component flows of $SO_3$, $H_2SO_4$ vapor and water vapor in the gas stream vs. distance from the gas inlet in the secondary absorption zone of a countercurrent heat recovery absorber comprising both a primary absorption zone and a secondary absorption zone located above the primary zone, wherein primary absorption acid enters the primary absorption zone at a concentration of 99.5 wt. %, secondary absorption acid enters the secondary absorption zone at a concentration of 99.2 wt. %, and the secondary acid exiting the secondary zone flows into the upper portion of the primary zone.

The importance of achieving maximum absorption of $SO_3$ in the secondary absorption zone may be seen by reference to FIGS. 19-21. FIG. 19 illustrates the component flows of $SO_3$, $H_2SO_4$ vapor and $H_2O$ vapor in the gas stream from the gas inlet to the gas outlet of primary absorption zone in a countercurrent absorption process wherein substantially 100% of the dilution (reaction) water is supplied by injection of steam into the conversion gas upstream of the primary absorption zone, and the primary absorption acid is maintained at a strength of 99.5%. It is seen that sulfuric acid vapor is substantially transferred to the liquid acid phase, $SO_3$ is substantially absorbed or reacted with water vapor to produce sulfuric acid vapor that is transferred to the liquid acid phase, and $H_2O$ is substantially absorbed or reacted with $SO_3$ to produce sulfuric acid that is transferred to the liquid acid phase. However, material concentrations of both $SO_3$ and sulfuric acid remain in the vapor stream at the gas exit of the primary absorption zone where the temperature is in the range of 200° C. and the primary absorption acid concentration is 99.5%. Around 300 lb-moles/hr $SO_3$, about 90 lb-moles/hr sulfuric acid vapor, and about 7 lb-moles/hr water vapor remain in the gas stream passing from the primary to the secondary absorption zone.

FIG. 20 illustrates an embodiment of the process in which a gas stream having the composition exiting the primary absorption zone as shown in FIG. 19 and a temperature of about 200° C. enters a countercurrent secondary absorption zone into the top of which secondary acid is introduced at a concentration of 98.5%. In the gas stream exiting the secondary zone at a temperature of about 95° C., the $SO_3$ flow rate has been reduced to about 0.003 lb-moles/hr, sulfuric acid vapor flow rate has been reduced to about 0.06 lb-moles/hr, and the water vapor load has been reduced to about 0.16 lb-moles/hr. Although the concentration of the acid at the gas exit, i.e., 98.5% is below that azeotrope at the 95° C. exit temperature, the $SO_3$, $H_2SO_4$ and $H_2O$ vapor loads are too low to impose a significant downstream mist load on the system. Moreover, at the higher temperatures that prevail toward the gas inlet of the secondary zone, the acid concentration is preferably above the azeotrope.

By comparison, FIG. 21 illustrates operation at substantially 100% steam injection wherein the primary acid stream entering the primary zone has a strength of 99.5% and the secondary acid entering the secondary zone has a strength of 99.2. The residual component flows of $SO_3$ is 0.03 lb-moles/hr. or 10× the level achieved where secondary acid enters the secondary zone at 98.5%, and the residual component flow of sulfuric acid vapor is 0.8 lb-moles/hr. or 12-14× the rate at 98.5%. The residual component flow of water vapor is 0.01 lb-moles/hr, or slightly lower than the rate at 98.5%, but the much higher $SO_3$ and $H_2SO_4$ vapor flows assure substantially greater mist formation downstream of the absorber.

The mist loading on downstream process elements is the sum of liquid phase mist actually present in the gas stream, as reflected in FIGS. 12-16, plus $H_2SO_4$ vapor that condenses as the gas cools, including the $H_2SO_4$ that forms from the residual $SO_3$ and water vapor in the gas. These are reflected in FIGS. 20 and 21. Any fraction of actual liquid phase mist loading that may not be fully removed by the mist eliminators plus the $SO_3$ content of the gas flowing through the mist eliminators which reacts with water vapor in the gas to generate additional $H_2SO_4$, can condense from the relatively lower temperature gas stream at the lower temperatures of process side equipment and conduit surfaces downstream of the absorber where the temperatures may fall to levels significantly lower even than the 95° C. temperature typical of the gas exiting the secondary absorption zone.

For purposes of mist control, it is highly preferable to minimize the Δt between the gas phase and the liquid phase at the inlet and outlet of the secondary absorption zone, and more preferably substantially throughout the zone. A high Δt results in heat transfer from the gas phase to the liquid phase that is too rapid relative to the mass transfer of $SO_3$ and sulfuric acid vapor to the liquid phase, thus causing mist formation preferentially to mass transfer of $SO_3$ and sulfuric acid vapor to the liquid phase. In the regions of the secondary zone near the gas inlet, this results in shock cooling of the gas stream causing massive precipitation of fine sulfuric acid droplets in the gas phase. As illustrated in FIGS. 13-16 and discussed below, an excessive Δt near the gas exit of the secondary zone is typically associated with insufficient acid flow and inadequate absorption of residual $SO_3$ which then combines with water vapor in the gas downstream of the secondary zone to form mist as the gas further cools. Preferably, the Δt is not greater than about 35° C. at the acid inlet, acid outlet and more preferably throughout the zone. Still more preferably, the acid inlet Δt, acid outlet Δt, and Δt throughout the zone are not greater than about 30°, still more preferably not greater than about 25° C., or not greater than about 20° C. Under optimal conditions, the inlet and outlet Δts are not greater than about 15° C. or even not greater than about 10° C. Thus, the L/G in the secondary zone is set to control the energy balance so that the gas stream is cooled from the temperature exiting the primary absorption zone, which is preferably relatively close to the temperature of the acid exiting the secondary absorption zone, to a temperature that is close to the temperature of the acid fed to the second stage.

By prescribing the desired secondary zone inlet and outlet temperatures for both acid and gas, the L/G is effectively determined by the energy balance for the second stage according to the relationship:

$$GCp_g(T^g_{in}-T^g_{out})+H_{Rx\,SO3}+H_{cond\,H2SO4}=LCp_l(T^L_{in}-T^L_{out})$$

Where G and L are the liquid and gas flows, $Cp_g$ and $Cp_l$ are the heat capacities of the gas and liquid. We also have the heat of reaction of sulfur trioxide and the heat of condensation of sulfuric acid (these term are small since most of the sulfur trioxide and sulfuric acid are condensed in the first stage).

Although the acid strength is generally below the azeotrope in the upper portion of the second stage, the sulfuric acid volatility is much lower at the lower temperatures prevailing in the upper portion of the secondary zone, so that $SO_3$ predominates in the gas phase, leading to relatively concentrated acid in the mist.

Figure 13:
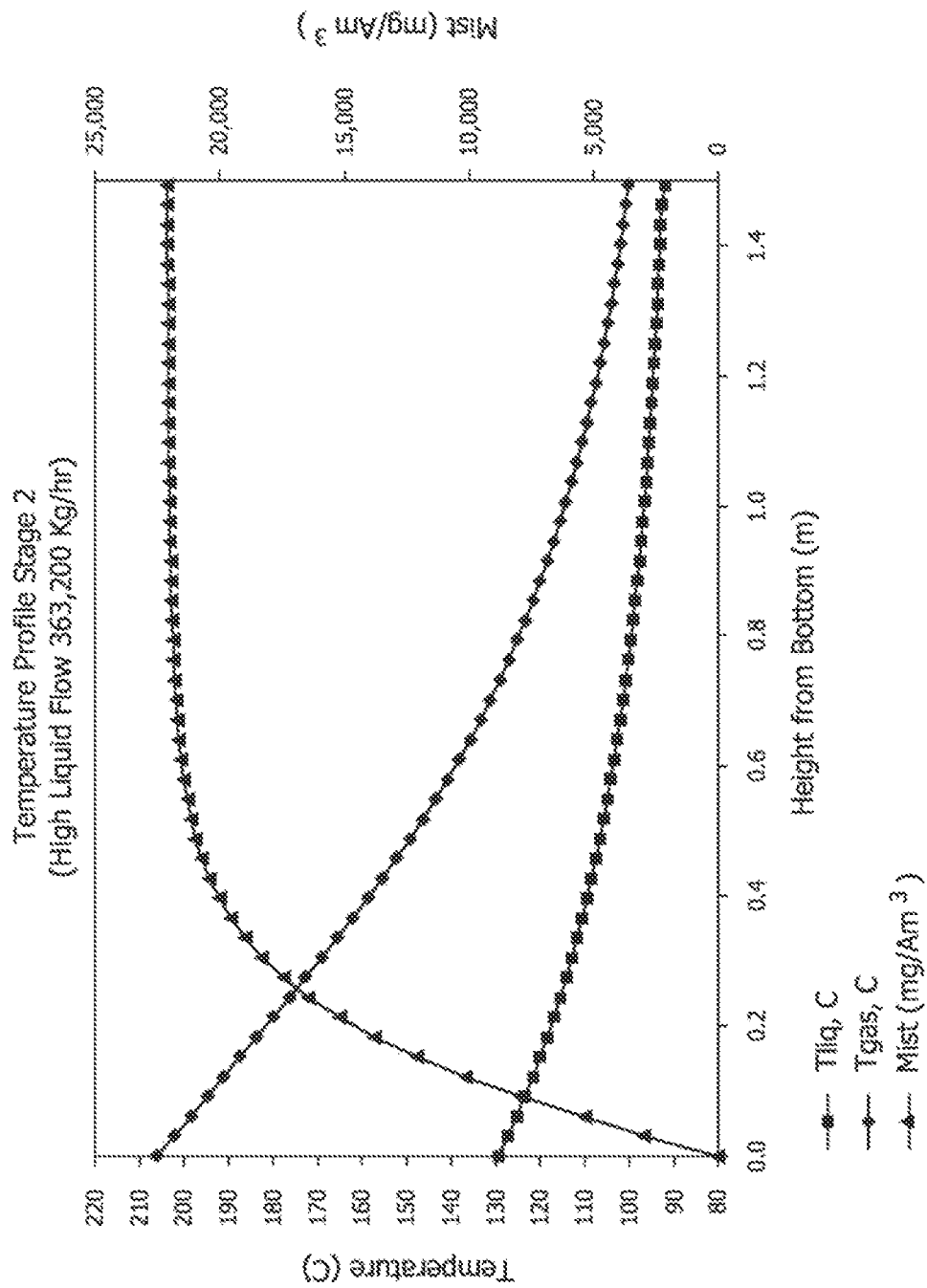
FIG. 13 presents typical gas temperature, liquid temperature, and mist concentration profiles for the secondary absorption zone of an $SO_3$ absorption and heat recovery system of the type illustrated in FIG. 2, 3 or 10 under high liquid flow conditions relative to the flow required to cool the gas stream.
Figure 14:
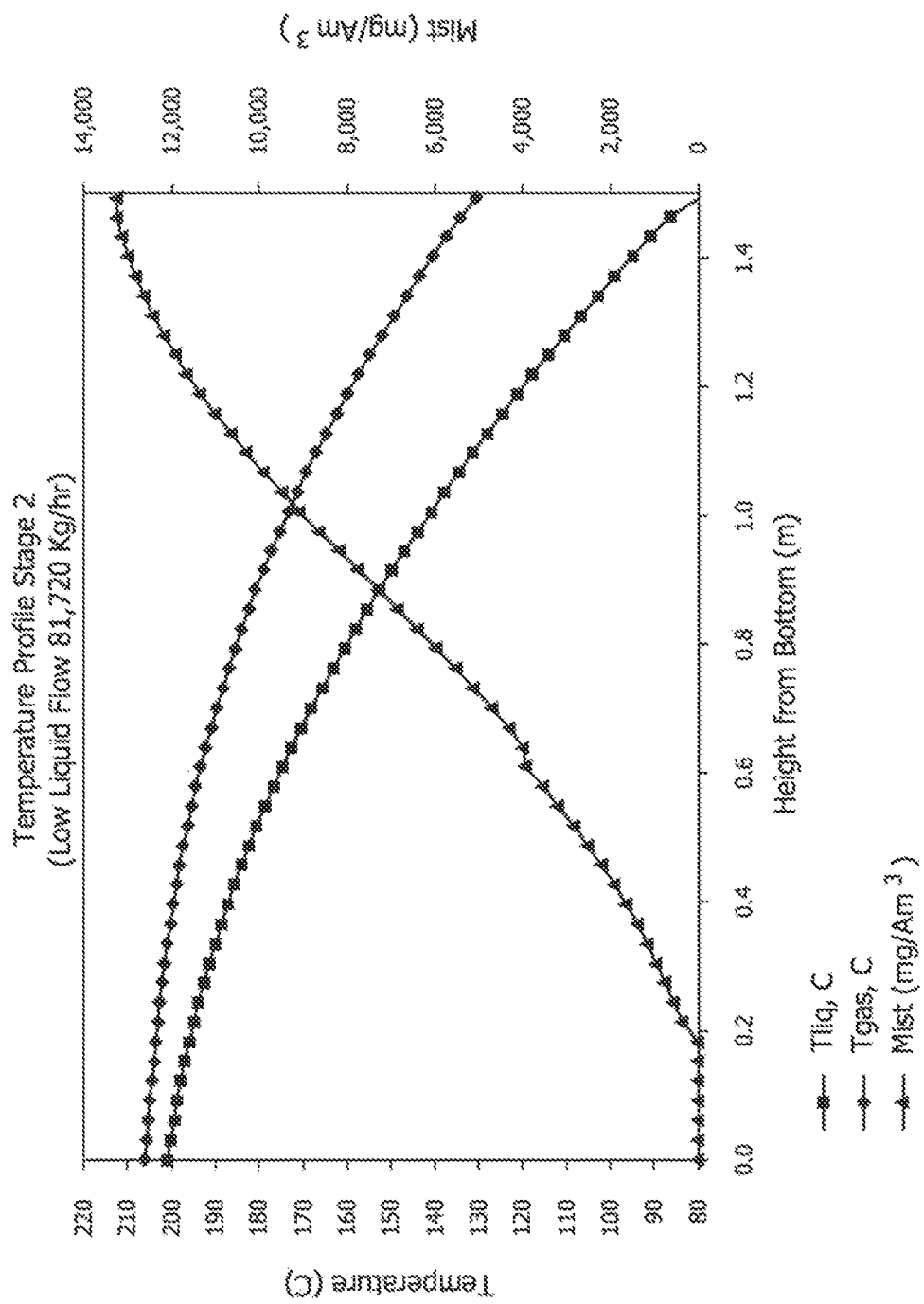
FIG. 14 presents typical gas temperature, liquid temperature, and mist concentration profiles under low liquid flow conditions for the secondary absorption zone of an $SO_3$ absorption and heat recovery system of the type illustrated in FIG. 2, 3 or 10.

In order to maintain the temperature profile for the secondary absorption zone in the ranges described above, the secondary absorption zone is operated at a relatively low mass L/G ratio, for example, between about 0.3 and about 2.0 on a total gas basis. It has been discovered that the temperature profile of the secondary absorption zone is quite sensitive to the L/G ratio. FIG. 13 depicts a typical temperature profile of a secondary absorption zone operated countercurrently at a high liquid flow rate, i.e., an L/G ratio of about 2.2. As shown, such operation results in a very large Δt between gas and liquid phases at the gas inlet of the secondary absorption zone. Consequent shock cooling of the gas stream results in massive mist formation, as is further shown in the profiles. Thus, the effect of the secondary absorption zone under these conditions is not to control acid mist, but rather to create it.

But excessively low secondary absorption acid liquid flow can also create mist. Operation at a low L/G of about 0.5 is depicted in the temperature profiles plotted in FIG. 14. In this case, the liquid flow rate is insufficient to adequately cool the gas stream and/or absorb residual $SO_3$, resulting in a progressively increasing gas/liquid Δt moving from the gas inlet to gas outlet of the countercurrent secondary zone, and consequently progressive formation of acid mist as the fluid temperatures diverge in sojourn of the gas through the zone.

Figure 15:
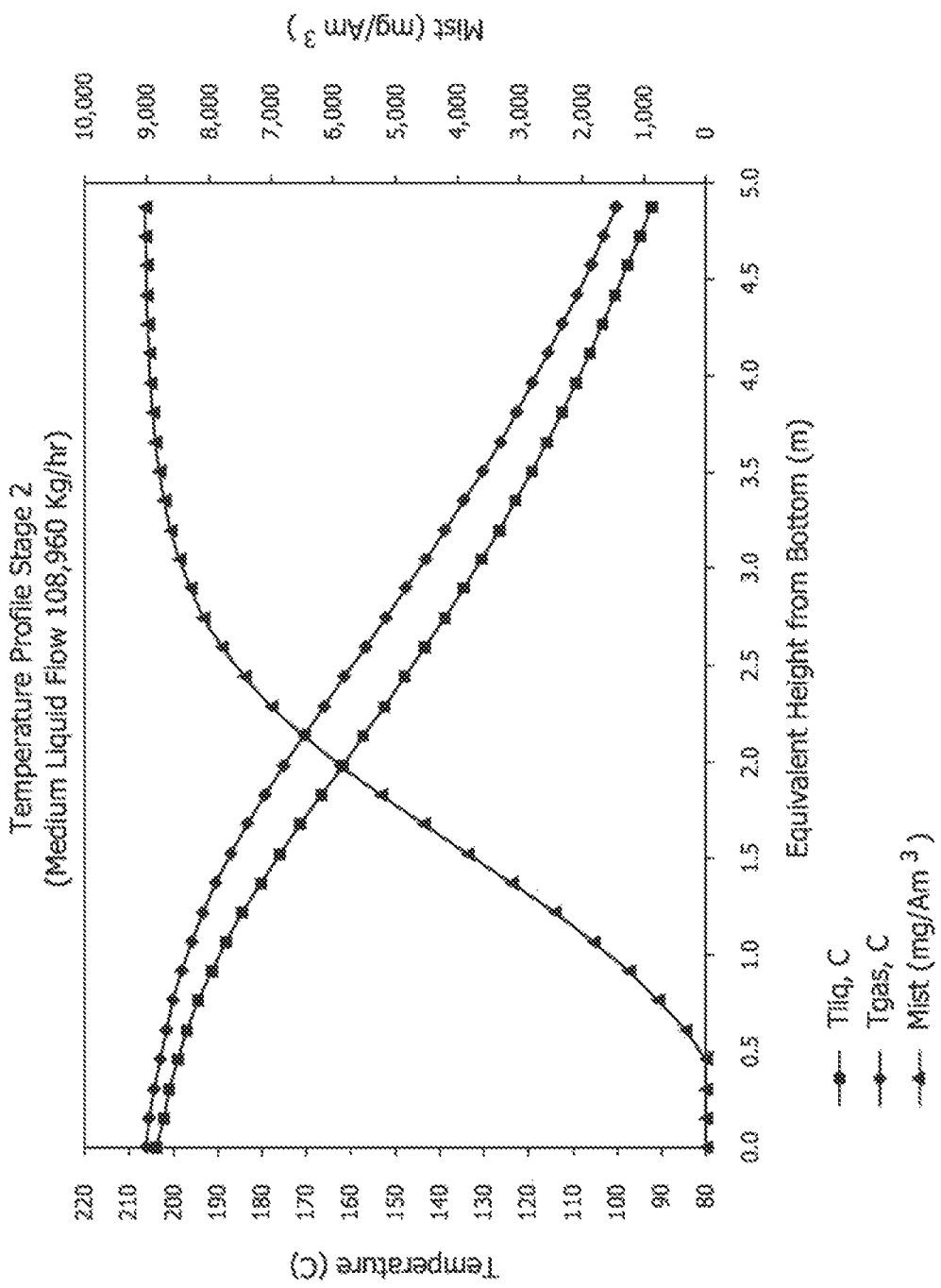
FIGS. 15 and 16 present typical gas temperature, liquid temperature, and mist concentration profiles under preferred intermediate liquid flow conditions for the secondary absorption zone of an $SO_3$ absorption and heat recovery system of the type illustrated in FIG. 2, 3 or 10.
Figure 16:
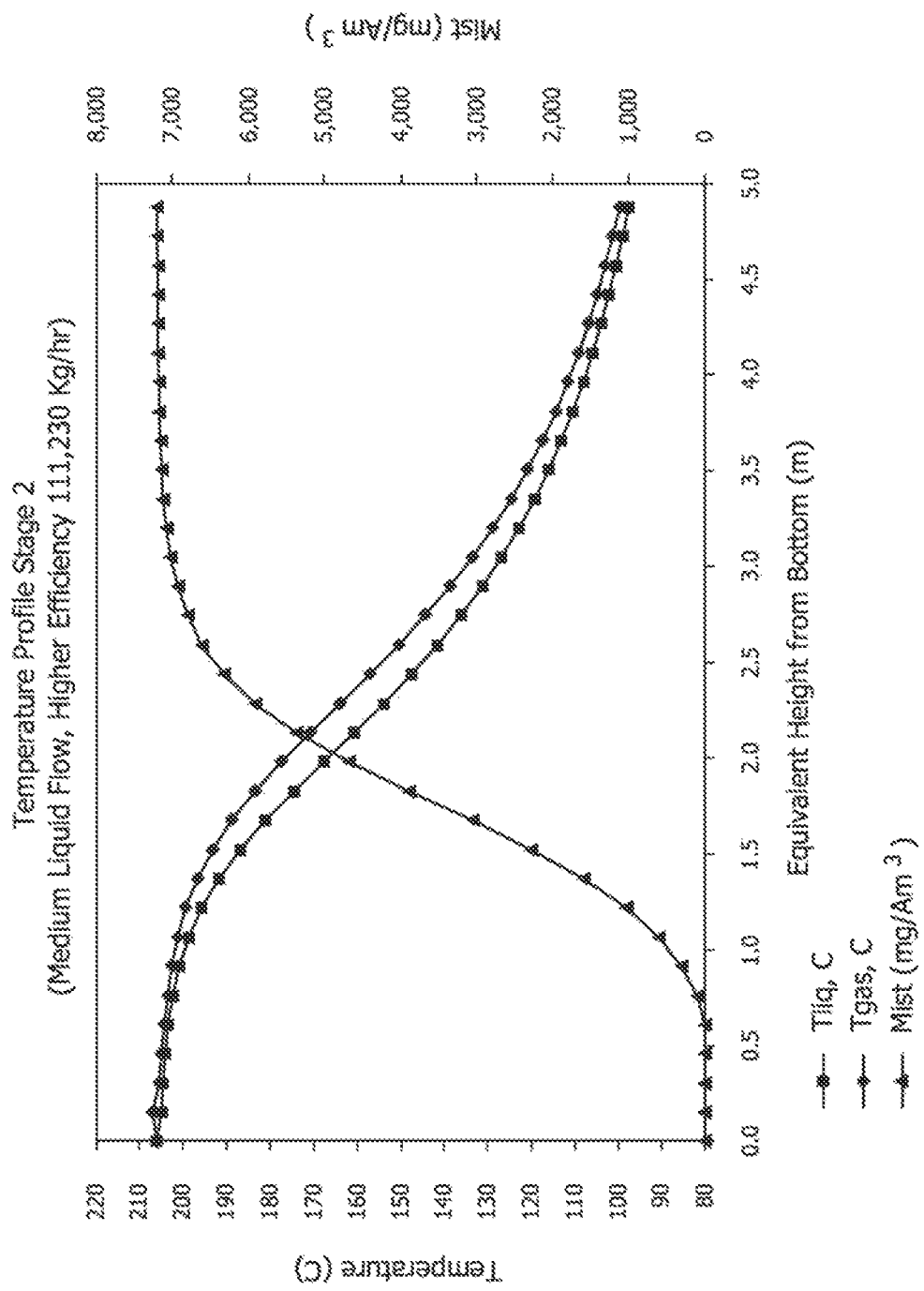

FIG. 15 illustrates a preferred embodiment of the invention using a medium, or balanced, liquid flow providing an L/G of about 0.8. In this case, the Δt between gas and liquid phases is never greater than about 10-12° C. Some mist unavoidably forms as the gas cools, but the fraction of mist is within the range that can be dealt with using conventional mist elimination elements. Further reduction in mist can be realized using a structured packing of the type discussed hereinabove. Such operation is illustrated in FIG. 16 wherein the Δt is not greater than about 8-10° C. throughout the secondary absorption zone and mist generation is about 20% lower than in the case of FIG. 15.

Generally, it is preferred that the secondary absorption zone be operated with an L/G between about 0.3 and about 2, more preferably between about 0.4 and about 1.5, most preferably between about 0.4 and about 1.0, on a total gas flow basis, the optimal ratio generally increasing with the strength of the acid introduced to the secondary zone. These preferred ratios apply regardless of whether water vapor is injected into the converter gas entering the primary absorption zone or, instead, the converter gas is either dry or contains only atmospheric moisture. Mass flow rate of secondary absorption liquid is typically at least about 380 lbs/ft²-hr (1850 kg/m²-hr), preferably between about 415 and about 1,130 lbs/ft²-hr (between about 2,000 and about 5,500 kg/m²-hr), while the mass flow rate of the gas phase is at least about 200 lbs/ft²-hr (1,040 kg/m²-hr), preferably between about 400 and about 1,100 lbs/ft²-hr (between about 2,000 and about 5,000 kg/m²-hr). To minimize mist formation, it is preferred that the relative flow rates of the gas stream entering the secondary absorption zone and the secondary absorption liquid stream entering the secondary absorption zone are such that the difference between the local bulk temperature of the gas phase and the local bulk temperature of the secondary absorption liquid phase with which the gas is in contact is not greater than about 35° C. at either the liquid inlet or liquid exit of the secondary absorption zone. For example, the difference between the local bulk temperature of the gas phase and the local bulk temperature of the secondary absorption liquid phase with which the gas is in contact is between about 15° and about 35° C. at both the liquid inlet or liquid exit of the secondary absorption zone. It is particularly preferred that the gas/liquid Δt is not greater than about 30° C., more preferably not greater than about 25° C., more preferably not greater than about 20° C., still more preferably not greater than about 15° C. and optimally not greater than about 10° C. at the gas inlet/liquid exit of the secondary zone. It is also preferred that these relative flow rates are such that the maximum difference between the local bulk temperature of the gas phase and the local bulk temperature of the secondary absorption liquid phase with which the gas is in contact is not greater than about 35° C., more preferably not greater than about 30° C., more preferably not greater than about 25° C., more preferably not greater than about 20° C., still more preferably not greater than about 15° C. and optimally not greater than about 10° C. within any locus of gas/liquid contact within the zone that is defined by a constant distance from the liquid inlet to the zone. Stated another way, the local integrated average difference between the temperature of the gas phase and the temperature of the secondary absorption liquid phase with which the gas is in contact is not greater than about 35° C., preferably not greater than about 30° C., more preferably not greater than about 25° C., more preferably not greater than about 20° C., still more preferably not greater than about 15° C. and optimally not greater than about 10° C., anywhere in the secondary absorption zone, such local integrated average contact temperature difference being determined by integration across any locus of gas/liquid contact within the zone that is defined by a constant distance from the liquid inlet to the zone.

Within the preferred L/G range, the acid temperature exiting the secondary absorption zone can be maintained in the ranges noted above, i.e., about 40° to 110° C., more preferably about 75° to 90° C., and the acid exit temperature is maintained in the range of about 175° to 215° C. Corresponding gas temperatures are typically 10° to 35° C. higher than the temperature of the acid with which the gas is in contact. The preferred concentration of the inlet acid to a countercurrent secondary absorption zone, i.e., the concentration of acid in contact with the gas stream exiting the secondary zone, is as described above and outlined in Table 1. Control of the L/G in the preferred ranges functions to control the $\Delta t$ between the gas and liquid phases at a minimal level throughout the secondary absorption zone, e.g., a $\Delta t$ that does not exceed about 35° C. throughout the secondary absorption zone. Acid concentration in the gas stream exiting the secondary zone is controlled by controlling the secondary absorption zone exit acid concentration, inlet acid concentration and inlet acid/exit gas temperature. The temperature of the exit gas is controlled by controlling the inlet acid temperature to the zone.

Although exit gas temperatures in the ranges outlined above are acceptable, it is possible to further reduce the mist loading by introducing the secondary absorption acid at a temperature in the lower portion of the 40° C. to 110° C. range. However, to preserve the desired $\Delta t$ profile at the preferred L/G ratio, it may be necessary to add packed height to the secondary absorption zone in order to accommodate lower inlet acid and lower exit gas temperatures. However, because the temperature of the exit gas stream is low, the contribution to mist loading of $SO_3$, sulfuric acid vapor and water vapor in the exit gas stream is small.

By comparison of FIG. 12 with FIGS. 13-16, it may be seen that the main situs for acid mist formation is in the secondary absorption zone, either in the upstream portion where liquid flow is too high, or in the downstream portion where liquid flow is too low. In either case, mist formation in the secondary zone far exceeds mist formation in the primary zone. While a primary purpose of the secondary zone is to control mist formation, these profiles show that effective mist control is only achieved where the proper balance of L/G, inlet acid concentration and gas vs. liquid $\Delta t$ are preserved throughout the secondary zone. If acid flow is too high or too low, resulting from poor selection of L/G, or if the inlet acid concentration does not fall within the desired range, the operation of the secondary zone falls short of the principal purpose for which it exists. It remains desirable to avoid aggravating the mist problem by an unfavorable choice of conditions in the primary zone, e.g., by operating with absorption acid below the azeotrope, but the main burden of mist control falls in the management and control of conditions in the secondary zone.

In operation at high rates of water vapor injection into the primary absorption zone, the primary absorption acid is typically on the oleum side, i.e., above the azeotrope at both the acid exit and acid inlet of the absorption zone. A high acid strength at the exit of the zone is highly desired in order to minimize the rate of corrosion of Fe/Cr alloy tubes of a heat exchanger through which the acid is circulated for recovery of the energy of absorption. Where a high proportion of the reaction water is provided by injection of water vapor, e.g., more than 80%, 90% or higher, there is very little concentration gradient across the absorber, meaning that the inlet (gas exit) acid strength is also typically at or slightly on the oleum side.

Because the gas exiting the primary absorption zone is essentially in equilibrium with the acid entering the primary zone, the gas entering the secondary absorption zone also has a composition above the azeotrope, which means that it has an appreciable residual concentration of $SO_3$ which has not been removed in the primary absorption acid. Unless that $SO_3$ is removed from the gas phase, there is a substantial potential for mist formation in the gas exiting the secondary absorption zone.

To assure that $SO_3$ has been fully stripped from the gas exiting the primary absorption zone, it is important that the secondary acid entering the secondary absorption zone be below the azeotrope concentration of sulfuric acid by a margin sufficient to provide a net water supply to the secondary absorption zone at least stoichiometrically equivalent to the $SO_3$ slippage through the primary zone, i.e., the equivalent to the $SO_3$ content of the gas entering the secondary zone.

In this respect, the principles of operation of the secondary absorption zone differ from the principles of operation of the primary absorption zone as recommended in McAlister et al. U.S. Pat. No. 5,130,112 and illustrated in FIG. 3 thereof. While the McAlister disclosure recommends that the acid entering a countercurrent primary absorption zone and the gas exiting that zone have a composition in which the $SO_3$ concentration is above the azeotrope in order to assure a relatively low dew point and thus minimize mist formation as the gas exiting the primary zone is cooled, a different but complementary principle applies at the much lower temperatures that prevail as the gas exits the secondary zone. As the gas cools in passage through the secondary zone, the only way to stay above the dew point is to remove $SO_3$ from the gas; and, for this purpose, an excess of water is required.

Figure 24:
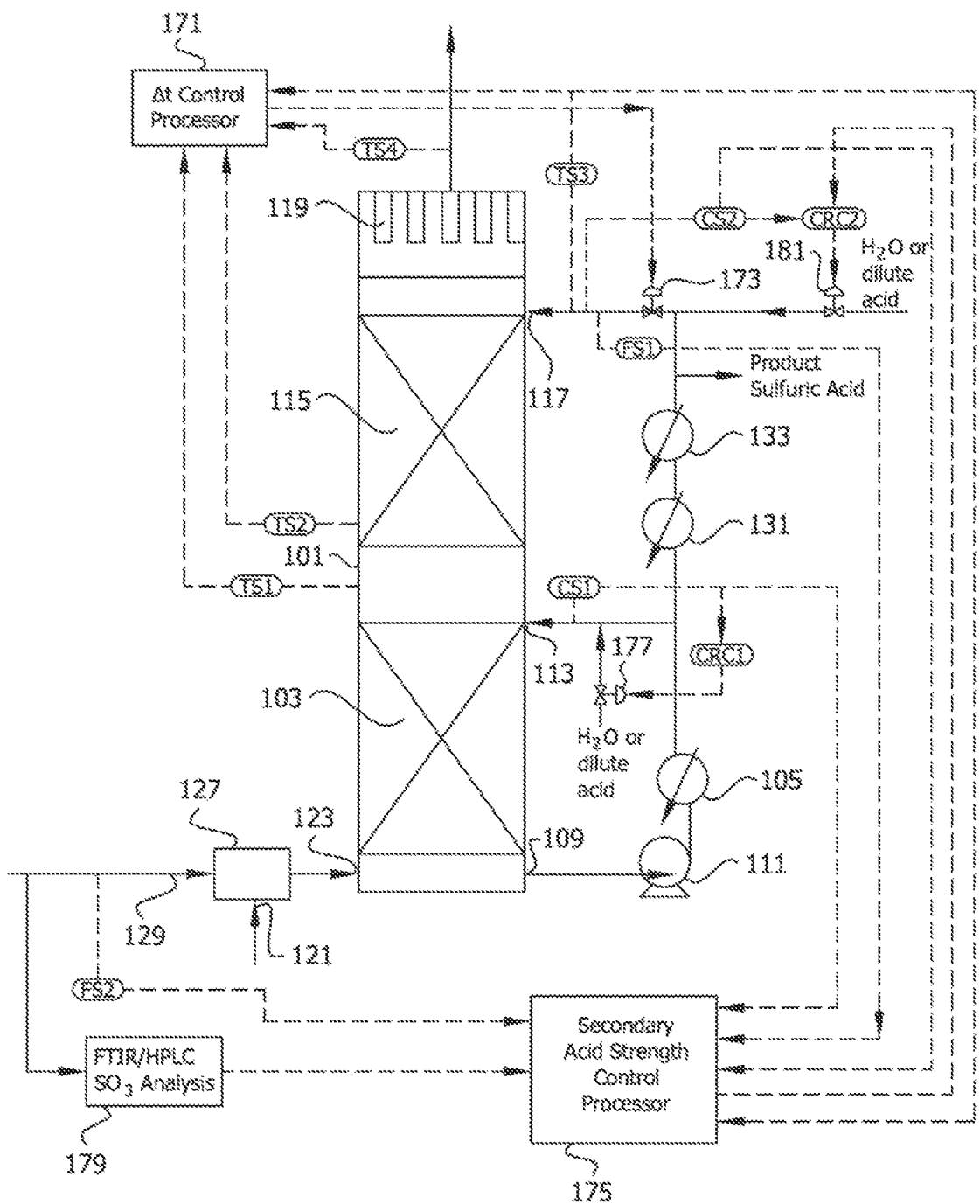
FIG. 24 is a process flow sheet for an $SO_3$ absorption and absorption energy recovery system according to a preferred embodiment of the invention including high rates of steam injection into the primary absorption zone similar to that of FIGS. 3, 9, 10, 11 and 23 and showing a schematic depiction of system for controlling operation of the secondary absorption zone.

FIG. 24 is a schematic depiction of a system for controlling operation of the secondary absorption zone in a manner that assures both a minimal gas/liquid temperature differential or $\Delta t$ in the zone and a water supply in the secondary absorption acid sufficient to remove residual $SO_3$ that enters with the gas flowing from the exit of the primary zone.

Temperature sensors (TS) measure the temperature of the gas entering secondary absorption zone 115 (TS1), the secondary absorption liquid exiting the secondary absorption zone (TS2), the secondary absorption liquid entering the secondary absorption zone (TS3) and the gas exiting the secondary absorption zone (TS4). Signals from these temperature sensors are fed to a $\Delta t$ control processor 171. A signal from the $\Delta t$ control processor to control valve 173 in the secondary absorption acid feed line to the secondary absorption zone adjusts the flow of secondary acid delivered to the absorption zone so that the gas/liquid Δt at both the acid inlet and acid outlet of the secondary absorption zone is not greater than about 35° C., preferably not greater than about 30° C., still more preferably not greater than about 25° C., or not greater than about 20° C. Under optimal conditions, the inlet and outlet Δts are not greater than about 15° C. or even not greater than about 10° C.

A conductivity sensor CS1 in contact with primary absorption acid entering the primary absorption zone 103 sends a signal to both a primary absorption acid conductivity recorder/controller (CRC1) and a secondary acid strength control processor 175. In response to this signal, conductivity controller CRC1 sends a signal adjusting control valve 177 to control the rate of delivery of dilution water to the circulating primary absorption acid stream at a rate that maintains a desired strength of the absorption acid recirculated to the primary absorption zone 103. Optionally and advantageously, cross-flow of relatively dilute acid, e.g., 93% acid, may be used as the source of water for dilution.

Water vapor is injected into the conversion gas through port 121 of the water vapor injection zone 127 in proportion sufficient so that the equivalent water content of the conversion gas entering the absorber is at least 0.40 moles, more preferably at least 0.50, 0.55, 0.60, 0.70 moles, or 0.80 moles, most typically between about 0.55 and about 0.98 moles, per mole total equivalent sulfur oxide content in the gas entering the primary absorption zone. As the equivalent water/equivalent sulfur oxide ratio approaches 0.98, the operation approaches the point at which all reaction water for the primary absorption zone is supplied by injection of water vapor at 127, dispensing with the need for introduction of water or dilute acid through valve 177. Typically, a balanced rate of net acid production removed from the absorption system may be maintained by level or conductivity control of acid in the absorption tower sump or separate acid pump tank (not shown).

From equilibrium data stored in secondary acid strength control processor 175 and the conductivity signal received from CS1, processor 175 computes the sulfuric acid vapor, water vapor and $SO_3$ vapor content of the gas exiting the primary absorption zone 103 and entering the secondary absorption zone 115 on the premise that the gas stream exiting the primary zone is in equilibrium with the acid entering the zone.

Secondary acid strength control processor 175 also receives a signal from a flow sensor FS1 in the secondary acid stream entering the secondary absorption zone 115, a flow sensor FS2 in the conversion gas stream entering the primary absorption zone 103, and an in-line analyzer 179 in the conversion gas stream which measures the $SO_3$ content of the conversion gas. From the these three signals plus the composition of the gas entering the secondary absorption zone 115 as determined from the CS1 conductivity signal and stored equilibrium data, processor 175 computes a material balance across the secondary absorption zone which determines the rate at which water must be added to the secondary acid stream entering secondary absorption zone 115 in order to provide a net available water supply to the secondary zone sufficient to assure that composition of the gas exiting the secondary absorption zone is equal to or above the azeotrope composition with respect to water content and equal to or below the azeotrope composition with respect to $SO_3$ content.

Where steady state conditions are established, the rate at which elemental sulfur or other homogeneous sulfur source are fed to the sulfur burner can be measured and the material balance compute feeding this rate to processor 175 rather than the combination of gas flow measured by in-line analyzer 179 and flow sensor FS2.

A conductivity sensor CS2 measures the conductivity of the acid entering the secondary absorption zone and transmits that signal both to secondary acid strength control processor 175 and a conductivity recorder/controller CRC2 that is in communication with the valve positioner on a valve 181 that controls the rate of dilution water (or cross-flow dilute acid) introduced into the secondary acid stream. Processor 175 also receives a signal from temperature sensor TS3 which measures the temperature of the acid entering the secondary absorption zone. From the material balance that it has computed for the secondary zone, processor 175 determines the concentration of the secondary acid entering the secondary acid absorption zone 115 sufficient to afford the net water supply which assures that $SO_3$ in the gas exiting the absorption zone has been extinguished to a level sufficient to avoid excess mist formation as the gas cools. The processor transforms the desired concentration into a conductivity at the acid temperature as measured by TS3 and transmits a signal to conductivity recorder controller CRC2 which adjusts valve 181 to control the rate of delivery of dilution water to the circulating secondary acid stream at a rate which establishes the desired composition of the gas exiting the secondary absorption zone. The processor establishes a rate of water addition which assures that the suppression of $SO_3$ in the gas exiting the secondary absorption zone without creating an excess that materially dilutes the acid strength in the primary absorption zone as the secondary acid flows into the primary zone.

It has further been determined that the principles of the control scheme of FIG. 24 can be applied in a process design and startup protocol that does not necessarily depend on the instrumentation, processors and feed back control loops that are implemented in FIG. 24. The material balance, heat balance, and equilibrium relationships which govern the operation outlined in connection with FIG. 24 are subject a priori determination in design, startup and operation of the process. Under balanced steady state designed operation, the rate of delivery of secondary acid to the secondary absorption zone can be established at a fixed level for any select rate of operation governed by the rate of delivery of elemental sulfur or other sulfur source to the sulfur burner and control of the acid strength as measured by the conductivity of acid entering and exiting the primary absorption zone. From the material balance and known equilibrium relationships, at any defined operation rate, the flow rate of acid delivered to the secondary absorption zone can be established at fixed value to control the Δt at the termini of the secondary absorption zone below a design target such as not more than about 35° C. or not more than about 30° C., etc., and the rate of addition of dilution water can be established at a fixed value to control the strength of this acid stream.

Where the primary and secondary absorption zones are operated under the preferred conditions described herein, the actual mist loading in the gas exiting the secondary absorption zone is typically not greater than about 20 g/Nm³. The mist content can be further reduced in conventional mist eliminators to as low as 5.0 mg/Nm³. Moreover, because of the relatively low loading of mist in the gas exiting the absorber, the mist loading can be reduced from about 20 g/Nm³ to less than about 0.1 g/Nm³ or less than about 0.05 g/Nm³ in the gas exiting the mist eliminator system while maintaining a relatively high velocity through the mist eliminators, e.g., at least about 300 Nm³ or at least about 340 Nm³ or between about 340 and about 500 Nm³ per hour per square meter of mist eliminator element surface area transverse to the direction of gas flow.

An illustration of the effectiveness of a properly operated secondary absorption zone may be seen in mist and vapor loading data tabulated below for the gas exiting the primary heat recovery absorption zone, secondary absorption zone and mist eliminators, respectively, of an industrial scale contact sulfuric acid plant.

| Mist Data - Heat Recovery System | | | |
|---|---|---|---|
| Measured Mist (mg/ACF) | Outlet Mist Eliminators | Outlet 2nd Stage | Outlet 1st Stage |
| Mist > 3μ | 0.255 | 228.6 | 870.3 |
| Mist < 3μ | 0.158 | 409.7 | 2,631.8 |
| Total, Mist | 0.413 | 638.4 | 3,502.1 |
| Vapor | 0.321 | 61.68 | 143.6 |
| Total Mist + Vapor | 0.734 | 700.1 | 3,645.7 |

It may be noted that the preferred relatively low L/G in the secondary absorption zone is much lower than the preferred L/G in the primary zone. Thus, it is desirable to provide greater area for mass transfer per unit volume within the secondary zone. By way of example, in the case of saddles, the primary zone may advantageously be packed with saddles of nominal 7.6 cm (3 inch) dimension while the secondary zone may preferably be packed with saddles of nominal 5 cm (2 inch) dimension.

In operation under the preferred conditions described hereinabove, the process can be controlled to generate no more than about 20 g, preferably no more than about 15, 10 or 5.0 g, mist per standard cubic meter of depleted gas exiting the absorption system, even when over 80%, preferably over 90%, and most preferably 95-100% of dilution water is introduced into the $SO_3$ conversion gas upstream of the heat recovery absorption zone and useful energy is recovered from the absorption system at a rate of over 1160 KJ/Kg $SO_3$, 1220 KJ/Kg $SO_3$, 1270 KJ/Kg $SO_3$ or even 1330 KJ/Kg $SO_3$ (500 Btu/lb $SO_3$, 525 Btu/lb $SO_3$, 550 Btu/lb $SO_3$, or even 575 Btu/lb $SO_3$) entering the absorber. Considered from another perspective, the process can be operated under such conditions with relatively modest mist eliminator capacity, e.g., by providing mist elimination elements having a total cross-sectional area normal to flow such that the linear velocity through the mist elimination elements is at least 200 m/hr, preferably at least 300 m/hr, more preferably at least about 400 m/hr. For example, the mist eliminators may be sized so that the linear gas velocity through the elements is between about 250 and about 650 m/hr, preferably between about 400 and about 500 m/hr.

Further in accordance with invention, the energy recovered in the heat recovery absorption acid can be used in part for purposes that go beyond those to which it has been applied in the prior art. FIG. 3 illustrates an alternative embodiment of the invention which is operated substantially in the same manner as the process of FIG. 2, but in which acid exiting principal indirect heat exchanger 105 is divided between a stream comprising net production of acid that is removed from the system, a recirculated acid stream that is returned to the primary absorption zone 103 and an auxiliary acid (also referred to herein as "secondary absorption heat recovery liquid") comprising a secondary absorption acid stream that is passed through an auxiliary heat exchanger 131. Heat is transferred from the auxiliary acid stream to a water stream in exchanger 131 optionally generating low pressure steam for injection into the $SO_3$ conversion gas stream in water vapor injection zone 127 upstream of primary absorption zone 103. The cooled auxiliary acid exiting exchanger 131 may be divided to provide a product acid fraction and a secondary absorption acid fraction that is circulated to acid inlet 117 of secondary absorption zone 115.

Absorption acid heat exchangers 105 and 131 can be operated either in series as shown in FIG. 3, or in parallel with respect to circulating absorption liquid. Operation in series may be preferred since the temperature and energy content of the circulating acid are quite adequate for generating steam for injection in water vapor injection zone 127 even after maximum available heat for generating steam at the desired pressure has been recovered in the principal heat exchanger 105. However, because the temperature of the acid entering the auxiliary exchanger is higher in a parallel operation, the requisite surface area of the auxiliary heat exchanger is smaller, as is the fraction of acid that must be passed through the auxiliary exchanger.

A preferred control strategy for the process of FIG. 3 is similar to that of FIG. 2 except that the concentration of the acid exiting the heat recovery absorption zone can be controlled by regulating the steam flow to the steam injector and the volumetric rate at which product acid is removed from the absorption system.

Figure 9:
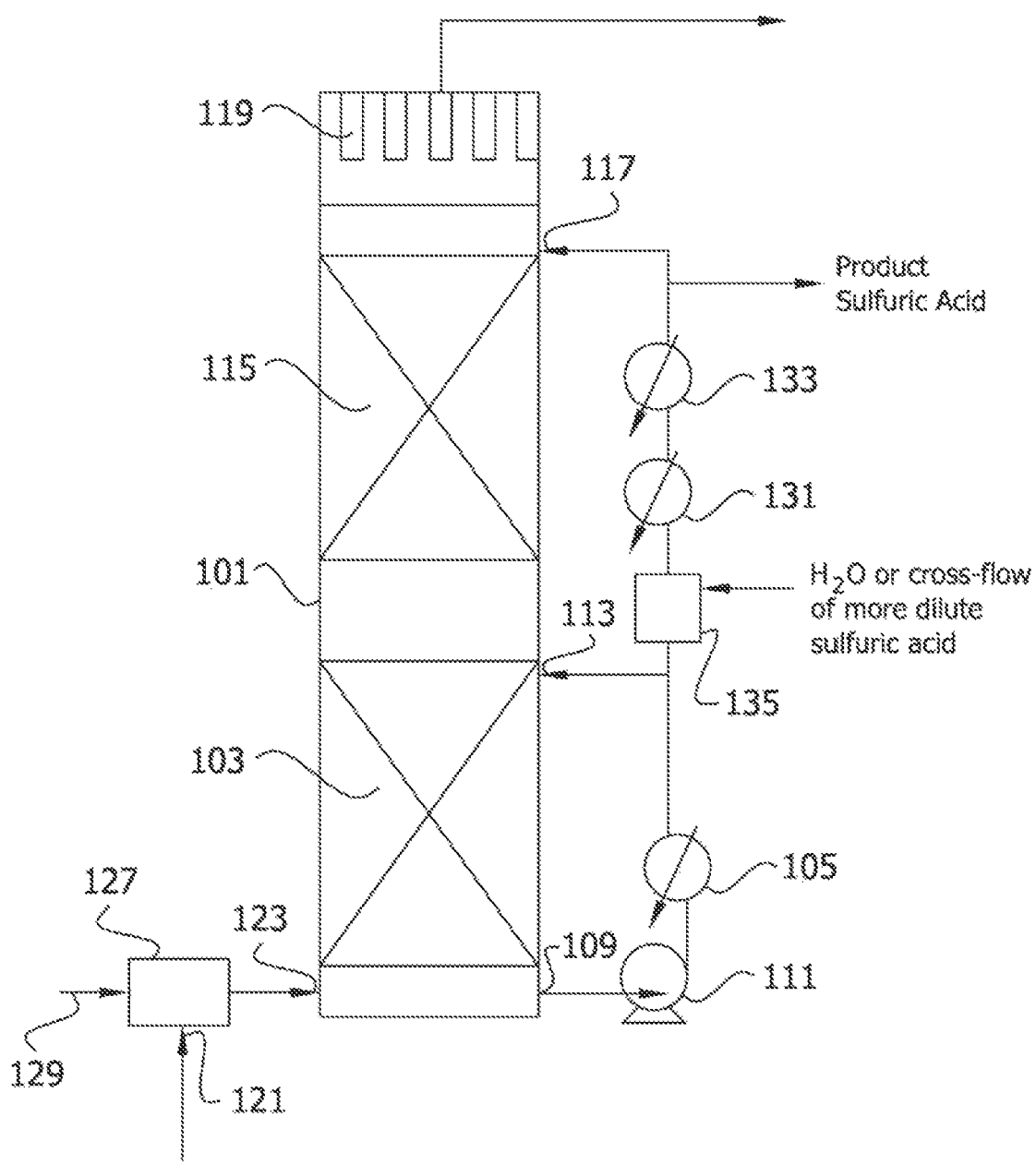
FIG. 9 is a process flow sheet similar to that of FIG. 3 in which the heat is transferred from the absorption acid fraction circulated to the secondary absorption zone to generate steam for injection into the $SO_3$-bearing gas stream entering the primary absorption zone.

FIG. 9 illustrates a process that is similar to that of FIG. 3 except that there are two auxiliary heat exchangers in series in the secondary heat recovery liquid circulation loop and a sulfuric acid stream comprising net production of sulfuric acid in the absorption system is divided from the secondary acid stream downstream of exchanger 133 rather from the primary absorption acid circulation loop as illustrated in FIGS. 2 and 3.

First auxiliary heat exchanger 131 generates steam for injection into the $SO_3$ conversion gas stream in water vapor injection zone 127. After generation of up to 100% of dilution water requirements in the form of steam in exchanger 131, the acid stream remains at a temperature above the preferred acid inlet temperature for the secondary absorption zone. Thus, additional energy is recovered in useful form in second auxiliary heat exchanger 133 that is downstream from exchanger 131 with respect to the flow of secondary absorption acid.

In the flow sheet of FIG. 9, absorption acid exiting heat exchanger 105 is divided to provide the stream that is recirculated to the primary absorption zone and an auxiliary (secondary heat recovery liquid) stream from which the secondary absorption acid and net production stream are ultimately derived. The flow sheet of FIG. 9 also comprises a dilution zone 135 in the auxiliary acid stream upstream of heat exchanger 131. With or without dilution, the auxiliary acid stream first passes through first auxiliary heat exchanger 131 wherein atmospheric steam is generated for injection into the $SO_3$ conversion gas stream in water vapor injection zone. The auxiliary acid stream leaving heat exchanger 131 is then passed through heat exchanger 133 where further heat is transferred to boiler feed water for the heat recovery system boiler 105. Auxiliary acid exiting exchanger 133 is divided to provide a stream constituting the net production of sulfuric acid in the heat recovery absorption system and a stream that serves as secondary absorption acid. The latter is delivered via tower acid inlet 117 at the top of secondary absorption zone 115.

By dilution of the auxiliary acid stream in diluter 135, both the secondary absorption acid and the net production acid can be controlled independently of the concentration of the primary absorption acid and at a lower concentration. If desired, undue dilution of the primary absorption acid can be avoided and excess water removed from the absorption system by diverting the secondary acid exiting the secondary absorption zone to an acid collection tank, a drying tower acid feed tank or other destination rather than allowing it to flow into the primary absorption zone. It should be understood that the latter option is also available if desired in the process schemes illustrated in FIGS. 1 and 2.

Figure 10:
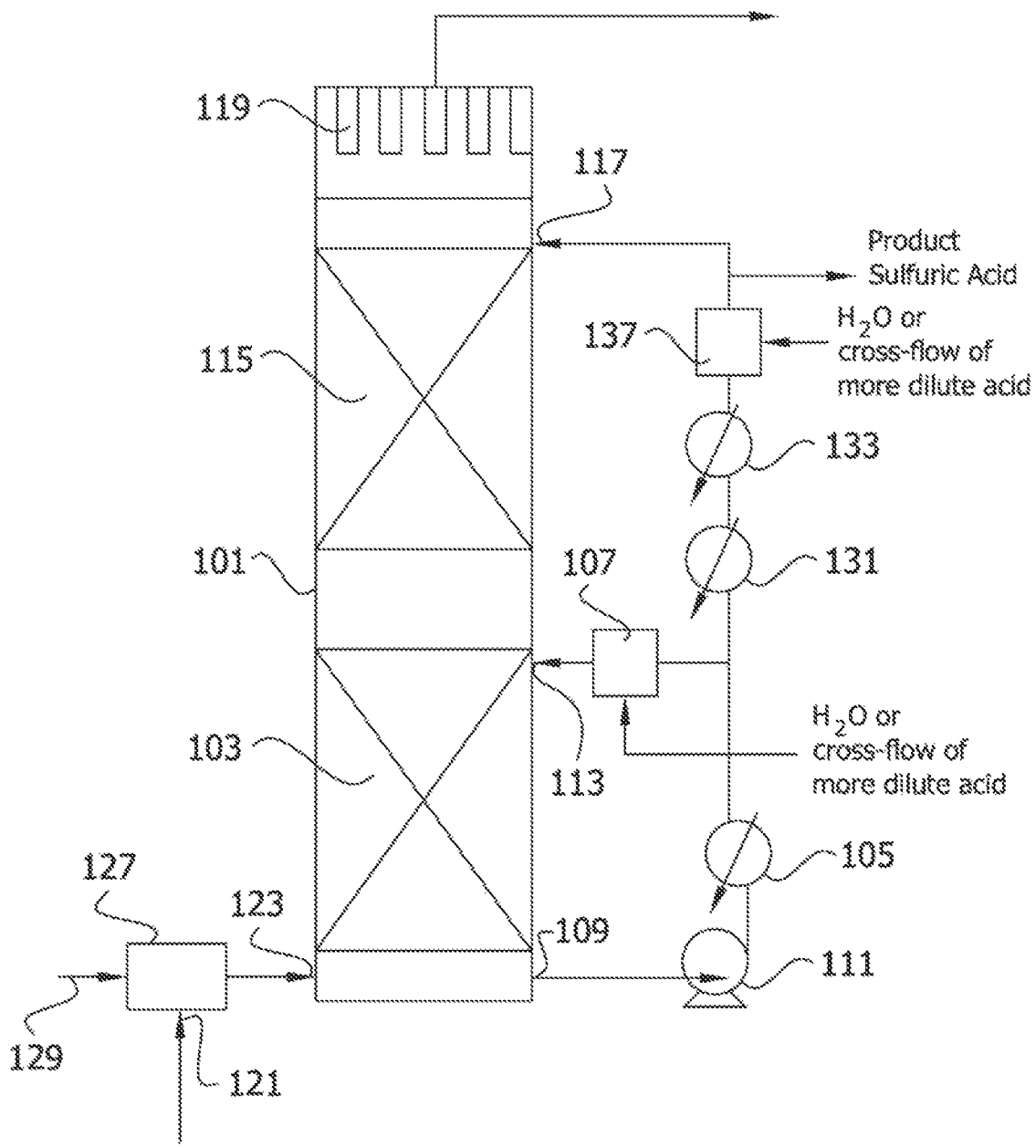
FIG. 10 is a flow sheet similar to that of FIG. 9 but adapted for absorption of $SO_3$ produced from an $SO_2$ stream generated from a source other than elemental sulfur.

FIG. 10 illustrates a process adapted to producing sulfuric acid from $SO_2$ generated in a metallurgical plant, e.g., a copper ore roaster. The process of FIG. 10 is similar in most particulars to the process of FIG. 9, but differs with respect to the arrangements for dilution of the auxiliary acid stream. A dilution zone 137 for auxiliary acid is provided downstream of second auxiliary heat exchanger 133 rather than upstream of heat exchanger 131 with respect to the direction of secondary absorption acid flow. A further dilution zone 107 is provided in the recirculated primary acid stream after its separation from the secondary acid stream and before it enters tower 101 via acid return inlet 113. In both FIG. 9 and FIG. 10, a crossflow of more dilute acid can be used as the source of water for dilution of acid in the acid circulation loop(s).

Figure 11:
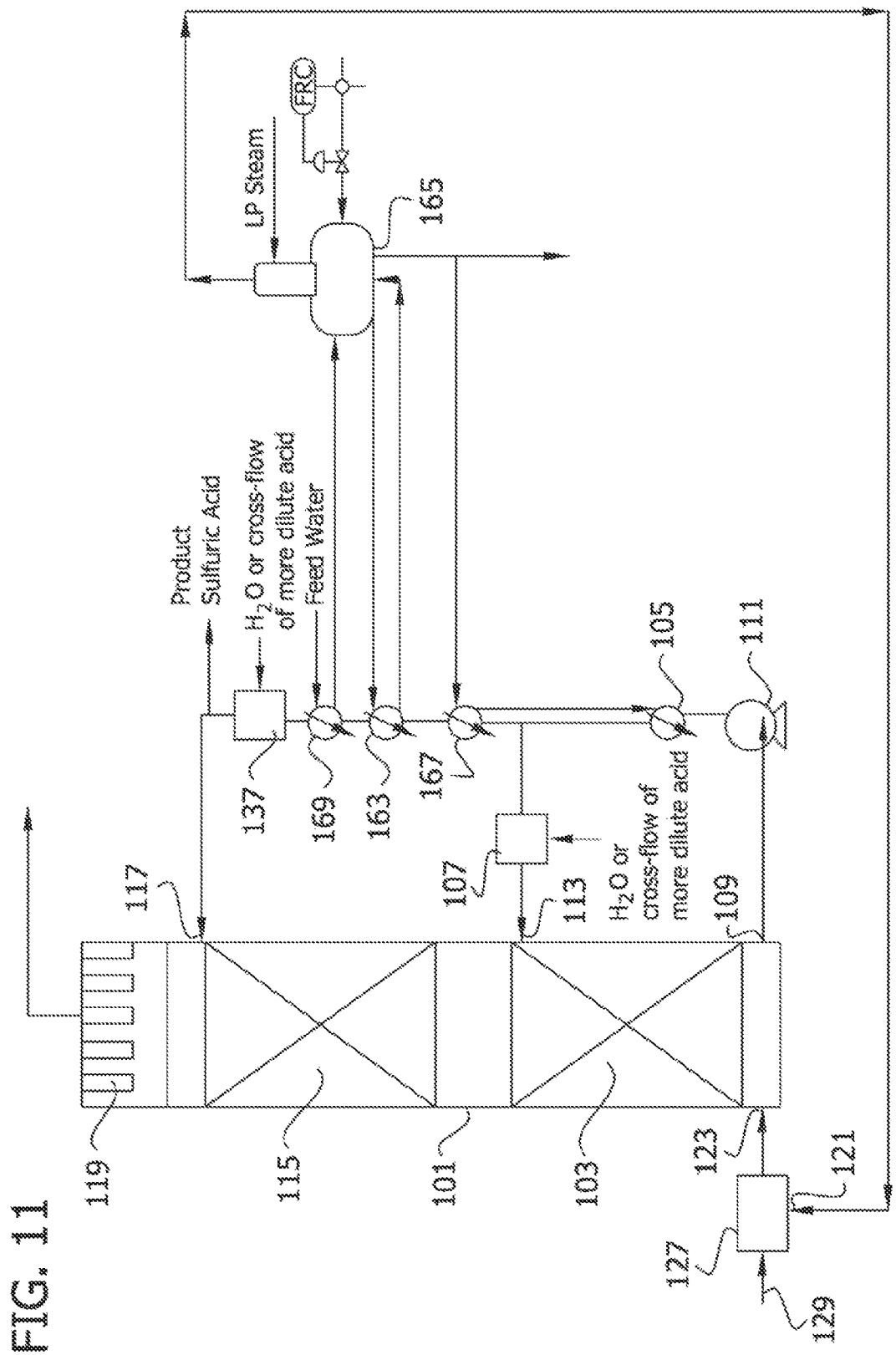
FIG. 11 is a process flow sheet showing the recovery of heat from secondary absorption liquid in generation of steam for deaeration, preheating undeaerated boiler feed water prior to deaeration, further preheating deaerated boiler feed water, and delivery of the preheated deaerated feed water to the heat exchanger for recovery of absorption heat at greater than 150° C.

FIG. 11 illustrates a further modification of the process of FIG. 9 in which $SO_3$ absorption energy is used to generate steam for stripping boiler feed water in a deaerator. The exhaust stream from the deaerator contains water vapor at low pressure which can be used as a water vapor source for injection into the $SO_3$-bearing gas stream upstream of the absorption zone. Non-condensables in the deaerator exhaust stream do not materially dilute the $SO_3$-bearing stream into which they are introduced, and do not interfere with the efficiency of absorption of $SO_3$ or condensation of $H_2SO_4$ in the absorption zone. The non-condensables are conveniently disposed of in the tail gas from the contact acid process.

As shown in FIG. 11, absorption liquid exiting heat recovery absorption zone 103 passes through a principal heat exchanger 105 wherein heat is transferred from the absorption liquid to boiler feed water for generation of medium pressure steam. Steam may be generated at the pressures described herein. Absorption liquid exiting heat exchanger 105 is divided to provide a principal absorption liquid stream that is recirculated to heat recovery absorption zone 103 and an auxiliary (secondary heat recovery) acid stream comprising a secondary absorption liquid and net sulfuric acid product. According to preferred practice as illustrated, the auxiliary acid stream is ultimately divided to provide the net acid product that is sent to the product acid tank and the remaining liquid i.e., the secondary absorption liquid, that is introduced into secondary absorption zone 115 for recovery of residual $SO_3$ from the gas stream exiting primary absorption zone 103.

In the flow path between the point of division and the secondary absorption zone, the auxiliary acid stream is passed through an auxiliary deaerator heat exchanger 163 wherein heat is transferred from the auxiliary liquid to a water stream circulated between heat exchanger 163 and a deaerator 165. The water stream preferably enters auxiliary deaerator heat exchanger 163 at essentially its boiling point under the pressure prevailing in the deaerator, typically near atmospheric. Transfer of heat in the auxiliary deaerator heat exchanger converts a significant fraction of the water stream to steam, and the liquid water and steam mixture exiting the heat exchanger is introduced into the deaerator wherein it contacts undeaerated boiler feed water and serves to strip non-condensables from the feed water. Deaerated condensate drains from the bottom or near the bottom of the deaerator and the non-condensables are vented from the top of the deaerator in a deaerator exhaust stream that typically contains at least about 99.5%, more typically at least about 99.8%, most typically between about 99.8% and about 99.999% by volume water vapor.

The exhaust stream from the deaerator is typically at a pressure less than about 34.5 KPascals (5 psi) gauge, more typically less than about 13.8 KPascals (2 psi) gauge, most typically no more than about 18 in. water. This stream is advantageously routed to injection port 121 in gas feed duct 129 upstream of absorber gas inlet 123. As further discussed below, the flow rate of water vapor in the deaerator exhaust stream can be sufficient to provide a high fraction of the reaction water necessary for conversion of $SO_3$ in the gas stream to sulfuric acid. The non-condensables vent harmlessly in the tail gas from the sulfuric acid facility.

In the process as illustrated in FIG. 11, the auxiliary acid (secondary heat recovery liquid) stream is first passed through a boiler feed water preheater 167 that is upstream of auxiliary deaerator heat exchanger 163 with respect to the direction of secondary acid flow. Boiler feed water preheater 167 comprises an indirect heat exchanger in which heat is transferred from the auxiliary stream to boiler feed water, preferably heating the boiler feed water under pressure to a temperature approximating the equilibrium temperature at the pressure at which steam is generated in the boiler. In further preferred embodiments of the instant process, as also illustrated in FIG. 11, boiler feed water heated in exchanger 167 is delivered as pressurized feed water to principal heat exchanger 105 in which medium pressure steam is generated by transfer of $SO_3$ absorption heat from the absorption liquid leaving the heat recovery absorption zone.

Auxiliary acid exiting boiler feed water preheater 167 is directed to deaerator auxiliary heat exchanger 163.

After exiting auxiliary deaerator heat exchanger 163, the auxiliary acid is divided to provide a net product acid stream and a secondary absorption liquid stream that may be delivered to secondary absorption zone 115 where it contacts gas exiting the primary absorption zone 103 and serves to both cool the gas stream and absorb residual $SO_3$ therefrom before the gas exits the absorption system and is either returned to a further stage of the converter or exhausted as tail gas from the contact acid facility. In further preferred embodiments as illustrated in FIG. 11, additional $SO_3$ absorption heat is recovered by passing auxiliary acid exiting auxiliary deaerator heat exchanger 163 through still another indirect heat exchanger before the acid is divided into the net product stream and the secondary absorption acid stream that is returned to the absorber. In the embodiment of FIG. 11, treated but undeaerated boiler feed water is preheated in exchanger 169 by transfer of heat from the auxiliary acid exiting heat exchanger 163. Water exiting undeaerated boiler feed water preheater 169 then flows to deaerator 165.

In particularly preferred embodiments of the novel process, as illustrated in FIG. 11, the boiler feed water introduced into boiler feed water preheater 167 is deaerated water exiting deaerator 165. Thus, in the overall scheme of FIG. 11, undeaerated water is preheated in feed water preheater 169, the preheated water is deaerated in deaerator 165 wherein non-condensables are stripped using steam generated in auxiliary deaerator heat exchanger 163, and the deaerated water is heated under pressure in deaerated boiler water preheater 167 to or near the vapor/liquid equilibrium temperature at the pressure prevailing on the utility side of absorption heat recovery exchanger 105. In each of these steps, the source of heat is the auxiliary acid stream that flows effectively countercurrently to the flow of water through deaerated boiler feed water preheater 167, auxiliary deaerator heat exchanger 163, and undeaerated boiler feed water preheater 169. Pressurized water exiting deaerated boiler feed water preheater 167 is delivered to exchanger 105 for conversion to medium pressure steam by transfer of heat from the absorption liquid exiting the heat recovery absorption zone.

The energy available from the auxiliary absorption liquid for preheating undeaerated boiler feed water and generating steam for deaeration is sufficient that the exhaust stream from the deaerator may provide a substantial fraction of the water vapor required for reaction with the $SO_3$ contained in the converter gas. Provided that auxiliary deaerator heat exchanger 163 has sufficient heat transfer capacity, a substantial fraction of the water stream circulated between deaerator 165 and heat exchanger 163 may be converted to steam, resulting in a substantial flow of water vapor in the deaerator exhaust gas. For example, the flow rate and temperature of the undeaerated boiler feed water entering the deaerator, and the rate of heat transfer from the auxiliary absorption liquid to the water stream in the deaerator heat exchanger, may be controlled in a combination that generates at least 0.40 moles, preferably at least about 0.55 moles preferably at least about 0.60 moles, more preferably at least about 0.70 moles, most preferably at least about 0.80 moles, water vapor in the deaerator exhaust stream per mole total equivalent sulfur oxide gas content of the sulfur oxide-bearing gas stream.

The energy available from the auxiliary acid is also sufficient that boiler feed water may be preheated to deaeration temperature and deaerated in volumes that exceed the water demands of the principal absorption heat recovery boiler 105. Thus, deaerated boiler feed water may be exported from the system illustrated in FIG. 11 and delivered elsewhere in a manufacturing facility, e.g., to the waste heat boiler for recovery of energy from the combustion gas generated in burning the sulfur source to generate $SO_2$.

Moreover, the process scheme of FIG. 11 may be operated either to maximize the water vapor generated for injection into the $SO_3$-bearing gas upstream of the heat recovery absorption zone, and minimize the rate at which steam must be imported from other sources for this purpose, or to maximize the flow of deaerated water boiler feed water that is exported from the absorption heat recovery system. Where a high fraction of the auxiliary acid cooling load is allocated to the deaerator auxiliary heat exchanger, maximum fractions of water vapor may be generated as reaction water for injection into the converter gas upstream of the absorber. Where the rate of water flow to the deaerator is high relative to the rate of heat transfer in the deaerator auxiliary heat exchanger, maximum quantities of deaerated boiler feed water can be generated for use in boiler 105 and/or for export from the absorption system and use elsewhere in the manufacturing plant. According to the latter alternative, the combination of the flow rate and temperature of undeaerated water entering the deaerator and the rate of heat transfer from the auxiliary acid stream to the water stream in the deaerator auxiliary heat exchanger may be controlled such that the mass flow ratio of deaerated boiler feed water exiting the deaerator to equivalent sulfur trioxide entering the absorption zone is at least about 1.0, preferably at least about 1.5, more preferably at least about 2.0, typically between about 2.0 and about 3.0, thereby allowing substantial export of deaerated boiler feed water to a $SO_2$ combustion gas waste heat boiler or power house boiler. According to the needs of the particularly facility at which the process is carried out, including the sulfuric acid department and overall manufacturing plant water and energy balances, the proportion of absorption heat recovered from the auxiliary acid stream as vapor for injection can be appropriately balanced with the proportion of absorption heat consumed in deaerating boiler feed water for export from the absorption heat recovery system.

Even at maximum recovery of energy from the secondary absorption liquid in the form of water vapor in the deaerator exhaust stream, supplemental low pressure steam is preferably introduced into the deaerator in order to assure adequate stripping of non-condensables from the boiler feed water. If the rate of steam generation in the deaerator auxiliary heat exchanger is insufficient to provide a given target flow of water vapor in the deaerator exhaust gas for injection into the sulfur trioxide-bearing gas stream entering the heat recovery absorption zone, supplemental steam supplied to the deaerator can make up the deficiency, thereby providing at least 0.40, 0.55, 0.60, 0.70, or 0.80 moles water vapor in the deaerator exhaust, and in the injection mixing zone, per total equivalent sulfur trioxide gas content of the converter gas entering the heat recovery absorption zone.

Supplemental steam is typically introduced at a pressure of at least about 13.8 KPascals (2 psi) gauge, preferably at least about 34.5 KPascals (5 psi) gauge, typically about 55 to about 83 KPascals (8 to about 12 psi) gauge. The supplemental steam further contributes to the rate at which water vapor may be supplied in the deaerator exhaust stream for injection into the $SO_3$-bearing stream upstream of the heat recovery absorption zone.

Supplemental steam may be introduced into the deaerator at a fixed rate or, optionally, the rate of supplemental steam supply may be controlled to control the rate at which reaction water is delivered by injection of deaerator exhaust into the $SO_3$-bearing gas stream upstream of the absorber. For example, the rate of introduction of low pressure steam into the deaerator may be controlled as described in U.S. Pat. No. 5,538,707, the disclosure of which is incorporated herein by reference. In particularly preferred embodiments of the process of the invention, a first supply of supplemental steam is introduced into the deaerator at a fixed rate while a second supply of supplemental steam is introduced into the exhaust stream at a rate controlled to control the ratio of equivalent water vapor to equivalent sulfur trioxide in the gas stream entering the absorption zone. The second supplemental supply is preferably introduced into the exhaust stream either within the deaerator or between the deaerator and injection port 121 for water vapor injection zone 127 in $SO_3$ gas feed duct 129.

Figure 23:
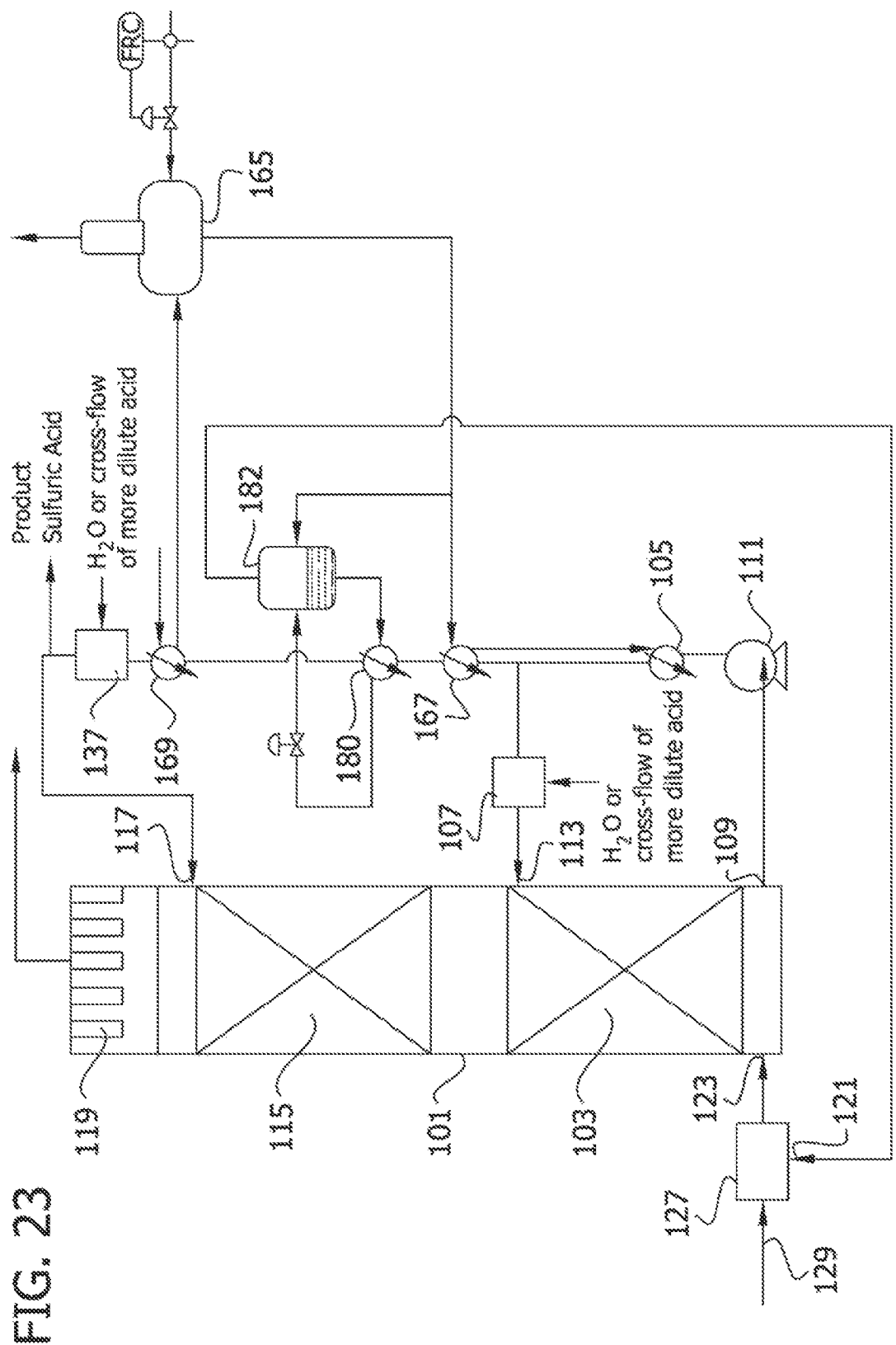
FIG. 23 is an alternative process flow sheet similar to that of FIG. 11 showing the recovery of heat from secondary absorption liquid in generation of steam which can be used as a water vapor source for injection into the $SO_3$-bearing gas stream upstream of the absorption zone.

FIG. 23 illustrates an alternative to the process of FIG. 11 in which $SO_3$ absorption energy is used to generate steam for use as a water vapor source for injection into the $SO_3$-bearing gas stream upstream of the absorption zone. As shown in FIG. 23, absorption liquid exiting heat recovery absorption zone 103 passes through a principal heat exchanger or boiler 105 wherein heat is transferred from the absorption liquid to boiler feed water for generation of medium pressure steam. Steam may be generated at the pressures described herein. Absorption liquid exiting heat exchanger 105 is divided to provide a principal absorption liquid stream that is recirculated to heat recovery absorption zone 103 and an auxiliary (secondary heat recovery) acid stream comprising a secondary absorption liquid and net sulfuric acid product. According to the practice as illustrated, the auxiliary acid stream is ultimately divided to provide the net acid product that is sent to the product acid tank and the remaining liquid i.e., the secondary absorption liquid, that is introduced into secondary absorption zone 115 for recovery of residual $SO_3$ from the gas stream exiting primary absorption zone 103.

The auxiliary acid (secondary heat recovery liquid) stream is first passed through boiler feed water preheater 167. Boiler feed water preheater 167 comprises an indirect heat exchanger in which heat is transferred from the auxiliary stream to boiler feed water, preferably heating the boiler feed water under pressure to a temperature approximating the equilibrium temperature at the pressure at which steam is generated in the boiler. Boiler feed water heated in exchanger 167 is delivered as pressurized feed water to principal heat exchanger 105 in which medium pressure steam is generated by transfer of $SO_3$ absorption heat from the absorption liquid leaving the heat recovery absorption zone.

In the process as illustrated in FIG. 23, auxiliary acid exiting boiler feed water preheater 167 is directed to flash tank preheater 180 wherein heat is transferred from the auxiliary acid to a water stream from flash tank 182. Transfer of heat in the flash tank preheater heats the water stream under pressure and the latter is returned to the flash tank where the pressure is reduced to cause a significant portion of the heated water stream to vaporize and form low pressure steam. This low pressure steam is advantageously routed to injection port 121 in gas feed duct 129 upstream of absorber gas inlet 123. The flow rate of water vapor from flash tank 182 can be sufficient to provide a high fraction of the reaction water necessary for conversion of $SO_3$ in the gas stream to sulfuric acid.

In the embodiment of FIG. 23, boiler feed water (e.g., turbogenerator condensate) is first preheated in preheater 169 by transfer of heat from the auxiliary acid exiting flash tank preheater 180. The heated condensate is then optionally introduced into deaerator 165 and flashed. Any make-up water can also be introduced into deaerator 165 for degassing. Deaerated condensate drains from the bottom or near the bottom of the deaerator and the non-condensables are vented from the top of the deaerator in a deaerator exhaust stream. Although not shown in FIG. 23, the deaerator exhaust stream may be combined with the low pressure steam routed from flash tank 182 to injection port 121 in gas feed duct 129 upstream of absorber gas inlet 123. Deaerated condensate exiting deaerator 165 then flows to boiler feed water preheater 167. As illustrated in FIG. 23, a portion of the deaerated condensate from deaerator 165 may optionally be passed to flash tank 182.

After exiting preheater 169, the auxiliary acid is divided to provide a net product acid stream and a secondary absorption liquid stream that may be delivered to secondary absorption zone 115 where it contacts gas exiting the primary absorption zone 103 and serves to both cool the gas stream and absorb residual $SO_3$ therefrom before the gas exits the absorption system and is either returned to a further stage of the converter or exhausted as tail gas from the contact acid facility.

Thus, in the overall scheme of FIG. 23, turbogenerator condensate is preheated in feed water preheater 169 and optionally deaerated, the preheated deaerated water is heated under pressure in boiler water preheater 167 to or near the vapor/liquid equilibrium temperature at the pressure prevailing on the utility side of absorption heat recovery exchanger 105 and liquid water from flash tank 182 is heated under pressure in flash tank preheater 180. In each of these steps, the source of heat is the auxiliary acid stream. Pressurized water exiting boiler feed water preheater 167 is delivered to exchanger 105 for conversion to medium pressure steam by transfer of heat from the absorption liquid exiting the heat recovery absorption zone.

The energy available from the auxiliary absorption liquid for preheating boiler feed water and generating steam is sufficient that the flash tank may provide a substantial fraction of the water vapor required for reaction with the $SO_3$ contained in the converter gas. If needed, supplemental low pressure steam can be introduced in order to provide a given target flow of water vapor for injection into the sulfur trioxide-bearing gas stream entering the heat recovery absorption zone.

Figure 6:
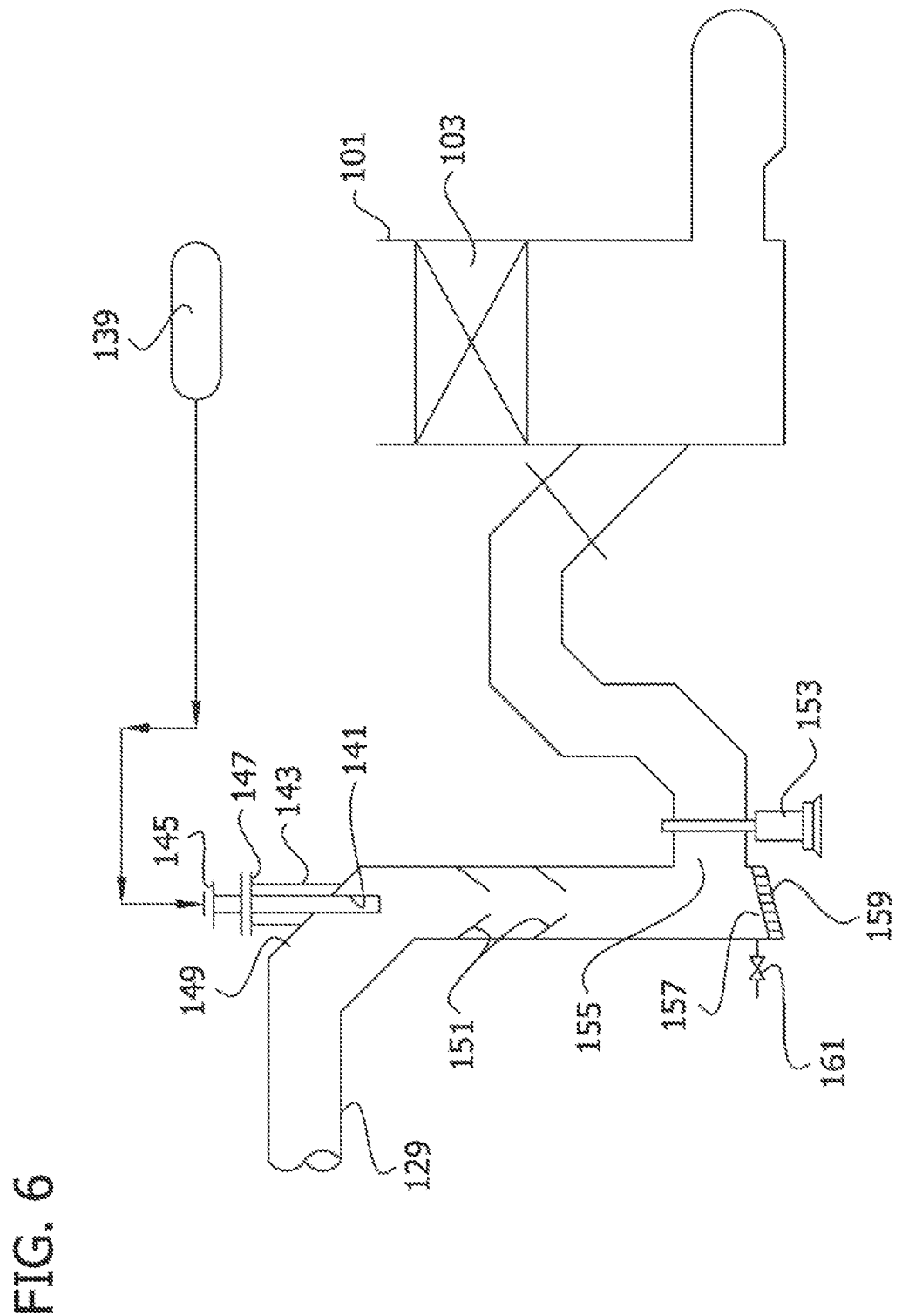
FIG. 6 is a schematic illustration of a countercurrent flow $SO_3$ absorption heat recovery tower, together with a semischematic longitudinal cross-section of the gas flow duct for delivery of $SO_3$-bearing conversion gas into the bottom of the tower, showing nozzles and baffles for effecting steam injection into the gas stream.

FIG. 6 illustrates a system for injection of steam into the $SO_3$ conversion gas stream upstream of the absorption system. Illustrated schematically in the drawing are heat recovery tower 101, primary absorption zone 103 and $SO_3$ conversion gas feed duct 129. Atmospheric steam is supplied into water vapor injection zone 127 from a source 139 (e.g., first auxiliary heat exchanger 131 of FIG. 10) via a polytetrafluoroethylene encapsulated injection nozzle 141 coaxially aligned within a duct nozzle 143 and supported on a flange 145 that is fastened to a flange 147 on the duct nozzle. The duct nozzle is positioned on an elbow 149 in duct 129. Mixing of steam and conversion gas is promoted by baffles 151 on the interior wall of duct 129 downstream of the injection nozzle with respect to the direction of gas flow. Preferably, mixing is sufficient to prevent local composition and temperature gradients that might create cold spots where sulfuric acid could condense. The baffles 151 or static mixing tabs and duct 129 are suitably constructed, for example, as described in U.S. Pat. No. 4,929,088 and may be provided with a corrosion-resistant coating. A stanchion 153 supports duct 129 but is thermally isolated therefrom to avoid creating a cold spot at which sulfuric acid could condense. The stanchion is located downstream of a second elbow 155, at the heel of which is a depression 157 for collection of any accumulation of acid condensate. Acid brick or tile 159 lines the bottom of the depression which is canted to provide a low spot in communication with a drain valve 161 through which any acid condensate can be periodically removed through a trap or seal that may be connected to the valve.

Further in accordance with the invention, a process for recovery of $SO_3$ absorption heat is operated in an existing contact sulfuric acid plant that comprises an interpass absorber, and which has been retrofitted to provide a heat recovery absorption zone. The heat recovery absorption zone is provided by installation of a new absorber that is proportioned and constructed to operate at high temperature to generate a high temperature absorption acid from which heat is transferred in a new heat exchanger by transfer of heat to another fluid, thereby heating the another fluid to a temperature greater than about 150° C. Where it is desired to provide a secondary absorption zone as illustrated, e.g., in FIG. 2, 3 or 9-11, the existing interpass absorber can be adapted to comprise the secondary absorption zone.

However, it has been discovered that the interpass tower is preferably not operated at the mass flow ratio of absorption liquid to gas for which it has typically been originally designed. Where the interpass tower has been designed for recovery of $SO_3$ from a gas stream containing typically 7 to 12% by volume $SO_3$, it is typically proportioned and constructed to operate at a liquid to gas mass flow ratio between about 6 and about 10. However, in accordance with the present invention, it has been discovered that operation of a secondary absorption zone within such L/G range, and the temperatures described hereinabove, results in excessive, in some cases, massive, generation of mist. Surprisingly, however, it has further been discovered that the mist generation problem in a secondary absorption zone operated within an existing interpass tower can be largely resolved by operating at an L/G that is either distinctly lower than, or distinctly higher than, the L/G for which the interpass tower was originally designed, proportioned and constructed. Without committing to a particular theory, it is believed that operation at a relatively low L/G in the range between about 1.0 and about 7.0 allows the gas stream to pass through the secondary absorption zone at a relatively high temperature, avoiding the shock cooling and gross mist generation that is suffered at the L/G for which the tower was originally designed. On the other hand, operation at relatively high L/G in the range between about 14 and about 18, while not necessarily avoiding the shock cooling effect, provides a massive liquid flow that knocks down the mist as it is generated and captures mist acid in the secondary absorption liquid before the gas stream exits the secondary absorption zone. Although these explanations can be attempted after the fact, the reality is that there was no basis for predicting that mist generation problems would be as adverse as they typically are at the interpass tower design L/G, and even less basis for predicting that either the higher L/G or lower L/G, much less both of them, would provide substantial solutions to the problem.

The present invention is further directed to a method for retrofitting an existing contact sulfuric acid plant that comprises an existing interpass absorber for recovery at high temperature of the heat of absorption of $SO_3$ in sulfuric acid. In accordance with the method, a new absorber is installed for receiving converter gas comprising sulfur trioxide. The new absorber comprises a primary absorption zone designed for high temperature absorption of $SO_3$ in a primary absorption liquid comprising sulfuric acid to produce additional sulfuric acid therein. The new absorber is constructed and proportioned to operate at high temperature and to generate a high temperature absorption acid.

The retrofitting method further comprises installing a high temperature heat exchanger designed for transfer of the heat of $SO_3$ absorption from the primary absorption liquid to another fluid, and thereby heat the another fluid to a temperature of at least 150° C. Preferably, the high temperature heat exchanger comprises an absorption heat recovery boiler in which steam is generated at a pressure of least about 0.4 MPascals (4 bar). Means are provided for circulating the primary absorption liquid between the primary absorption zone of the new absorber and the high temperature heat exchanger. Such circulation means comprise a high volume acid pump typically having a capacity sufficient to generate an absorption liquid mass flow rate of at least 3,770 lb/ft²-hr (18,440 kg/m²-hr) in the new absorber, an acid flow conduit connecting the acid exit of the new absorber to the inlet of the new heat exchanger and an acid flow conduit connecting the exit of the heat exchanger to the inlet of the primary absorption of the new absorber.

A gas flow conduit is installed for directing the gas stream exiting the new high temperature absorber to an inlet of the existing interpass absorber. The gas conduit previously provided for supplying $SO_3$-bearing converter gas to the interpass tower is redirected to the new absorber, with whatever revisions in conduit configuration are required for this purpose.

Means are further provided for circulating a secondary absorption liquid through the existing interpass absorber wherein residual $SO_3$ can be removed from the gas stream exiting the primary absorption zone by transfer to the secondary absorption liquid. Advantageously, the absorption liquid exiting the absorption heat recovery heat exchanger can be divided to provide a primary absorption liquid that is recirculated to the primary absorption zone and a secondary absorption liquid that is delivered to the top of the existing interpass tower. In such embodiments, means for circulation over the interpass tower thus comprise a conduit installed for directing the secondary absorption liquid from the point of division to the top of the interpass tower in combination with the pump installed for circulation of absorption acid between the new absorber and new heat exchanger for recovery of absorption heat.

The means for circulating the secondary absorption liquid is sized and/or subject to control instrumentalities such that the mass flow ratio of the secondary absorption liquid to gas in the secondary absorption zone is between about 1.0 and about 7.0 or between about 14 and about 18.

Further in accordance with the present invention, it has been discovered that even higher rates of medium pressure steam generation can be realized where the absorption system is operated with an inlet converter gas stream containing elevated concentrations of sulfur trioxide, e.g., in the range of 11% to 13% by volume. Such high sulfur oxide levels can be realized by conversion of $SO_2$ generated in metallurgical plants, or in operations at reduced proportions of excess air. Because of reduced sensible heat losses to non-condensables in the gas stream, medium pressure steam can be generated at a pressure of at least 0.4 MPascals (4 bar) gauge in a quantity of at least about 0.50 tons per ton sulfuric acid produced from the $SO_3$ entering the absorption zone. Where the gas strength is in the preferred elevated range described above, and greater than 70% of requisite reaction water is injected as water vapor into the converter gas stream ahead of the heat recovery absorption zone, steam at 0.4 MPascals gauge or higher can be generated in a quantity of at least about 0.55 tons per ton net sulfuric acid product. Where greater than 80% of the reaction water is injected as vapor ahead of the heat recovery absorber, steam at greater than or equal to 0.4 MPascals gauge can be generated in a quantity of at least about 0.60, more preferably at least about 0.65, and most preferably least about 0.70 tons/ton net sulfuric acid product. Broadly, steam can be generated within a range of 0.4 to about 0.9 tons per ton net sulfuric acid product.

Operation at high gas strength may be particularly attractive where the absorption heat recovery system functions as the interpass absorber for an interpass contact acid facility. High gas strength and reduced excess air both conduce to a slightly higher residual $SO_2$ content in the gas stream exiting the converter and passing through the heat recovery absorption system. However, where the gas is directed back to a further converter stage and thence to a final absorber, the net loss in ultimate sulfuric acid yield becomes negligible to none.

The various embodiments of the invention, as described above, can advantageously be implemented in an interpass contact sulfuric acid plant wherein the heat recovery absorber functions as the interpass absorber, either with or without a secondary absorption zone as exemplified in FIGS. 2, 3 and/or 9-11. However, it will be understood that the heat recovery system may also be implemented in a single pass acid plant wherein the heat recovery absorption system serves as the sole absorption system. In the latter instance, a further alternative is to direct the gas stream exiting the heat recovery absorber to a condensing stage wherein substantially 100% of the vapor phase acid and residual water and $SO_3$ are condensed in the form of concentrated sulfuric acid. In these embodiments, condensing heat transfer surfaces can be constructed of materials known to the art for condensation of concentrated sulfuric acid.

The following examples further illustrate the process of the invention.

Example 1

In the process as illustrated in FIG. 2, a dry $SO_3$ conversion gas stream at a temperature of 165° C., flowing at rate of 50 standard cubic meter per second (106,000 standard cubic feet per minute), and containing 11.6% by mole $SO_3$, 0.6% by mole $SO_2$, 4.2% by mole $O_2$, and 83.6% by mole $N_2$ is passed through an indirect heat exchanger to recover the heat of reaction of $SO_2$ and $SO_3$ by transfer to superheated steam. The $SO_3$ gas stream exits the steam superheater at 165° C. is delivered at an absolute pressure of about 0.2 MPascals (18 psia) to a water vapor injection zone 127 as shown in FIG. 2. In injection zone 127, steam at a pressure of at least about 0.1 MPascals (1 bar) above the pressure in the gas line is injected into the gas stream at 4.3 Kg/s (570 lbs/min), sufficient to establish a molar ratio of equivalent water vapor to equivalent $SO_3$ in the gas stream to about 0.95 to 1.0. In the water vapor injection zone, the vapor phase heat of reaction of $SO_3$ and water vapor increases the temperature of the gas stream to 312° C.

The conversion gas is introduced into heat recovery tower 101 of FIG. 2 via gas inlet 123 below primary heat recovery absorption zone 103. The gas flows upwardly through the absorption zone countercurrently to primary absorption acid that is formed by combining a primary absorption acid fraction recirculated from heat exchanger 105 with secondary absorption acid flowing downwardly from the acid exit of secondary absorption zone 115. Recirculated absorption acid having a strength of 99.5% and a temperature of 200° C. is returned to primary absorption zone 103 within tower 101 via acid return inlet 113 at a flow rate of approximately 560 Kg/s (74,000 lbs/min) while secondary absorption acid flows downwardly from the acid exit of the secondary absorption zone at a rate of about 48.5 Kg/s (6,400 lbs/min) and a temperature of approximately 190° C. As primary absorption acid flows downwardly through absorption zone 103, sulfuric acid condenses from the gas phase to the liquid phase and $SO_3$ is absorbed from the gas phase into the liquid phase where it reacts with water to form additional sulfuric acid. The primary absorption acid exits the absorption zone and is removed from the tower via acid exit 109 at a temperature of 232° C. and a flow rate of approximately 630 Kg/s (83,000 lbs/min). Because water vapor has been introduced into the conversion gas at a rate sufficient that the molar ratio of equivalent water vapor to equivalent $SO_3$ in the conversion gas entering the absorption zone is approximately 1.0, the acid strength remains at 99.5% throughout the tower and in the hot absorption acid exiting the tower via outlet 109.

Acid withdrawn from the tower exit 109 is circulated through a heat recovery system boiler 105 where heat is transferred from the acid to generate steam having a pressure of 0.9-1 MPascals (9-10 bar) at a rate of 0.6 tons steam per net ton of acid produced by condensation of sulfuric acid and absorption of $SO_3$ in heat recovery absorption zone 103. Except for a side stream which removes net sulfuric acid produced in the absorption, acid exiting heat exchanger 105 is returned to the primary absorption zone via return inlet 113. Net acid production is approximately 25 Kg/s (2,100 lbs/min).

Secondary absorption acid is introduced into secondary absorption zone 115 within heat recovery tower 101 via inlet 117 at a temperature of 60° C., a flow rate of approximately 48.5 Kg/s (6,400 lbs/min) and a strength of 98.5%. Depleted gas exiting the top of primary heat recovery absorption zone 103 flows upwardly through secondary absorption zone 115 countercurrently to the secondary absorption acid, whereby residual $SO_3$ and $H_2SO_4$ are transferred from the gas stream to the secondary absorption acid. The gas stream exits the top of the absorption zone through mist eliminators 119 and the gas exit at a temperature of 70° C. and a flow rate of about 44.3 normal cubic meters per second (94,000 SCFM). The dry exit gas stream contains approximately 0.001 mole % $SO_3$, 0.6% $SO_2$, 4.2 mole % oxygen, and 95.2 mole % nitrogen.

Example 2

In a process as illustrated in FIG. 3, operation is similar to that of Example 1 except that the primary absorption zone is operated at a higher L/G and there is a correspondingly lower acid side temperature rise through the primary absorption zone and lower acid side temperature drop through heat exchanger 105. Absorption acid exiting principal absorption acid heat exchanger 105 is divided into a primary absorption acid stream that is returned to the primary absorption zone via acid return inlet 113, a net acid production stream, and a secondary absorption acid stream that is cooled to 60° C. in auxiliary acid heat exchanger 131. Alternatively, the acid stream exiting heat exchanger 105 is divided into a primary absorption acid stream and an auxiliary acid stream that passes through heat exchanger 131 and is thereafter divided into the net product stream and the secondary acid stream that is returned to secondary absorption zone 115.

In the embodiment of FIG. 3, recirculated absorption acid enters the primary absorption zone at about 200° C. and rate of 710 Kg/s (94,000 lbs/min) where it mixes with about 48.5 Kg/s (6,400 lbs/min) acid exiting the bottom of secondary absorption zone 115. Absorption acid is withdrawn from the bottom of the primary absorption zone at a rate of about 790 Kg/s (104,000 lbs/min) and a temperature of 226° C., and net production of sulfuric acid remains at about 13.5 Kg/s (1,800 lbs/min). As in Example 1, the acid strength is 99.5% throughout the primary absorption zone. Gas side temperatures, flows and compositions are the same as in Example 1, as are secondary acid temperatures, flows and compositions.

The higher L/G operation of FIG. 3 provides enhanced mass transfer in the primary absorption zone, and marginally lower corrosion potential in the base of the heat recovery tower and in heat exchanger 105.

Example 3

In the process of FIG. 9, a wet $SO_2$ stream from a spent acid plant containing excess oxygen is passed through a catalyst bed to convert $SO_2$ to $SO_3$. Additional water vapor is introduced into the gas stream in steam injection zone 227 to produce a gas stream that enters heat recovery tower 101 at inlet 123 and flows into primary absorption zone 103 at a temperature of 315° C. As introduced into the absorption zone after steam injection, the conversion gas flows at 103 Kg mole/s (13,623 lb moles/hr) and comprises 0.4 volume % $SO_2$, 5.4 volume % $SO_3$, 2.3 volume % oxygen, 72.7 volume % nitrogen, 5.6 volume % water vapor, 11 volume % $CO_2$ and 2.5 volume % $H_2SO_4$ Absorption acid leaves the primary absorption zone at a strength of 99.5%, a flow rate of 107 Kg mole/s (14,100 lb moles/hr) and a temperature of 204° C. After passage through heat exchanger 105, the acid stream is divided to provide a recirculated acid stream that is returned to heat recovery absorption zone 103 and an auxiliary stream comprising secondary absorption acid. The auxiliary stream is diluted with water in dilution zone 135 to reduce the acid strength to 99.2%. The diluted acid is passed through indirect heat exchanger 131 where heat is transferred from the acid stream for generation of steam at a pressure slightly above atmospheric for injection into the conversion gas stream in water vapor injection zone 127 within gas feed duct 129. Acid exiting heat exchanger 131 passes through second auxiliary heat exchanger 133 where it is further cooled, e.g., by transfer of heat to boiler feed water. Thereafter the acid stream is divided to produce a net production fraction which is removed from the absorption system at a rate of 8.4 Kg mole/s (1,113 lb moles/hr), a concentration of 99.2%, and a temperature of 71° C. The remaining acid fraction at the same concentration and temperature comprises secondary absorption acid that is recycled at a rate of 98.4 Kg mole/s (13,000 lb mole/hour) to the acid inlet 113.

Steam having a pressure of 0.9 MPascals (9 bar) is generated in heat exchanger 105 at a rate of 0.45 tons/per ton of net sulfuric acid produced in the absorption system.

Depleted gas exiting the secondary absorption zone passes through mist eliminators 119 and leaves the absorption system at a rate of 89 Kg mole/s (11,770 lb moles/hr) and a temperature of 70° C. The depleted gas comprises 0.5 volume % $SO_2$, 12.7 volume % $CO_2$, 2.7 volume % oxygen and 84.1 volume % nitrogen.

Example 4

In the process of FIG. 10, a wet $SO_2$ stream from a sulfur burning plant containing excess oxygen is passed through a catalyst bed to convert $SO_2$ to $SO_3$. Additional water vapor is introduced into the gas stream in steam injection zone 127 to produce a gas stream that enters the heat recovery tower 101 at inlet 123 and flows into primary absorption zone 103 at a temperature of 293° C. As introduced into the absorption zone the gas comprises 0.2 volume % $SO_2$, 4.3 volume % $SO_3$, 9 volume % oxygen, 79.2 volume % nitrogen, 3.7 volume % water vapor, and 3.5 volume % $H_2SO_4$. The gas stream flows upwardly through primary absorption zone 103 countercurrently to primary absorption acid formed at the top of the zone by combining acid recirculated from absorption acid heat exchanger 105 and secondary absorption acid flowing downwardly from the acid exit of secondary absorption zone 115. Acid strength throughout the primary absorption zone is 99.5%. Hot primary absorption acid exiting primary absorption zone is withdrawn from the bottom of tower 101 via acid exit 109 for circulation through heat exchanger 105.

Acid exiting heat exchanger 105 is divided into the recirculated fraction that returns to the tower via acid return inlet 113 and an auxiliary fraction which passes in series through two auxiliary heat exchangers 131 and 133. In diluter 137 downstream of exchanger 133 and upstream of secondary absorption acid tower inlet 117 with respect to the direction of secondary absorption acid flow, water is added to lower the strength of the acid entering the secondary absorption zone from 99.5% to 99.2%. Heat of dilution raises the temperature of the secondary acid to 71° C. Between the dilution zone and tower inlet 117, a sulfuric acid stream comprising net production of sulfuric acid is removed at a rate of 7 Kg mole/s (920 lb moles/hr, leaving a secondary absorption acid stream flowing at 14.8 Kg mole/s (1,960 lb moles per) hour into the secondary absorption zone.

In heat exchanger 105, steam having a pressure of 0.4 MPascals (4 bar) is generated at a rate of 0.86 tons/per ton of net sulfuric acid production.

Depleted gas exiting the secondary absorption zone passes through the mist eliminators 119 and leaves the absorption system at a rate of 78.2 Kg mole/s (10,330 lb moles/hr) and a temperature of 71.1° C. The depleted gas comprises 0.2 volume % $SO_2$, 10.2 volume % oxygen and 89.6 volume % nitrogen.

Example 5

Figure 8:
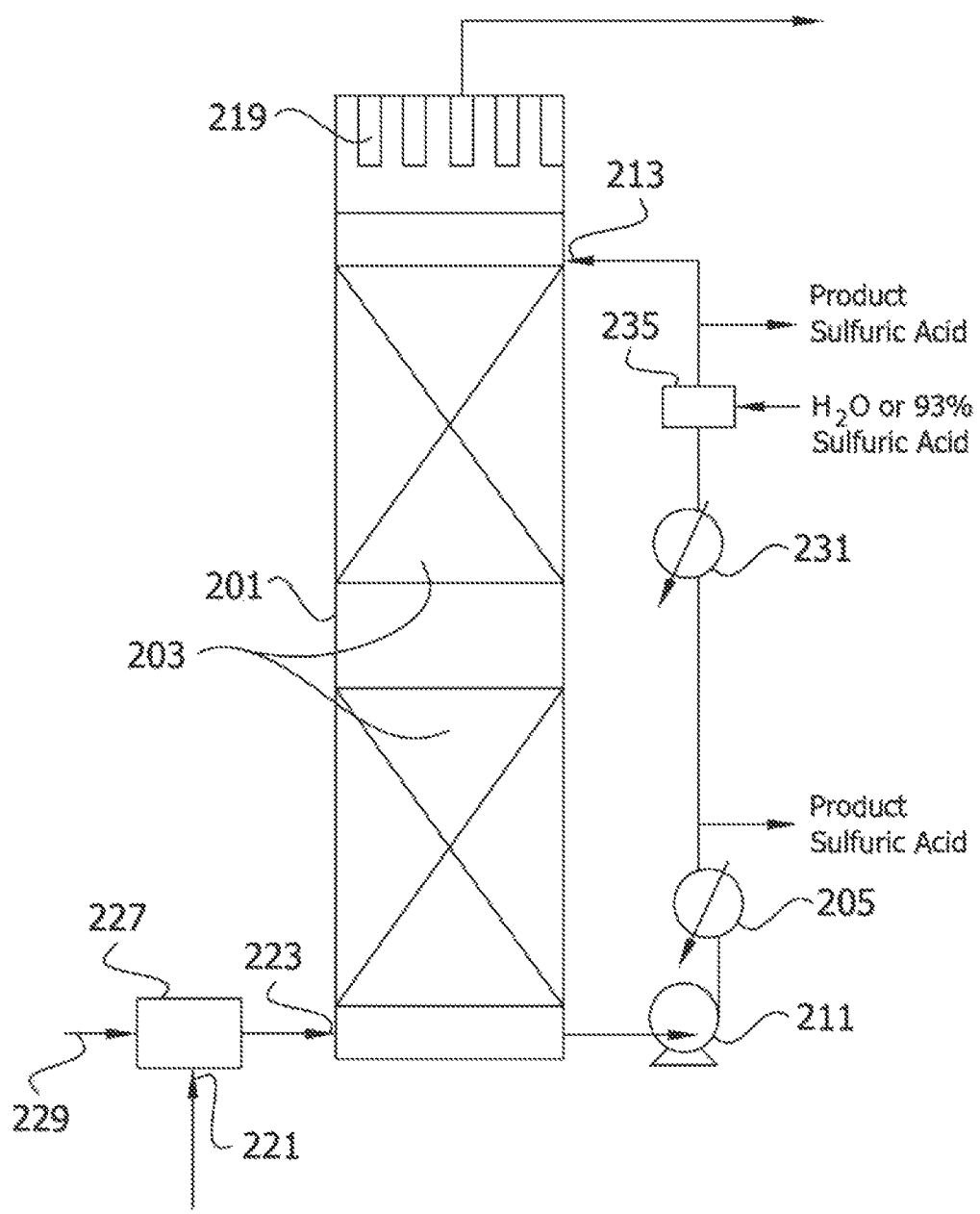
FIG. 8 is a process flow sheet for embodiments of a simulated process of the invention having a single absorption zone, as referred to in Example 5 for purposes of illustrating the extent of $SO_3$ recovery as a function of the number of theoretical absorption stages in the absorption zone of the heat recovery column.

Simulations were conducted of a process as illustrated in FIG. 8. After steam injection, the $SO_3$ conversion gas introduced into the system has the same composition as the metallurgical process gas described in Example 3. It may be seen that the process of this example is similar in certain respects to the process of FIG. 3 but comprises only a single absorption zone, i.e., only a heat recovery absorption zone and no secondary absorption zone. Separate simulations were run for processes in which the absorption zone comprises one, two or three vapor/liquid equilibrium stages.

In each case, the conversion gas entering countercurrent heat recovery absorption zone 203 has the same composition, temperature and flow rate as in Example 3. In each case, circulating absorption acid exits the heat recovery absorption zone at a concentration of 99% and thereafter is first passed through a heat exchanger 205 where the acid is cooled to 183° C. and steam may be generated at intermediate pressure. Acid passing through exchanger 205 is then divided to provide a circulation stream and a net production stream. Net production is 1,086 lb mole/hr at a temperature of 183° C.

The circulating acid stream is passed at a rate of 13,000 lb moles/hr through an auxiliary heat exchanger 231 where the acid is cooled to 60° C. and then reintroduced into the top of the tower above heat recovery absorption zone 203. Because all of the circulating acid stream is returned to the top of the tower, there is no secondary absorption zone as such. The composition of the gas stream exiting each equilibrium stage for each case is set forth in Table 3. Table 3A reports the simulation of a single equilibrium absorption stage, Table 3B the simulation of a system consisting of two equilibrium absorption stages, Table 3C the simulation of a system containing three equilibrium absorption stages in a single column, and Table 3D the simulation of a system containing four equilibrium stages in a single column.

TABLE 3A

| Gas/Vapor | Gas Composition Entering Stage 1 of Absorption | Gas Composition and Temperature Exiting | | | | |
|---|---|---|---|---|---|---|
| | | Stage 1 | Stage 2 | Stage 3 | Stage 4 | Mist Eliminators |
| $SO_2$ | 0.42 Kg mole/s (55.7 lb-mol/hr) | 0.42 Kg mole/s (55.6 lb-mol/hr) | | | | 0.42 Kg mole/s (55.6 lb-mol/hr) |
| $SO_3$ | 5.6 (742.3) | 0.11 (15) | | | | 0.11 (15) |
| $O_2$ | 2.37 (312.8) | | | | | 2.37 (312.8) |
| $CO_2$ | | | | | | 11.3 (1499.7) |
| $N_2$ | 75 (9901) | | | | | 75 (9901) |
| $H_2O$ | 0.6 (768) | 0.11 (14.6) | | | | 0.11 (14.6) |
| $H_2SO_4$ | 2.6 (343.5) | 0.32 (43.4) | | | | 0.32 (43.4) |

TABLE 3A-continued

| Gas/Vapor | Gas Composition Entering Stage 1 of Absorption | Gas Composition and Temperature Exiting | | | | |
|---|---|---|---|---|---|---|
| | | Stage 1 | Stage 2 | Stage 3 | Stage 4 | Mist Eliminators |
| Total | 103 (13,623.4) | | | | | 89.6 (11,842) |
| Temp. | 315° C. (600° F.) | 183° C. (362° F.) | | | | 183° C. (362° F.) |

Mist

| | | |
|---|---|---|
| $SO_3$ | | 4.5 g/Nm³ |
| $H_2SO_4$ | | 16 |

Acid Produced

| | | |
|---|---|---|
| Strength | | 99% |
| Vol. | | 99.3 Kg mole/s (13,128.7 lb-mol/hr) |
| Temp. | | 183° C. (362° F.) |

TABLE 3B

| Gas/Vapor | Gas Composition Entering Stage 1 of Absorption | Gas Composition and Temperature Exiting | | | | |
|---|---|---|---|---|---|---|
| | | Stage 1 | Stage 2 | Stage 3 | Stage 4 | Mist Eliminators |
| $SO_2$ | 0.42 Kg mole/s (55.7 lb-mol/hr) | 0.42 Kg mole/s (55.9 lb-mol/hr) | 0.42 Kg mole/s (55.6 lb-mol/hr) | | | 0.42 Kg mole/s (55.6 lb-mol/hr) |
| $SO_3$ | 5.6 (742.3) | 0.3 (39) | 0.0001 (0.0125) | | | 0.0001 (0.0125) |
| $O_2$ | 2.37 (312.8) | | | | | 2.37 (312.8) |
| $CO_2$ | | | | | | 11.3 (1499.7) |
| $N_2$ | 75 (9901) | | | | | 75 (9901) |
| $H_2O$ | 0.6 (768) | 0.24 (32.1) | 0.0006 (0.085) | | | 0.0006 (0.085) |
| $H_2SO_4$ | 2.6 (343.5) | 0.72 (96) | 0.0001 (0.0137) | | | 0.0001 (0.137) |
| Total | 103 (13,623.4) | | | | | 89 (11,769) |
| Temp. | 315° C. 600° F. | 201° C. 394° F. | 90° C. 194° F. | | | 90° C. (194° F.) |

Mist

| | | | |
|---|---|---|---|
| $SO_3$ | | 1.17 g/Nm³ | 3.8 mg/Nm³ |
| $H_2SO_4$ | | 35.2 | 51 |

Acid Produced

| | | |
|---|---|---|
| Strength | | 99% |
| Vol. | | 106.8 Kg mole/s (14113.2 lb-mol/hr) |
| Temp. | | 201° C. (394° F.) |

TABLE 3C

| Gas/Vapor | Gas Composition Entering Stage 1 of Absorption | Gas Composition and Temperature Exiting | | | | |
|---|---|---|---|---|---|---|
| | | Stage 1 | Stage 2 | Stage 3 | Stage 4 | Mist Eliminators |
| $SO_2$ | 0.42 Kg mole/s (55.7 lb- | 0.42 Kg mole/s | 0.42 Kg mole/s | 0.42 Kg mole/s | | 0.42 Kg mole/s |

TABLE 3C-continued

| Gas/Vapor | Gas Composition Entering Stage 1 of Absorption | Gas Composition and Temperature Exiting | | | | |
|---|---|---|---|---|---|---|
| | | Stage 1 | Stage 2 | Stage 3 | Stage 4 | Mist Eliminators |
| | mol/hr) | (55.9 lb-mol/hr) | (56.1 lb-mol/hr) | (55.7 lb-mol/hr) | | (55.6 lb-mol/hr) |
| SO$_3$ | 5.6 (742.3) | 0.34 (45.5) | 0.00017 (0.022) | 0.000006 (0.00075) | | 0.000006 (0.00075) |
| O$_2$ | 2.37 (312.8) | | | | | 2.37 (312.8) |
| CO$_2$ | | | | | | 11.3 (1499.7) |
| N$_2$ | 75 (9901) | | | | | 75 (9901) |
| H$_2$O | 0.6 (768) | 0.28 (36.7) | 0.0001 (0.0122) | 0.0001 (0.0166) | | 0.0001 (0.0166) |
| H$_2$SO$_4$ | 2.6 (343.5) | 0.83 (109.6) | 0.0016 (0.217) | 0.0001 | | 0.0158 (0.016) |
| Total | 103 (13,623.4) | | | | | 89 (11,769) |
| Temp. | 315° C. (600° F.) | 204° C. (400° F.) | 95.9° C. (204.6° F.) | 65.5° C. (150° F.) | | 65.5° C. (150° F.) |
| | | | Mist | | | |
| SO$_3$ | | 13.6 mg/Nm³ | 6.8 mg/Nm³ | 0.23 mg/Nm³ | | |
| H$_2$SO$_4$ | | 40.1 | 81 | 5.9 | | |
| | | | Acid Produced | | | |
| Strength Vol. | | | 99% 106.8 Kg mole/s (14113.5 lb-mol/hr) | | | |
| Temp. | | | 204° C. (400° F.) | | | |

TABLE 3D

| Gas/Vapor | Gas Composition Entering Stage 1 of Absorption | Gas Composition and Temperature Exiting | | | | |
|---|---|---|---|---|---|---|
| | | Stage 1 | Stage 2 | Stage 3 | Stage 4 | Mist Eliminators |
| SO$_2$ | 0.42 Kg mole/s (55.7 lb-mol/hr) | 0.42 Kg mole/s (55.9 lb-mol/hr) | 0.42 Kg mole/s (56.1 lb-mol/hr) | 0.42 Kg mole/s (56.1 lb-mol/hr) | 0.42 Kg mole/s (55.7 lb-mol/hr) | 0.42 Kg mole/s (55.6 lb-mol/hr) |
| SO$_3$ | 5.6 (742.3) | 0.37 (49.4) | 0.0002 (0.0275) | 0.000007 (0.00093) | 0.000003 (0.00041) | 0.000003 (0.00041) |
| O$_2$ | 2.37 (312.8) | | | | | 2.37 (312.8) |
| CO$_2$ | | | | | | 11.3 (1499.7) |
| N$_2$ | 75 (9901) | | | | | 75 (9901) |
| H$_2$O | 0.6 (768) | 0.3 (39.2) | 0.0001 (0.0138) | 0.0001 (0.0187) | 0.0001 (0.0118) | 0.0001 (0.0118) |
| H$_2$SO$_4$ | 2.6 (343.5) | 0.885 (117.0) | 0.002 (0.253) | 0.0001 (0.0187) | 0.0001 (0.01009) | 0.0001 (0.010) |
| Total | 103 (13,623.4) | | | | | 89 (11,769) |
| Temp. | 315° C. (600° F.) | 205° C. (402° F.) | 97.8° C. (208° F.) | 67.2° C. (153° F.) | 60.5° C. (141° F.) | 60.5° C. (141° F.) |
| | | | Mist | | | |
| SO$_3$ | | 14746 g/Nm³ | 8.38 mg/Nm³ | 0.28 mg/Nm³ | 0.125 mg/Nm³ | |
| H$_2$SO$_4$ | | 42.8 | 94 | 7.0 | 3.76 | |
| | | | Acid Produced | | | |
| Strength Vol. | | | | 99% 106.8 Kg mole/s (14113.4 lb-mol/hr) | | |
| Temp. | | | | 205° C. (402° F.) | | |

Example 6

In the process of FIG. 11, a sulfur burning contact sulfuric acid plant is operated to provide an $SO_2$-bearing combustion gas stream that is passed through a converter for conversion of $SO_2$ to $SO_3$. Water vapor is introduced into the converter gas stream within injection zone 127 via injection port 121 to produce a gas stream that enters heat recovery tower 101 at inlet 123 and flows into primary absorption zone 103 at a temperature of 315° C. Absorption zone 103 comprises packing or other means for promoting gas/liquid contact through which the gas stream flows upwardly countercurrently to primary absorption liquid comprising 99.5% by weight sulfuric flowing downwardly. The gas stream exiting primary absorption zone 103 flows upwardly through secondary absorption zone 115 where it is contacted with secondary absorption liquid for removal of residual $SO_3$ from the gas stream. Secondary absorption liquid then enters the top of the secondary absorption zone at a sulfuric acid concentration of 98.5 to 99.2% by weight and flows into the primary absorption zone from the bottom of the secondary absorption zone at a concentration of about 99.2% to 99.5% by weight.

Absorption acid exiting the bottom of primary absorption zone 103 is circulated via pump 111 through principal heat exchanger 105 which comprises a boiler wherein heat is transferred from the absorption acid to generate steam at a pressure of approximately 125 psig, i.e., 0.85 MPascals (8.5 bar) gauge. Absorption acid exits absorption heat recovery boiler 105 at a temperature of 204° C. and is divided to provide a principal absorption liquid that is recirculated to the top of primary absorption zone 103 and an auxiliary acid stream comprising a secondary absorption liquid which is recirculated to the top of secondary absorption zone 115.

Between the point of division and the acid inlet at the top of the secondary absorption zone, the auxiliary acid stream is passed in series through three indirect heat exchangers in series, i.e. heat exchangers 167, 163 and 169. Heat exchanger 167 is a preheater for deaerated boiler feed water to the principal heat exchanger 105, heat exchanger 163 is auxiliary to deaerator 165, and heat exchanger 169 is a preheater for undeaerated boiler feed water upstream of the deaerator with respect to the flow of the boiler feed water.

In heat exchanger 167, the auxiliary acid stream is cooled from 204° C. to 165° C. thereby heating deaerated boiler feed water from 108° C. to 178° C., approximately the vapor liquid equilibrium temperature at 8.5 bar pressure of the steam generated in boiler 105. The pressurized water exiting preheater 167 is preferably transferred directly to boiler 105 as shown in the drawing.

In heat exchanger 163, auxiliary acid is cooled from 165° C. to 115° C. thereby vaporizing a substantial fraction of water circulated between heat exchanger 163 and deaerator 165 at a constant temperature of 108° C. The mixed liquid water/steam mixture exiting exchanger 163 is returned to deaerator 165 where the steam serves to help strip non-condensables from deaerated boiler feed water that is preferably received from the water exit of heat exchanger 169 as shown in the drawing.

In heat exchanger 169, the auxiliary acid stream is cooled from 115° C. to 64° C. thereby heating undeaerated boiler feed water from 40° C. to 108° C. Auxiliary acid exiting exchanger 169 may be diluted as necessary with water or cross-flow of more dilute (e.g., 93 wt. %) sulfuric acid in diluter 137 prior to return of secondary absorption liquid to the top of secondary absorption zone 115.

Treated but undeaerated boiler feed water is supplied at 4,320 lb. moles per hour and heated in feed water preheater from 40° to 108° C. and thereafter introduced into deaerator 165 together with the mixed liquid water and steam stream exiting deaerator auxiliary heat exchanger 163. Supplemental steam saturated at a pressure of 10 psig (0.07 MPascals) gauge is also introduced into the deaerator at a rate of 132 lb. moles/hour. The steam introduced into the deaerator functions to strip non-condensables from the undeaerated boiler feed water flowing into the deaerator from exchanger 169, thereby generating an exhaust stream comprising approximately 99.9 volume % water vapor, the balance non-condensables. Optionally, additional low pressure steam is introduced into the deaerator to control the water vapor content of the deaerator exhaust gas at a predetermined ratio to the equivalent sulfur trioxide content of the converter gas stream entering primary absorption zone 103.

Deaerator exhaust gas comprising steam generated in heat exchanger 163 plus supplemental steam from a foreign source is recycled to injection zone 127 via injection port 121 for mixing with the converter gas that is introduced into primary absorption zone 103. Water vapor at a rate of 700 lb. moles per hour is contained in the deaerator exhaust recycled to the injection zone. Of this, approximately 550 lb. moles per hour is generated from the heat transferred by cooling the secondary absorption acid from 165° to 115° C.

Condensate from the deaerator flows at a rate of 3,300 lb. moles per hour from the bottom of the deaerator to the utility side inlet of principal heat exchanger 105 where steam is generated at a rate of 3,300 lb. moles per hour at a pressure of 8.5 bar. A modest additional increment of condensate, 552 lb. moles per hour, is exported from the heat recovery absorption system for service as boiler feed water elsewhere in the contact sulfuric acid plant, or elsewhere in the manufacturing plant in which the sulfuric acid plant is located.

Steam is generated at 8.5 bar in heat exchanger 105 is at a rate of 0.64 tons per ton of net sulfuric acid production.

In the embodiment of this example, it may be seen that a large fraction of the energy contained in the secondary absorption liquid is expended in generating water vapor for injection into the converter gas stream entering the heat recovery absorption zone.

Example 7

Operation of the process of Example 7 is substantially identical in its overall flow sheet to that of Example 6, but there is a significant difference in distribution of the heat energy contained in the secondary absorption liquid.

The operation of Example 7 is identical to Example 6 in the primary absorption zone 103, the principal heat exchanger 105 for generation of medium pressure steam, and the deaerated boiler feed water preheater 167. The water side flow scheme, in which undeaerated boiler feed water is passed through exchanger 169 to deaerator 165, and deaerated boiler feed water from deaerator 165 is passed through deaerated boiler water preheater 167 to $SO_3$ absorption heat recovery boiler 105, is also the same, as is the temperature to which deaerated boiler feed water is heated under pressure in preheater 167.

However, the process of Example 7 extracts a much lower fraction of heat from the auxiliary acid stream in deaerator auxiliary heat exchanger 163 than does the process of Example 6. Thus, the fraction of water entering the deaerator that is converted to steam in exchanger 163 is much lower in Example 7 than in Example 6. As a result a component of only about 209 lb. moles water vapor per hour in the deaerator exhaust gas is attributable to the operation of the deaerator auxiliary heat exchanger. A further component of 491 lb.

moles per hour is obtained from the combination of a fixed supplemental flow of 10 psig steam at a rate of 132 lb. moles per hour and a second supplemental steam supply that is regulated to provide a total water vapor content of 700 lb. moles per hour in the exhaust stream that is recycled to injection port 121 for mixing with the converter gas stream in injection mixing zone 127.

However, because less of the feed water introduced via heat exchanger 169 is vaporized, the scheme of Example 7 provides a much larger supply of deaerated condensate than does the embodiment of Example 6. Thus, after supplying 3,300 lb. moles per hour deaerated boiler feed water to feed water preheater 167 and absorption heat recovery boiler 105, the deaerator exports another 5,593 lb. moles per hour deaerated boiler feed water at 108° C. for use elsewhere in the contact acid facility or elsewhere in the manufacturing plant.

Steam is generated in principal heat exchanger 105 at a rate between 0.56 net tons per ton net sulfuric acid production.

All supplemental steam is recovered, either as process water in the product sulfuric acid stream, or as deaerated boiler feed water that is used for generation of steam in the principal heat recovery system heat exchanger or elsewhere in the contact acid plant or wider manufacturing facility.

In view of the above, it will be seen that the several objects of the invention are achieved and other advantageous results attained.

As various changes could be made in the above without departing from the scope of the invention, it is intended that all matter contained in the above description and shown in the accompanying drawings shall be interpreted as illustrative and not in a limiting sense.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A process for the preparation of sulfuric acid comprising:
burning sulfur in a dry gas comprising excess oxygen in a combustion zone to produce a sulfur oxide-bearing gas stream comprising a combustion gas comprising sulfur dioxide, oxygen and not more than 0.005 moles water vapor per mole $SO_2$;
contacting the sulfur oxide-bearing gas stream comprising said combustion gas with a catalyst for conversion of sulfur dioxide to sulfur trioxide, thereby converting the sulfur oxide-bearing gas stream to a conversion gas containing not more than 0.005 moles water vapor per mole $SO_3$;
contacting the conversion gas in a primary heat recovery absorption zone with an absorption liquid comprising sulfuric acid, thereby transferring sulfuric acid from the conversion gas to the absorption liquid;
introducing water vapor into the conversion gas into a water vapor injection zone upstream of the primary heat recovery absorption zone with respect to the direction of gas flow in a proportion sufficient to increase the equivalent water vapor content of the gas to at least about 0.55 moles per mole total equivalent sulfur oxide gas content prior to entry of the gas stream into the primary absorption zone; and
circulating said absorption liquid between said primary absorption zone and an indirect heat exchanger in which heat generated by reaction of sulfur trioxide and water, condensation of sulfuric acid, and/or absorption of sulfur trioxide into the absorption liquid is transferred to a heat transfer fluid, thereby heating the heat transfer fluid to at least 150° C.

2. A process for the preparation of sulfuric acid comprising:
burning a sulfur source in a gas comprising excess oxygen to produce a sulfur oxide-bearing gas stream comprising a combustion gas comprising sulfur dioxide and oxygen;
contacting the sulfur oxide-bearing gas stream comprising said combustion gas with a catalyst for conversion of sulfur dioxide to sulfur trioxide, thereby converting the sulfur oxide-bearing gas stream to a conversion gas containing $SO_3$;
contacting the conversion gas in a heat recovery absorption zone with an absorption liquid comprising sulfuric acid, thereby transferring sulfur trioxide from the conversion gas to the absorption liquid;
circulating said absorption liquid between said absorption zone and a principal indirect heat exchanger in which heat is transferred to a principal heat transfer fluid, thereby heating said principal heat transfer fluid to at least 150° C.;
dividing the absorption liquid stream exiting said principal heat exchanger to provide a principal absorption liquid stream that is recirculated to said heat recovery absorption zone and an auxiliary absorption liquid stream;
passing said auxiliary liquid stream through an indirect heat exchanger auxiliary to a boiler feed water deaerator, heat being transferred in said deaerator auxiliary heat exchanger from said auxiliary liquid to a water stream for generation of deaerating steam;
directing the deaerating steam to said deaerator wherein boiler feed water is contacted with the deaerating steam for stripping non-condensables from the boiler feed water;
removing a deaerator exhaust stream from said deaerator, said deaerator exhaust stream comprising water vapor and non-condensable gases; and
introducing water vapor contained in said deaerator exhaust stream into the sulfur oxide bearing stream upstream of the absorption zone with respect to the direction of gas flow.

3. A process as set forth in claim 1 wherein an oxygen-containing gas is contacted with a desiccant to provide a desiccated oxygen-containing gas; and sulfur and the desiccated oxygen-containing gas are introduced into said combustion zone.

4. A process as set forth in claim 1 wherein the conversion gas is introduced into the primary absorption zone without intermediate condensation of any component of the sulfur oxide-bearing gas stream between said water vapor injection zone and said primary absorption zone.

5. A process as set forth in claim 4 wherein said conversion gas is introduced into said primary absorption zone without intermediate removal of heat from the conversion gas between said water vapor injection zone and said primary absorption zone.

6. A process as set forth in claim 1 wherein the mass flow ratio of said absorption liquid entering said primary absorption zone to equivalent sulfur trioxide entering said primary absorption zone is between about 30 and about 50.

7. A process as set forth in claim 1 wherein heat generated by reaction of sulfur trioxide and water, condensation of sulfuric acid, and/or absorption of sulfur trioxide into the absorption liquid is transferred to a heat transfer fluid in a quantity of at least about 1160 KJ per Kilogram (500 Btu per pound) of equivalent of equivalent $SO_3$ entering said primary absorption zone, thereby heating the heat transfer fluid to at least 150° C.

8. A process as set forth in claim 7 wherein heat generated by reaction of sulfur trioxide and water, condensation of sulfuric acid, and/or absorption of sulfur trioxide into the absorption liquid is transferred to a heat transfer fluid in a quantity of at least about 1220 KJ per Kilogram of equivalent $SO_3$ (525 Btu per pound of equivalent $SO_3$) entering said primary absorption zone, thereby heating the heat transfer fluid to at least 150° C.

9. A process as set forth in claim 7 wherein heat is transferred from said absorption acid to generate steam at a pressure of at least about 4 bar.

10. A process as set forth in claim 9 wherein the quantity of steam generated is at least about 0.55 tons per ton of sulfuric acid produced from the $SO_3$ entering said primary absorption zone.

11. A process as set forth in claim 1 wherein the process further comprises:
contacting the gas stream exiting the primary heat recovery absorption zone with a secondary absorption liquid comprising sulfuric acid in a secondary absorption zone, residual $SO_3$ contained in the gas stream entering said secondary absorption zone being recovered as sulfuric acid in the secondary absorption liquid,
wherein the concentration and temperature of the gas stream exiting the primary absorption zone and the temperature and dew point of the conversion gas entering the primary absorption zone are such as to enable controlling the gas stream leaving said secondary absorption zone to contain not more than 20 g/Nm³ sulfuric acid mist.

12. A process as set forth in claim 11 wherein the gas stream exiting the secondary absorption zone is passed through a mist eliminator system at a rate of at least 300 Nm³ per hour per square meter of mist eliminator element surface area transverse to the direction of gas flow, the gas exiting said mist eliminator system containing less than 0.1 g/Nm³ acid mist.

13. A process as set forth in claim 12 wherein the linear velocity through mist control elements is at least about 200 m/hr.

14. A process as set forth in claim 13 wherein the linear velocity of the gas through the mist control elements is between about 200 and about 650 m/hr.

15. A process as set forth in claim 11 wherein the gas exiting the secondary absorption zone is passed through a mist eliminator system at a rate between about 340 and about 500 Nm³ per hour per square meter of mist eliminator element surface area transverse to the direction of gas flow.

16. A process as set forth in claim 1 wherein the strength of the absorption acid exiting the primary absorption zone is between about 99.1 wt. % and about 99.8 wt. % $H_2SO_4$.

17. A process as set forth in claim 1 wherein the strength of the absorption acid exiting the primary absorption zone is between about 99.3 wt. % and about 99.7 wt. % $H_2SO_4$.

18. A process as set forth in claim 1 wherein water vapor is introduced into the conversion gas in a proportion sufficient to increase the temperature of the conversion gas to between about 270° C. and about 330° C.; and said conversion gas is introduced into said primary heat recovery absorption zone at a temperature between about 270° C. and 330° C.

19. A process as set forth in claim 18 wherein water vapor is introduced into the conversion gas in a proportion sufficient to increase the temperature of the conversion gas to at least about 300° C.

20. A process as set forth in claim 1 wherein the absorption liquid is circulated between the primary absorption zone and both a principal indirect heat exchanger and an auxiliary indirect heat exchanger, in each of which heat exchangers heat generated by reaction of sulfur trioxide and water, condensation of sulfuric acid, and/or absorption of sulfur trioxide into the absorption liquid is transferred from the circulating absorption liquid, heat being transferred to a principal heat transfer fluid in the principal heat exchanger, thereby heating the principal heat transfer fluid to at least 150° C., heat being transferred to a water stream in the auxiliary heat exchanger, thereby generating water vapor for injection into the sulfur oxide-bearing gas stream upstream of the primary absorption zone.

21. A process as set forth in claim 20 wherein the principal and auxiliary heat exchangers are in series with respect to the flow of the circulating absorption liquid.

22. A process as set forth in claim 21 wherein acid exiting the principal heat exchanger is divided to provide a primary absorption liquid and a secondary heat recovery liquid, the primary absorption liquid being introduced into the primary absorption zone where it contacts the conversion gas, the secondary heat recovery liquid being passed through the auxiliary heat exchanger where it is cooled, the gas stream exiting said primary absorption zone being introduced into a secondary absorption zone where it is contacted with a secondary absorption liquid comprising the cooled secondary heat recovery liquid.

23. A process as set forth in claim 1 wherein the proportion of water vapor introduced the sulfur oxide-bearing gas stream, the sulfuric acid strength and temperature of the absorption liquid introduced into said absorption zone, and the L/G ratio in the absorption zone are such that the molar ratio of sulfuric acid vapor to $SO_3$ is at least about 1.2 at the location of maximum sulfuric acid vapor concentration in said absorption zone.

24. A process as set forth in claim 23 wherein the molar ratio of vapor phase sulfuric acid to $SO_3$ in the gas exiting the absorption zone is between about 1.0 and about 3.0.

25. A process as set forth in claim 1 further comprising:
contacting the gas stream exiting the primary absorption zone with a secondary absorption liquid comprising sulfuric acid in a secondary absorption zone, residual $SO_3$ contained in the gas stream entering the secondary absorption zone being recovered as sulfuric acid in the secondary absorption liquid, the mass flow ratio of the secondary absorption liquid entering the primary absorption zone to total gas flow entering the secondary absorption zone being between about 0.4 and about 1.5; and
the gas exiting the secondary absorption zone is passed through a mist eliminator system at a rate between about 340 and about 500 Nm³ per hour per square meter of mist eliminator element surface area transverse to the direction of gas flow.

26. A process as set forth in claim 11 wherein the relative flow rates of the gas stream entering the secondary absorption zone and the secondary absorption liquid stream entering the secondary absorption zone is such that the maximum difference between the local bulk temperature of the gas phase and the local bulk temperature of the secondary absorption liquid phase with which the gas is in contact is not greater than about 35° C. within any locus of gas/liquid contact within the secondary absorption zone that is defined by a constant distance from the liquid inlet to the zone.

27. A process as set forth in claim 1 further comprising:
circulating the absorption liquid between the primary absorption zone and a principal indirect heat exchanger in which heat is transferred to a principal heat transfer fluid, thereby heating said principal heat transfer fluid to at least 150° C.;
dividing the absorption liquid stream exiting the principal heat exchanger to provide a principal absorption liquid stream that is recirculated to the primary absorption zone and an auxiliary absorption liquid stream;
passing the auxiliary liquid stream through an indirect heat exchanger auxiliary to a boiler feed water deaerator, heat being transferred in the deaerator auxiliary heat exchanger from the auxiliary liquid to a water stream for generation of deaerating steam;
directing the deaerating steam to the deaerator wherein boiler feed water is contacted with the deaerating steam for stripping non-condensables from the boiler feed water; and
removing a deaerator exhaust stream from the deaerator, the deaerator exhaust stream comprising water vapor and non-condensable gases.

28. A process as set forth in claim 27 further comprising introducing water vapor contained in the deaerator exhaust stream into the sulfur oxide-bearing gas upstream of the primary absorption zone with respect to the direction of gas flow.

29. A process as set forth in claim 1 wherein the source of sulfur comprises elemental sulfur.

30. A process as set forth in claim 1 further comprising controlling the sulfuric acid concentration of the absorption liquid so that that the difference between the absorption liquid concentration and the azeotrope is not more than about +1.0 wt. % throughout said heat recovery absorption zone.

31. A process as set forth in claim 30 wherein the absorption liquid is circulated through an external heat exchanger for removal of the heat of absorption, and net sulfuric acid produced in the primary absorption zone is removed as a product acid stream from the circulating acid, the rate of removal of product acid and the rate of circulation of absorption liquid relative to the flow of sulfur trioxide into the primary absorption zone being controlled to maintain the sulfuric acid concentration of the absorption liquid at a value that does not differ from the azeotrope by less than −0.2 wt. % nor more than +0.8 wt. % at any location within the primary absorption zone.

32. A process as set forth in claim 1 further comprising controlling the concentration of the absorption liquid so that that the difference between the absorption liquid concentration and the azeotrope at the gas exit is not less than about −0.1 wt. %.

33. A process as set forth in claim 32 wherein the absorption liquid is circulated through an external heat exchanger for removal of the heat of absorption, and net sulfuric acid produced in the primary absorption zone is removed as a product acid stream from the circulating acid, the rate of removal of product acid and the rate of circulation of absorption liquid relative to the flow of sulfur trioxide into the primary absorption zone being controlled to maintain the sulfuric acid concentration of the absorption liquid at a value that does not differ by more than about +1 wt. % from the azeotrope at any location within the zone.

34. A process as set forth in claim 32 further comprising:
contacting the gas stream exiting the primary absorption zone with a secondary absorption liquid comprising sulfuric acid in a secondary absorption zone, residual $SO_3$ contained in the gas stream entering said secondary absorption zone being recovered as sulfuric acid in the secondary absorption liquid; and
wherein the concentration and temperature of the acid stream exiting the primary absorption zone and the temperature and dew point of the conversion gas stream entering the primary absorption zone being such as to enable controlling the gas stream leaving said secondary absorption zone to contain not more than 20 g/Nm³ sulfuric acid mist.

35. A process as set forth in claim 1 comprising:
burning elemental sulfur in a dry gas comprising excess oxygen to produce a sulfur oxide-bearing gas stream comprising a combustion gas comprising sulfur dioxide and oxygen;
contacting the sulfur oxide-bearing gas stream comprising said combustion gas with a catalyst for conversion of sulfur dioxide to sulfur trioxide, thereby converting the sulfur oxide-bearing gas stream to a conversion gas containing $SO_3$;
contacting the conversion gas with a primary absorption liquid comprising sulfuric acid in a primary absorption (heat recovery) zone, thereby transferring sulfuric acid from the conversion gas to the primary absorption liquid;
introducing water vapor into the conversion gas upstream of the primary absorption zone with respect to the gas flow direction in a proportion sufficient to increase the equivalent water vapor content of the gas to between about 0.55 and about 0.98 moles per mole total equivalent sulfur oxide gas content in the gas entering the primary absorption zone, whereby the temperature of the conversion gas entering the primary absorption zone is between about 290° and about 340° C. and at least about 40° C. in excess of its dew point, and the proportion of water vapor introduced into said sulfur oxide-bearing gas stream, the sulfuric acid strength and temperature of the absorption liquid introduced into said absorption zone, and the L/G ratio in the absorption zone are such that the molar ratio of sulfuric acid vapor to $SO_3$ reaches a maximum of at least about 1.2 at a location within the absorption zone intermediate the gas inlet and gas exit thereof;
circulating said absorption liquid between said primary absorption zone and an indirect heat exchanger in which heat generated by reaction of sulfur trioxide and water, condensation of sulfuric acid, and/or absorption of sulfur trioxide into the primary absorption liquid is transferred to boiler feed water in said indirect heat exchanger, thereby generating at least 0.55 tons of steam at a pressure of at least 0.4 MPascal (4 bar) per ton of sulfuric acid produced by absorption of $SO_3$ in said primary absorption liquid in said primary absorption zone;
controlling the sulfuric acid concentration of the absorption liquid so that that the difference between the absorption liquid concentration and the azeotrope is not less than about −0.2 wt. % or greater than about +1.0 wt. % throughout said primary absorption zone;
contacting the gas stream exiting the primary absorption zone with a secondary absorption liquid comprising sulfuric acid in a secondary absorption zone, residual $SO_3$ contained in the gas stream entering said secondary absorption zone being recovered as sulfuric acid in the secondary absorption liquid, the concentration and temperature of the acid stream exiting the primary absorption zone and the temperature and dew point of the conversion gas stream entering the primary absorption zone being such as to enable controlling the gas stream leaving said secondary absorption zone to contain not more than 20 g/Nm³ sulfuric acid mist, wherein the relative flow rates of the gas stream entering the secondary absorption zone and the secondary absorption liquid stream entering the secondary absorption zone is such that the difference between the local bulk temperature of the gas phase and the local bulk temperature of the secondary absorption liquid phase with which the gas is in contact is between about 15° and about 35° C. at both the liquid inlet or liquid exit of the secondary absorption zone; and passing gas stream exiting the secondary absorption zone through a mist eliminator system at a rate of at least 300 Nm³ per hour per square meter of mist eliminator element surface area transverse to the direction of gas flow, the gas exiting said mist eliminator system containing less than 0.1 g/Nm³ acid mist.

36. A process as set forth in claim 2 wherein substantially the entire deaerator exhaust stream is introduced into the sulfur oxide-bearing stream upstream of said absorption zone with respect to the direction of gas flow.

37. A process as set forth in claim 2 wherein steam generated in said deaerator auxiliary heat exchanger is supplemented with steam from another source introduced into said deaerator.

38. A process as set forth in claim 37 wherein supplemental steam is introduced at a fixed rate into said deaerator.

39. A process as set forth in claim 37 wherein supplemental steam is introduced into the exhaust stream prior to introduction of the exhaust stream into said sulfur-oxide bearing stream at a rate controlled to control the ratio of equivalent water vapor to equivalent sulfur trioxide in the gas stream entering the absorption zone.

40. A process as set forth in claim 38 wherein a second supplemental supply of steam is introduced into the exhaust stream prior to introduction of the exhaust stream into said sulfur-oxide bearing stream, the rate of said second supplement supply being controlled to control the ratio of equivalent water vapor to equivalent sulfur trioxide in the gas stream entering the absorption zone.

41. A process as set forth in claim 2 wherein water deaerated in said deaerator is introduced into said principal heat exchanger, or into a waste heat boiler for recovery of energy from combustion gas produced in burning sulfur to generate $SO_2$, as a source of boiler feed water for generation of steam.

42. A process as set forth in claim 41 wherein water deaerated in said deaerator is passed through a deaerated water preheater comprising an indirect heat exchanger wherein heat is transferred from said auxiliary liquid to said deaerated water to provide pressurized boiler feed water to said principal heat exchanger or said waste heat boiler.

43. A process as set forth in claim 42 wherein said deaerated water preheater is upstream of said deaerator auxiliary heat exchanger with respect to the direction of auxiliary liquid acid flow.

44. A process as set forth in claim 43 wherein said deaerated water is heated in said deaerated water preheater to a temperature of at least about 95° C.

45. A process as set forth in claim 2 wherein said auxiliary absorption liquid exiting said deaerator auxiliary heat exchanger is passed through an indirect heat exchanger wherein heat is transferred from said auxiliary absorption liquid to boiler feed water.

46. A process as set forth in claim 45 wherein auxiliary liquid acid exiting said deaerator auxiliary heat exchanger is passed through a deaerator preheater comprising an indirect heat exchanger wherein heat is transferred from said auxiliary liquid to undeaerated water to preheat the undeaerated water before introduction thereof into said deaerator.

47. A process as set forth in claim 2 wherein the combination of the flow rate and temperature of undeaerated water entering said deaerator and the rate of heat transfer from said auxiliary absorption liquid to said water stream in said deaerator auxiliary heat exchanger is such that the mass flow ratio of deaerated boiler feed water exiting said deaerator to equivalent sulfur trioxide entering said absorption zone is at least about 1.5.

48. A process as set forth in claim 2 wherein the water vapor content of said deaerator exhaust stream is at least about 0.80 moles per mole total equivalent sulfur oxide gas content of said sulfur oxide-bearing gas stream.

49. A process as set forth in claim 48 wherein the combination of the flow rate and temperature of undeaerated water entering said deaerator and the rate of heat transfer from said auxiliary liquid to said water stream in said deaerator auxiliary heat exchanger is sufficient to generate steam in said deaerator auxiliary heat exchanger at a rate of at least about 0.70 moles per mole total equivalent sulfur oxide gas content of said sulfur oxide-bearing gas stream.

50. A process as set forth in claim 49 wherein the combination of the flow rate and temperature of undeaerated water entering said deaerator and the rate of heat transfer from said auxiliary liquid to said water stream in said deaerator auxiliary heat exchanger is sufficient to generate steam in said deaerator auxiliary heat exchanger at a rate of at least about 0.80 moles per mole total equivalent sulfur oxide gas content of said sulfur oxide-bearing gas stream.

51. A process as set forth in claim 2 wherein said source of sulfur comprises elemental sulfur.

* * * * *